(12) United States Patent
Asami et al.

(10) Patent No.: US 9,201,214 B2
(45) Date of Patent: Dec. 1, 2015

(54) IMAGING LENS AND IMAGING APPARATUS

(71) Applicant: FUJIFILM Corporation, Tokyo (JP)

(72) Inventors: Taro Asami, Saitama-ken (JP); Masato Kondo, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 229 days.

(21) Appl. No.: 13/887,757

(22) Filed: May 6, 2013

(65) Prior Publication Data

US 2013/0279026 A1    Oct. 24, 2013

Related U.S. Application Data

(63) Continuation of application No. PCT/JP2011/006270, filed on Nov. 9, 2011.

(30) Foreign Application Priority Data

Nov. 15, 2010    (JP) .................................. 2010-254694

(51) Int. Cl.
*G02B 9/08*    (2006.01)
*G02B 13/00*    (2006.01)
(Continued)

(52) U.S. Cl.
CPC ........ *G02B 13/0015* (2013.01); *G02B 13/0035* (2013.01); *G02B 13/04* (2013.01); *G02B 13/06* (2013.01)

(58) Field of Classification Search
CPC ........ G02B 13/04; G02B 13/18; G02B 13/06; G02B 9/12; G02B 13/0015; G02B 13/0035; H04N 5/225

USPC ......... 359/740, 782–784, 791, 761, 749–753, 359/716, 645, 735
See application file for complete search history.

(56) References Cited

U.S. PATENT DOCUMENTS 6,515,805 B2    2/2003 Hagimori
7,436,605 B2 *  10/2008 Asami ........................... 359/784
(Continued)

FOREIGN PATENT DOCUMENTS

CN    201532488 U    7/2010
JP    H0634878    2/1994
(Continued)

OTHER PUBLICATIONS

Extended European Search Report dated Jul. 10, 2014; Appln. No. 11840920.0.
(Continued)

*Primary Examiner* — Ricky Mack
*Assistant Examiner* — Mustak Choudhury
(74) *Attorney, Agent, or Firm* — Young & Thompson

(57) ABSTRACT

An imaging lens includes negative first lens having a concave image-side surface, positive second lens having a convex object-side surface in a paraxial region, an aperture stop, and positive third lens having a convex image-side surface in the paraxial region, which are arranged in this order from an object side. The Abbe numbers of materials constituting the first lens and the third lens for d-line are greater than or equal to 40. The Abbe number of a material constituting the second lens for d-line is less than or equal to 40. When the focal length of an entire system is f, and the center thickness of the second lens is D3, and the focal length of the first lens is f1, the following formulas (1') and (2) are satisfied:

$1.7 < D3/f < 2.9$; and    (1')

$-5.0 < f1/f < -1.8$.    (2)

20 Claims, 19 Drawing Sheets

(51) Int. Cl.
*G02B 13/04* (2006.01)
*G02B 13/06* (2006.01)

(56) References Cited

U.S. PATENT DOCUMENTS

| | | | |
|---|---|---|---|
| 7,471,465 B2 * | 12/2008 | Yamashita et al. | 359/770 |
| 2008/0068729 A1 | 3/2008 | Asami | |
| 2008/0130128 A1 | 6/2008 | Yamashita et al. | |
| 2010/0226020 A1 | 9/2010 | Asami | |
| 2011/0069399 A1 | 3/2011 | Imaoka | |

FOREIGN PATENT DOCUMENTS

| | | |
|---|---|---|
| JP | H0634879 | 2/1994 |
| JP | H06-230283 A | 8/1994 |
| JP | 2001-337268 | 12/2001 |
| JP | 2002-082284 A | 3/2002 |
| JP | 2005181596 | 7/2005 |
| JP | 2006-162829 | 6/2006 |
| JP | 2007-025499 | 2/2007 |
| JP | 2008-102500 | 5/2008 |
| JP | 2009-276679 | 11/2009 |
| JP | 2010-231190 | 10/2010 |

OTHER PUBLICATIONS

Chinese Office Action dated Nov. 3, 2014; Application No. 201180054906.6.

Japan Office Action dated Oct. 28, 2014; Application No. 2012-544098.

* cited by examiner

EXAMPLE 1

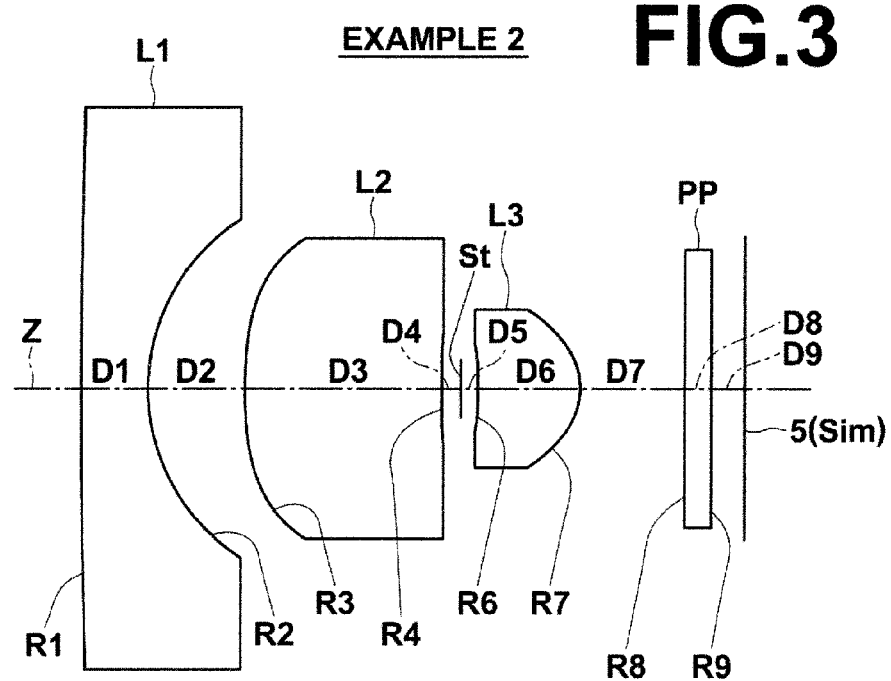
FIG.3 EXAMPLE 2
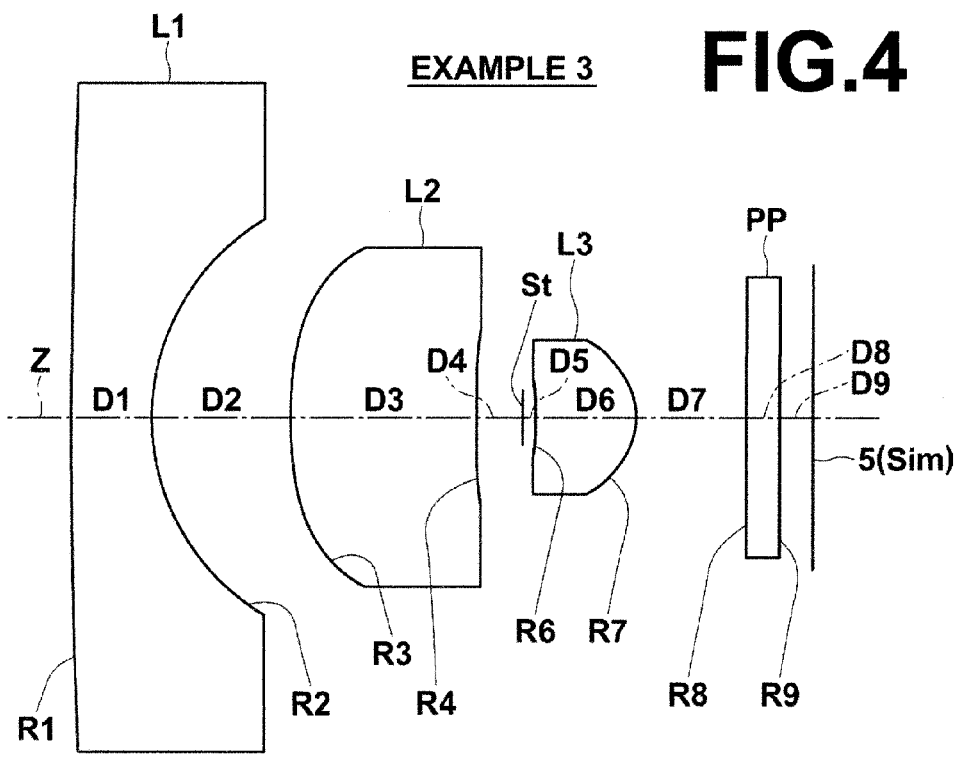
FIG.4 EXAMPLE 3

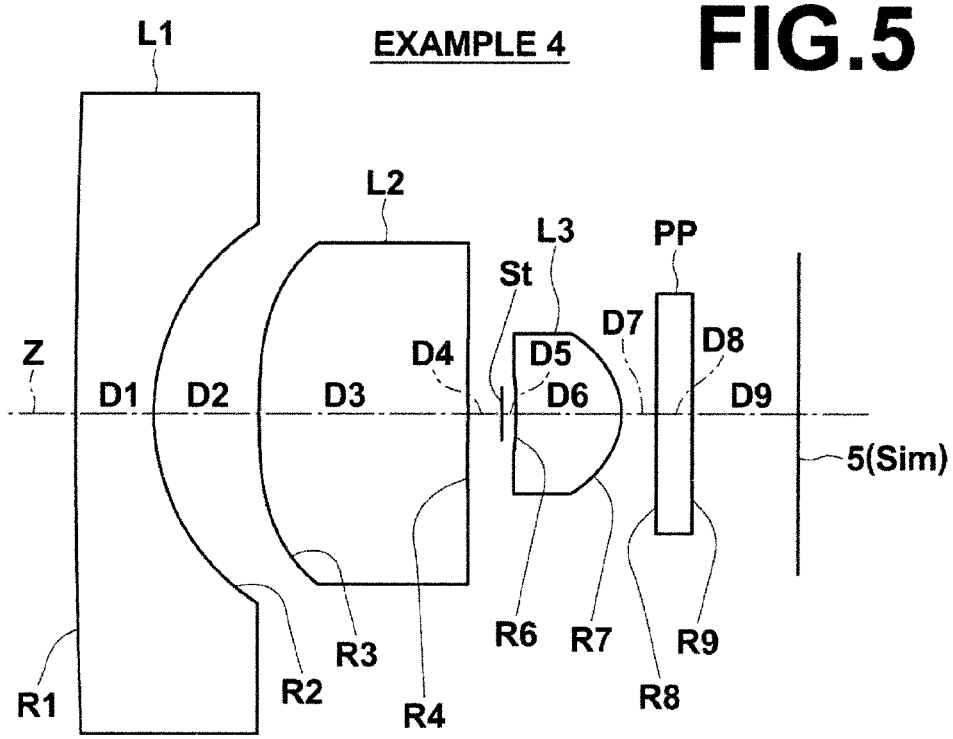
FIG.5 EXAMPLE 4
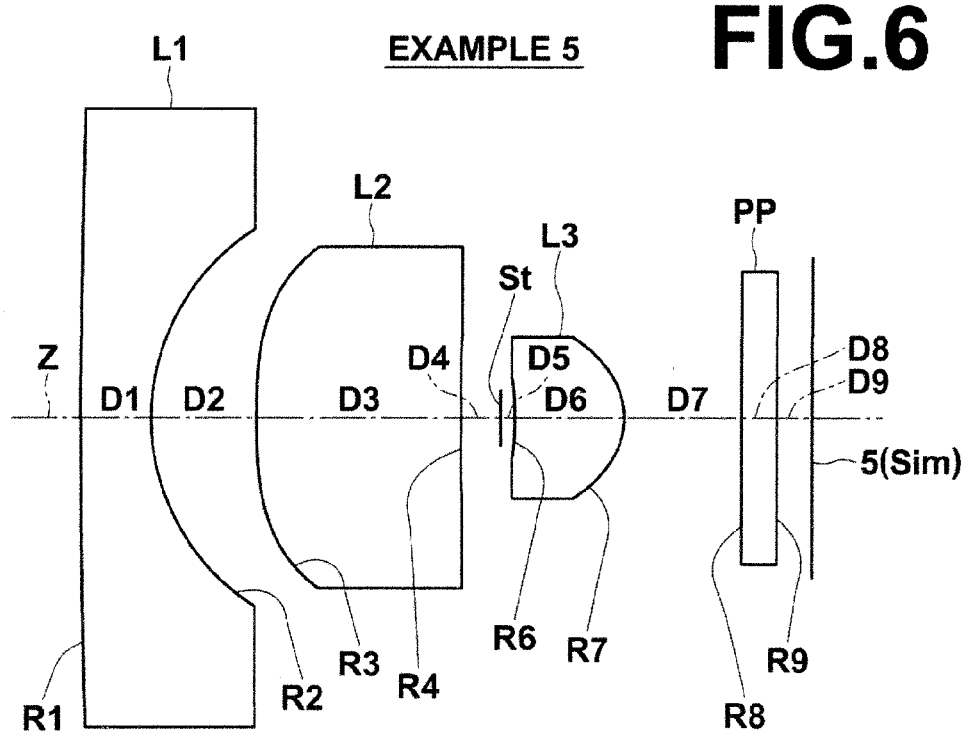
FIG.6 EXAMPLE 5

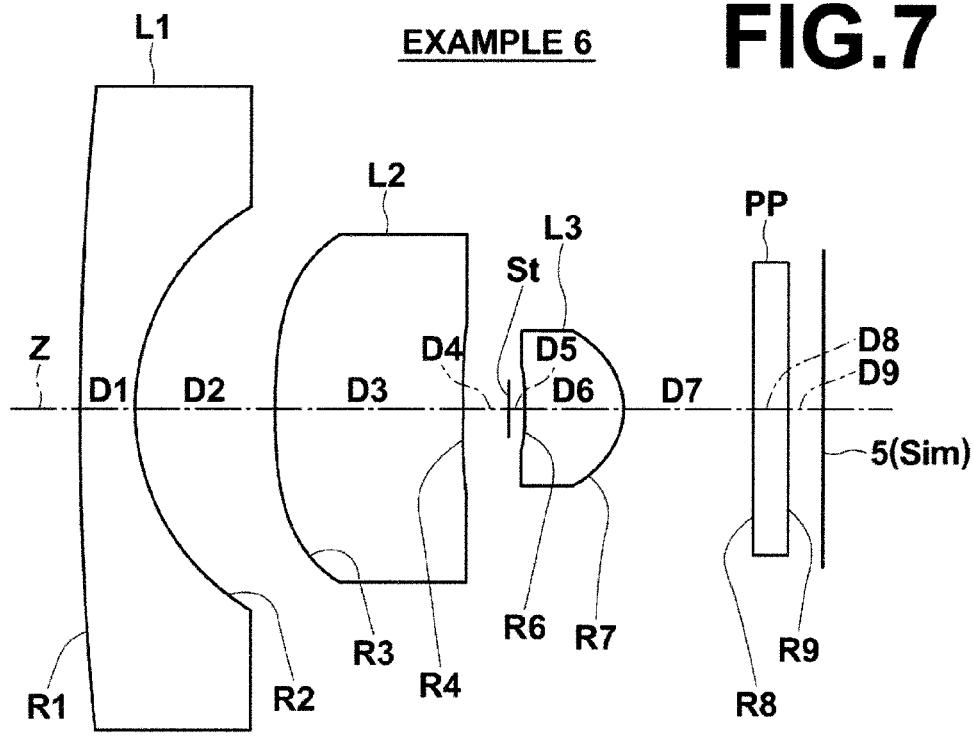
FIG.7 EXAMPLE 6
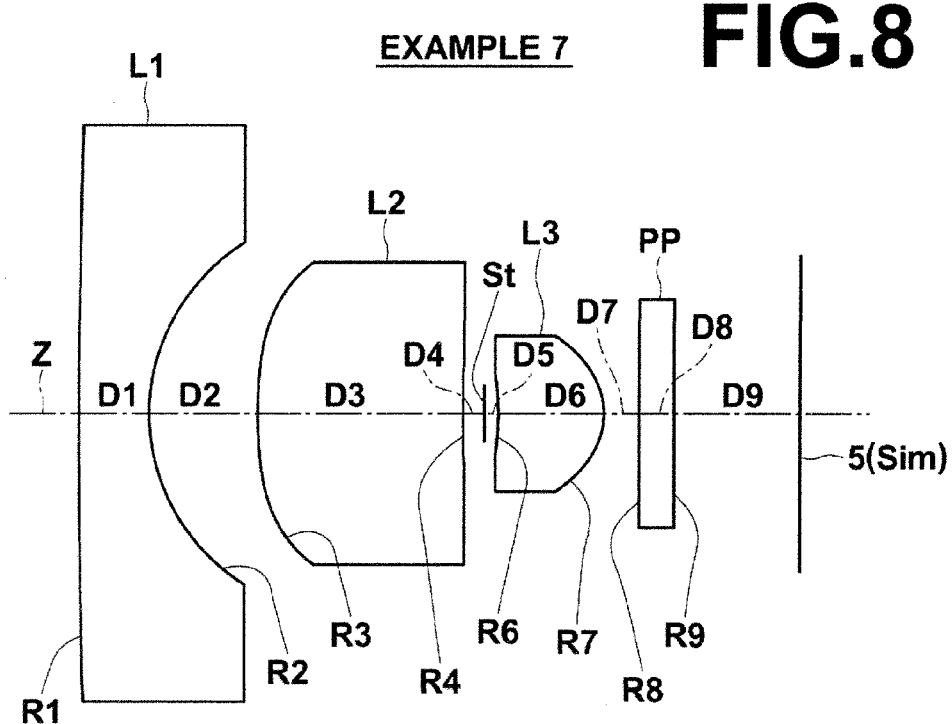
FIG.8 EXAMPLE 7

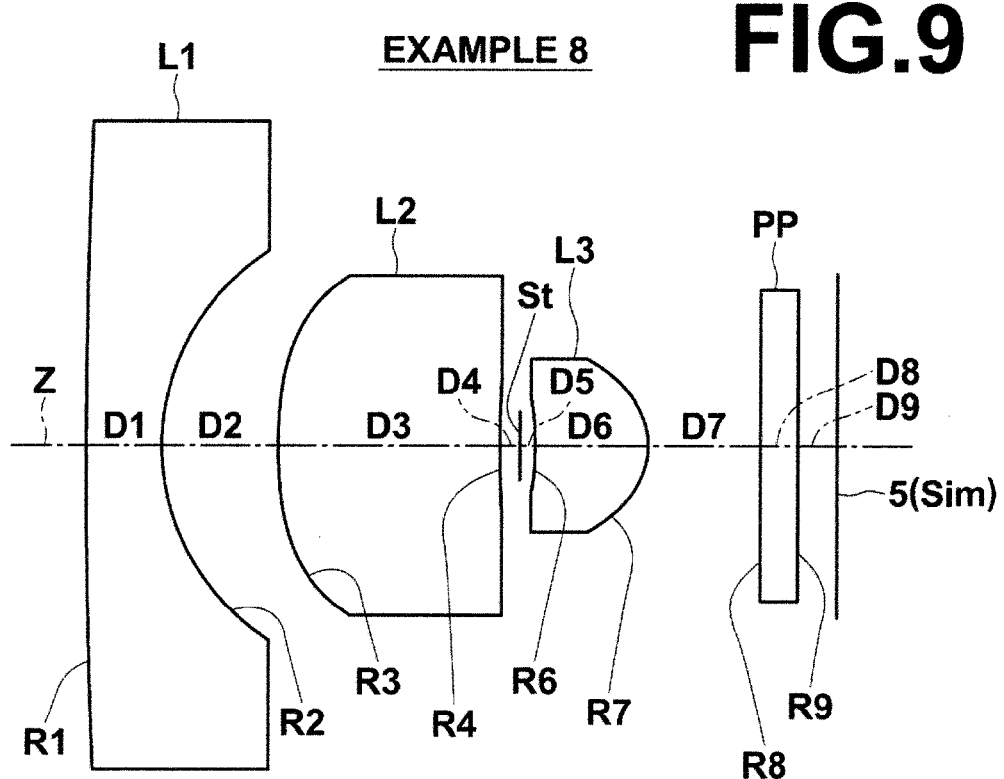
FIG.9 EXAMPLE 8
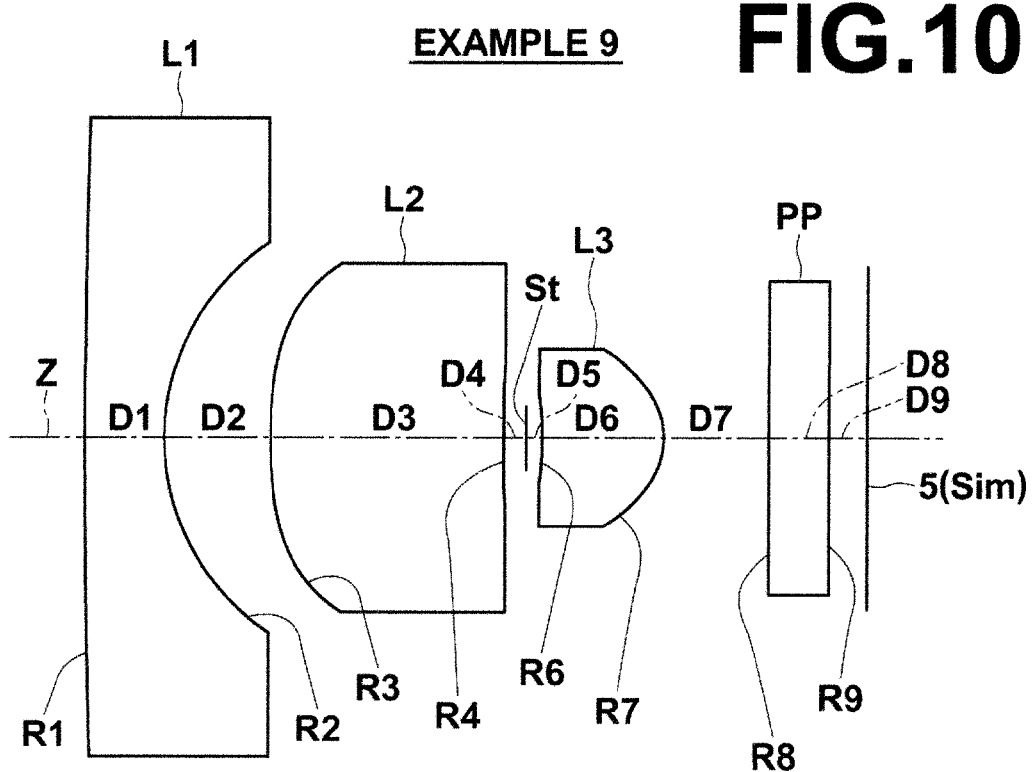
FIG.10 EXAMPLE 9

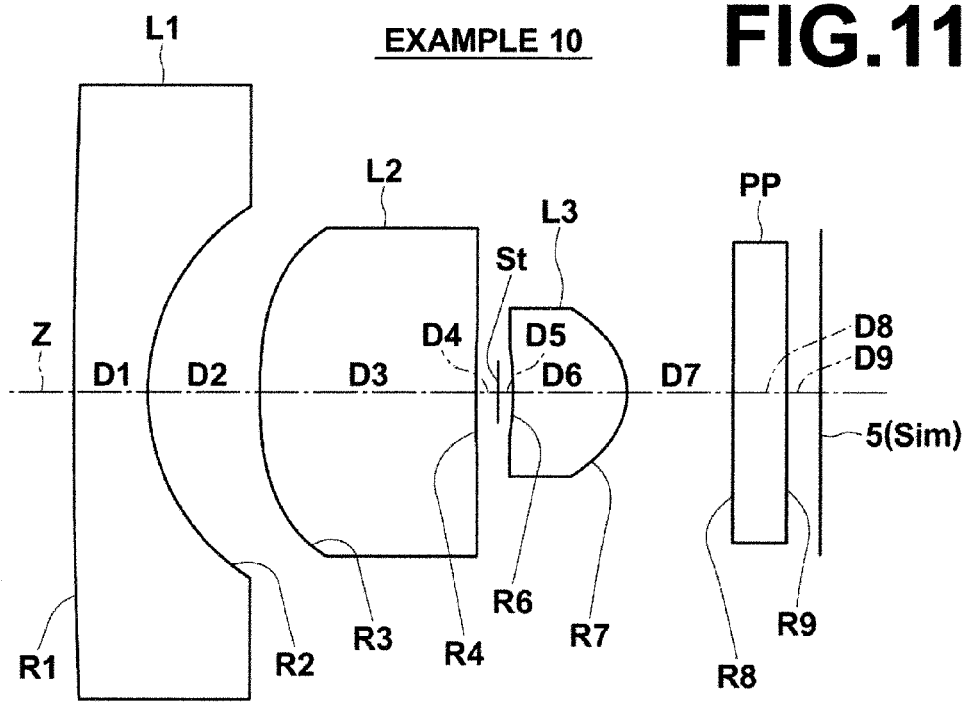
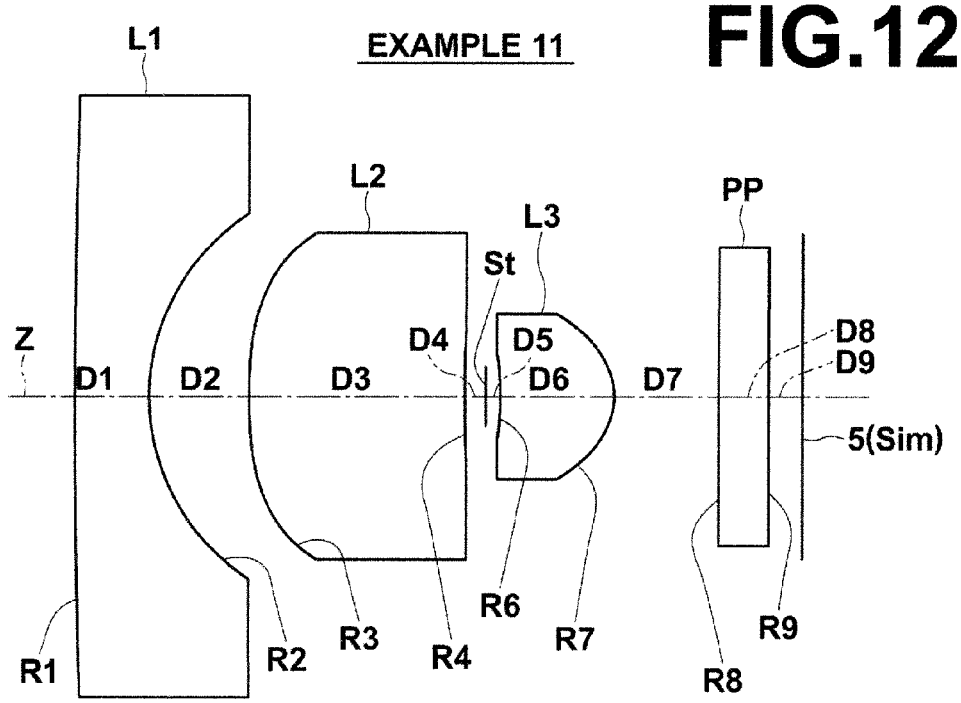

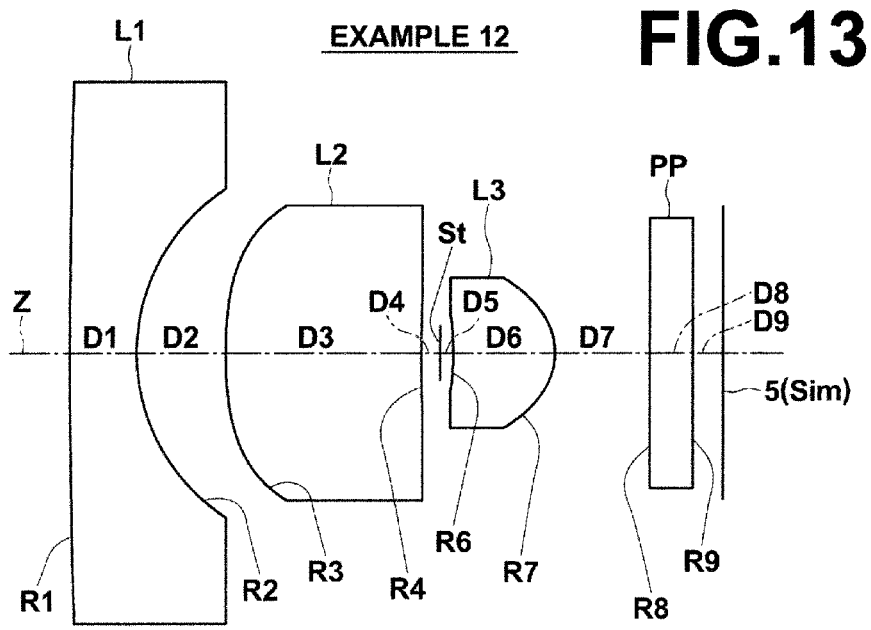
FIG.13 EXAMPLE 12
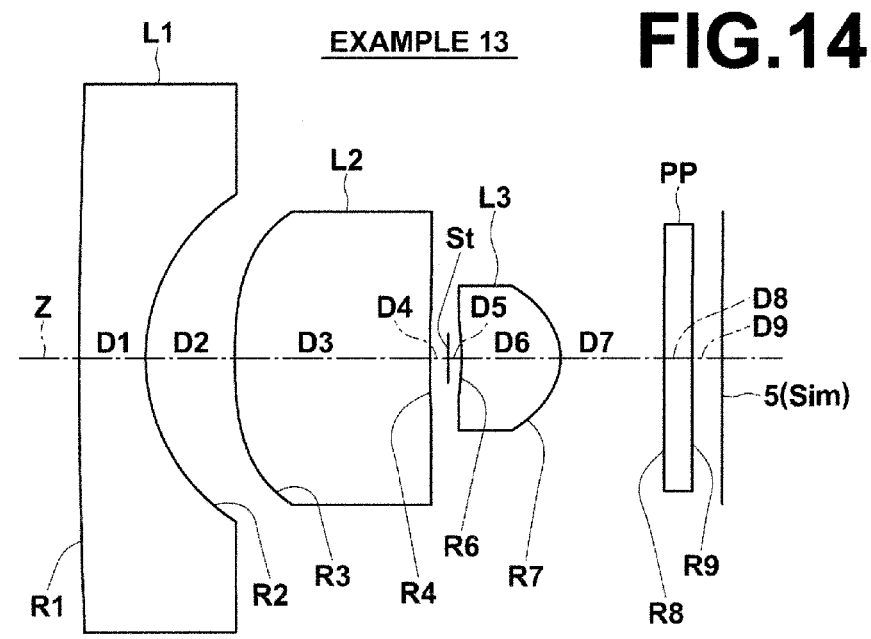
FIG.14 EXAMPLE 13

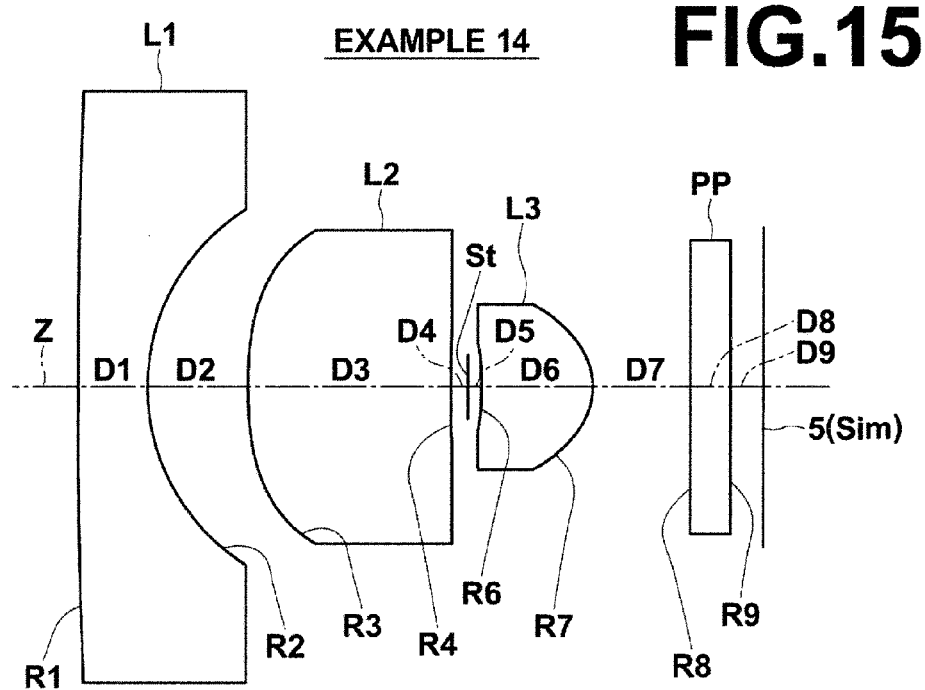
FIG. 15 EXAMPLE 14
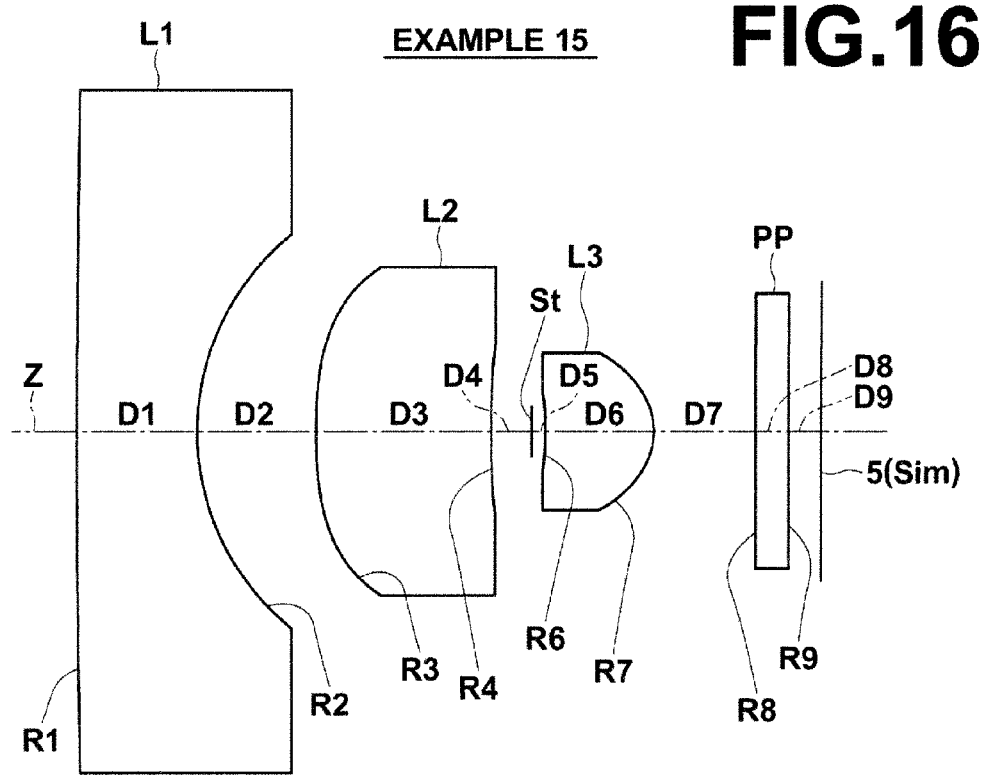
FIG. 16 EXAMPLE 15

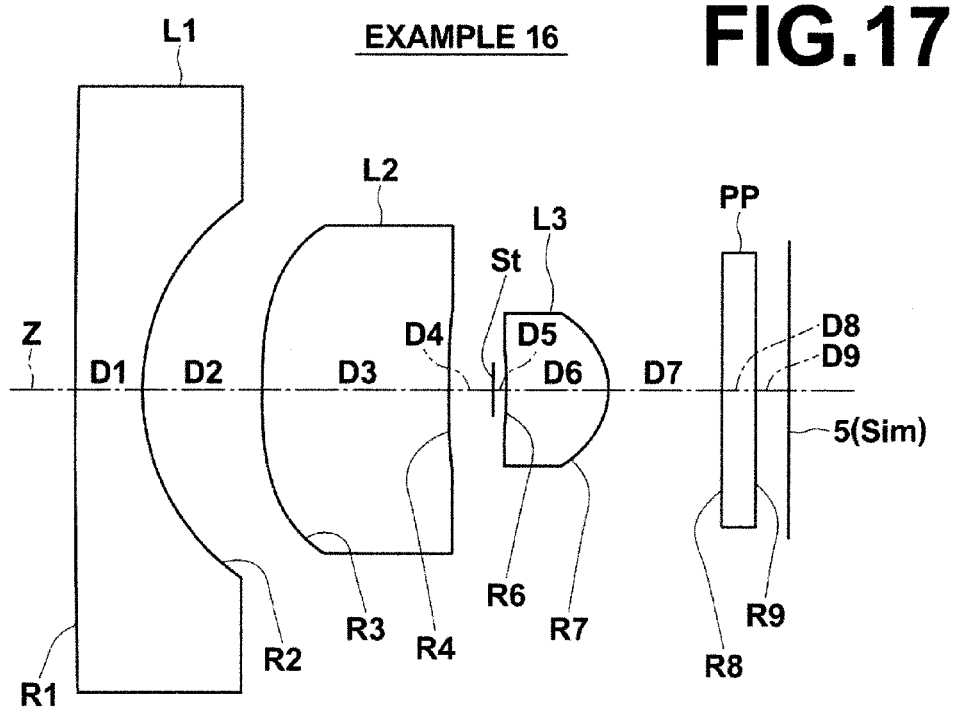
FIG. 17 EXAMPLE 16
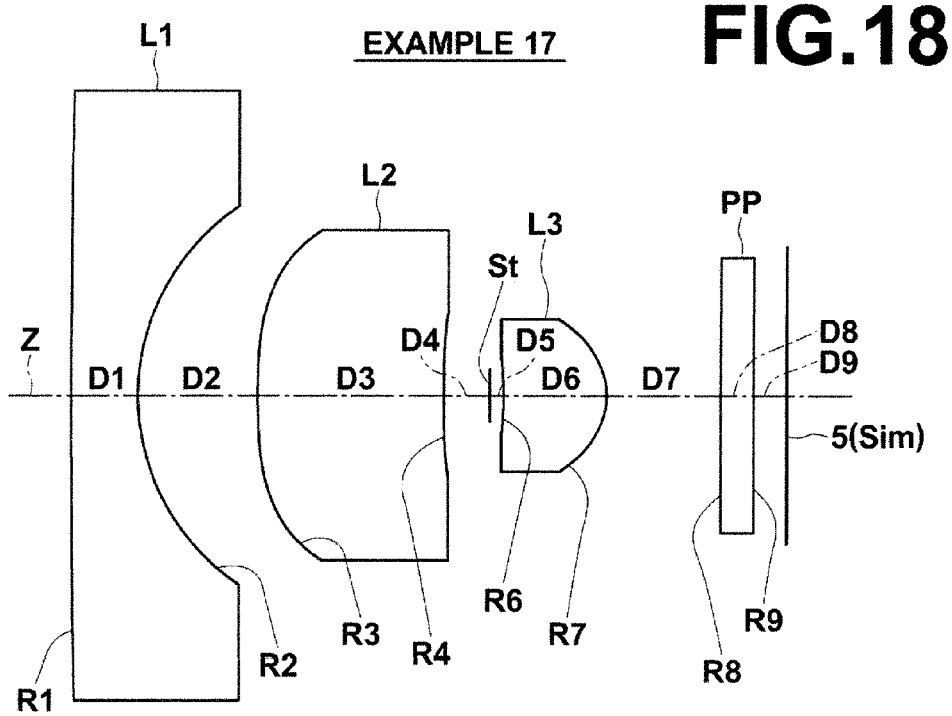
FIG. 18 EXAMPLE 17

EXAMPLE 18

EXAMPLE 19

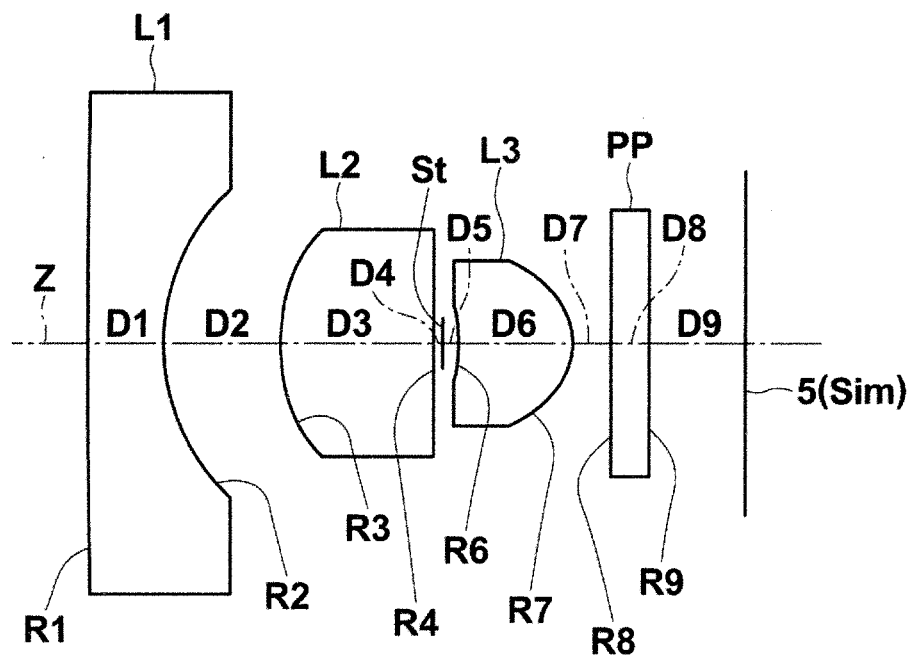
FIG.21 EXAMPLE 20

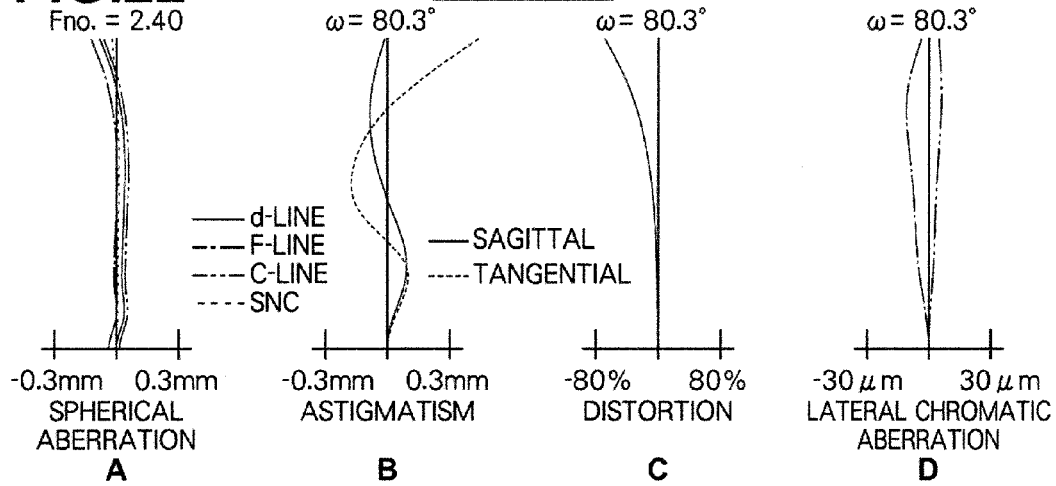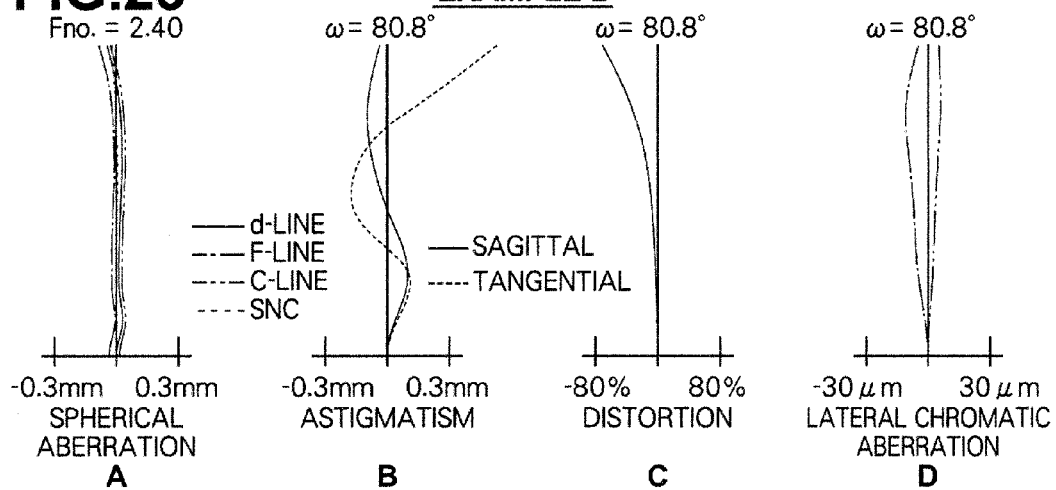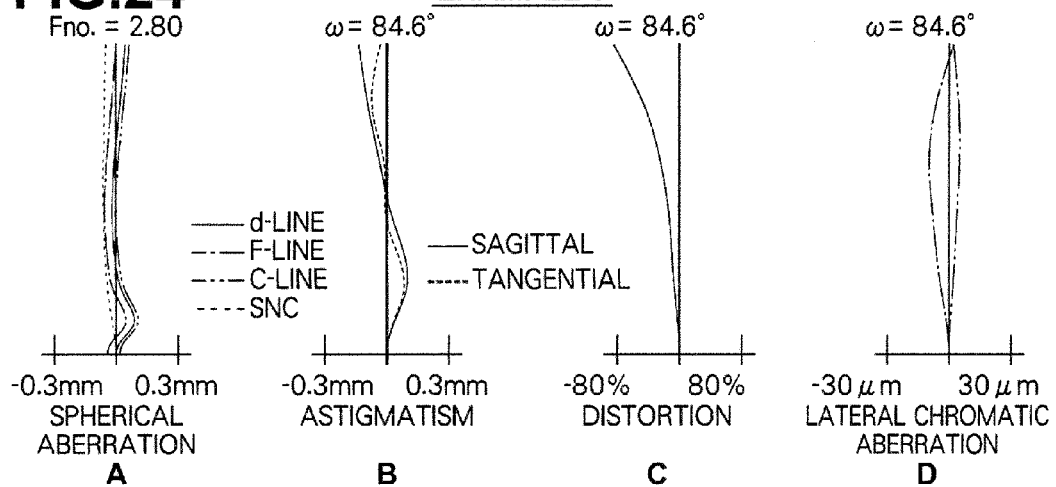

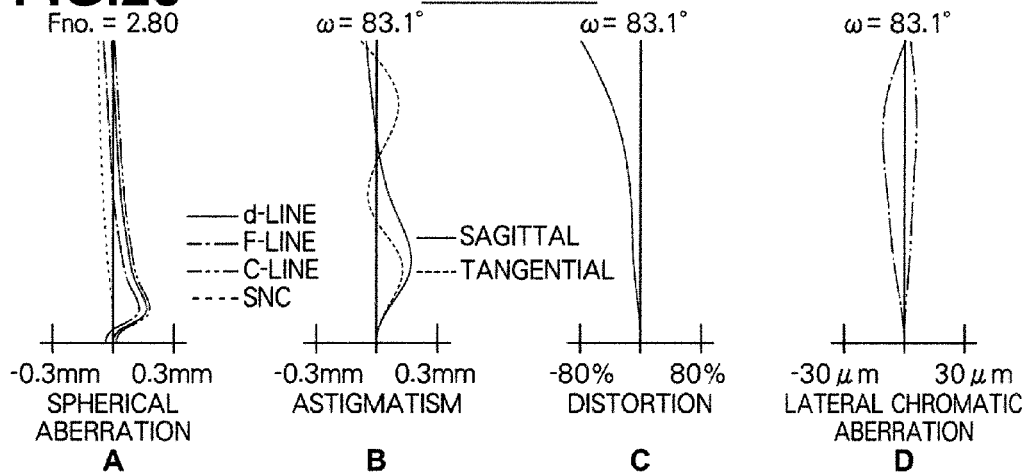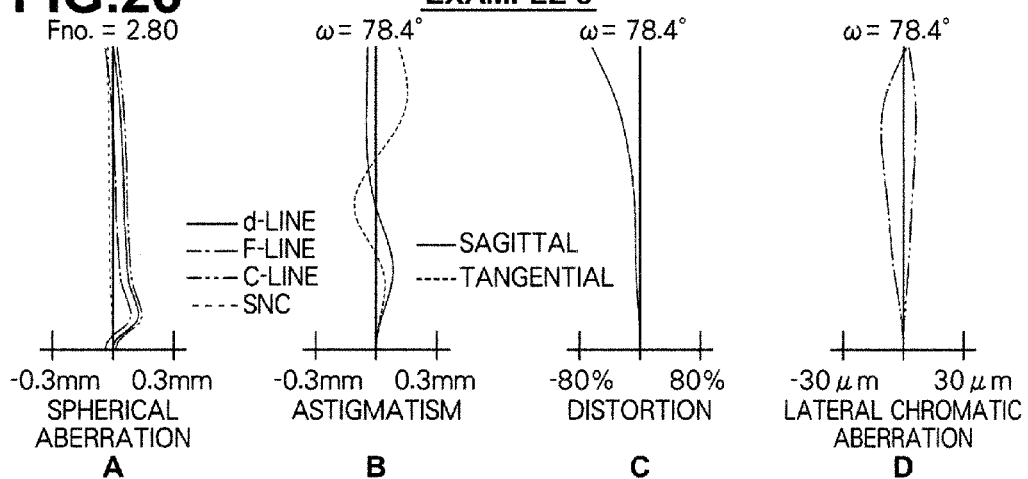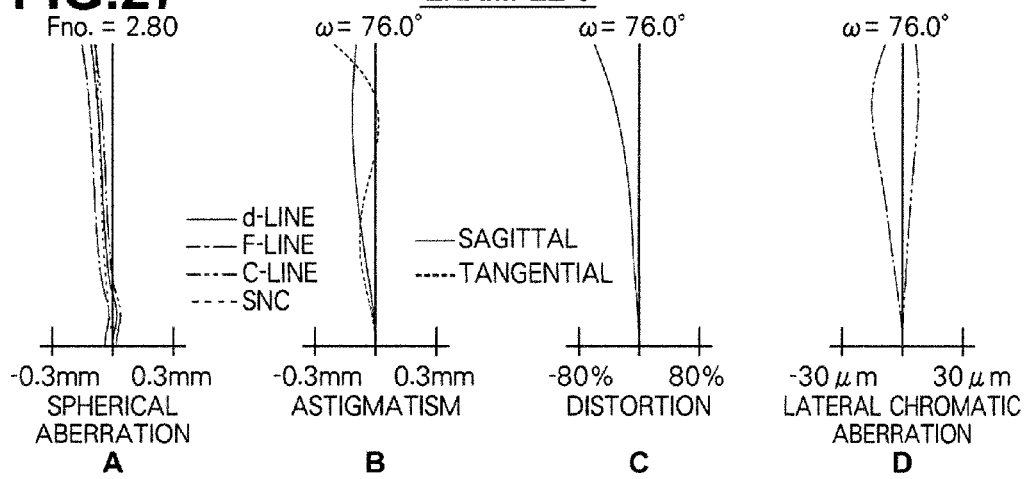

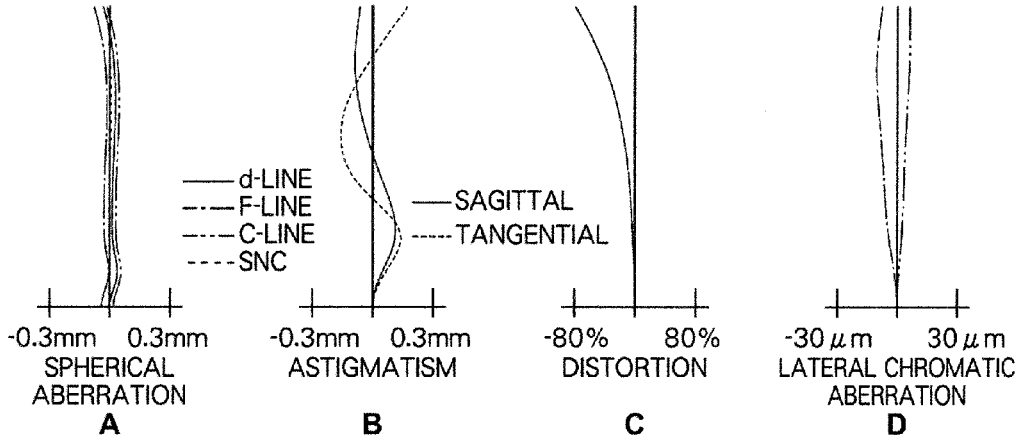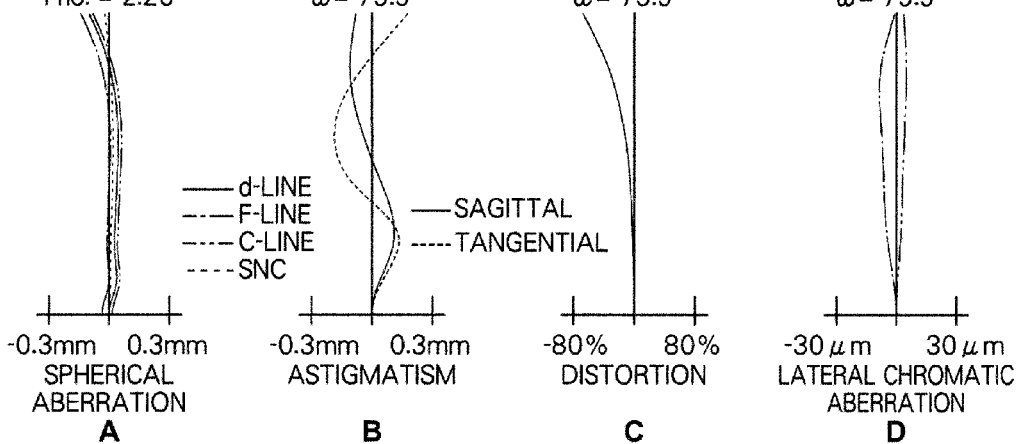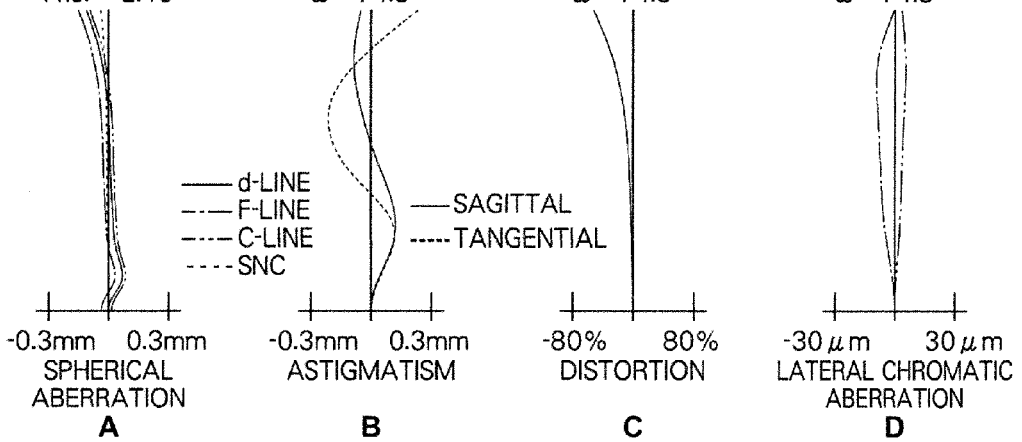

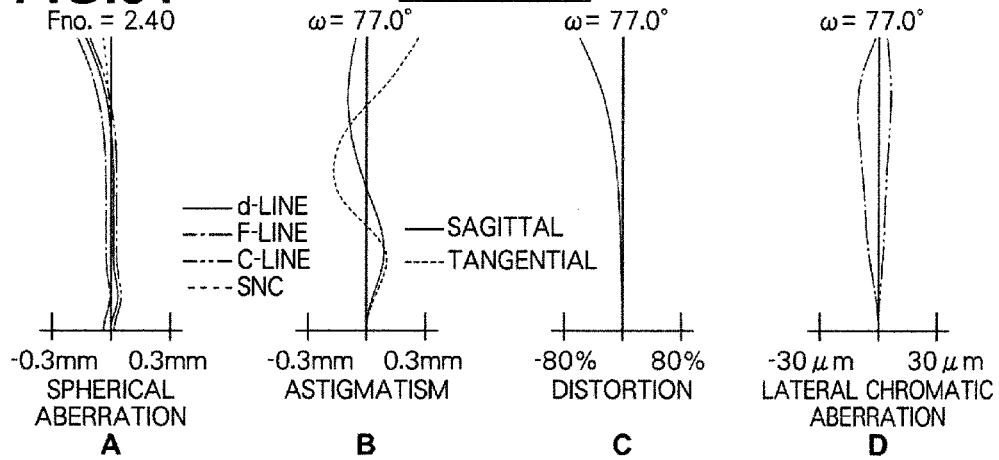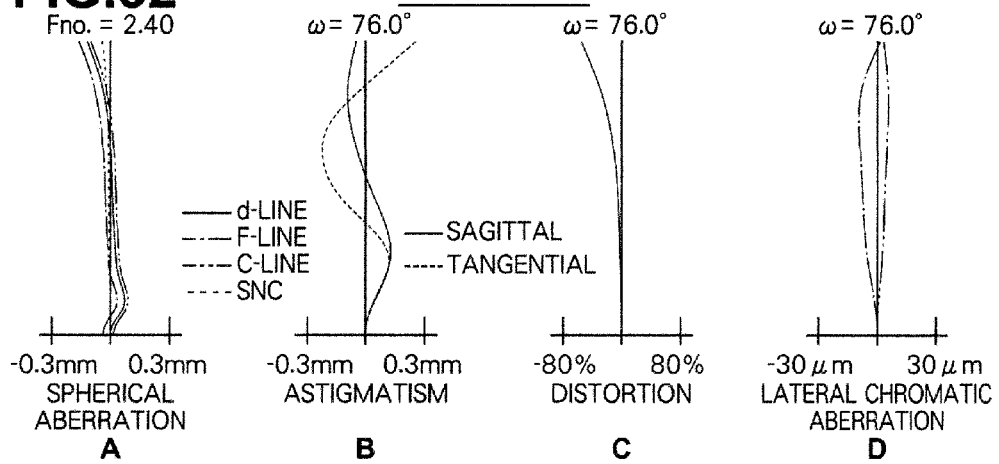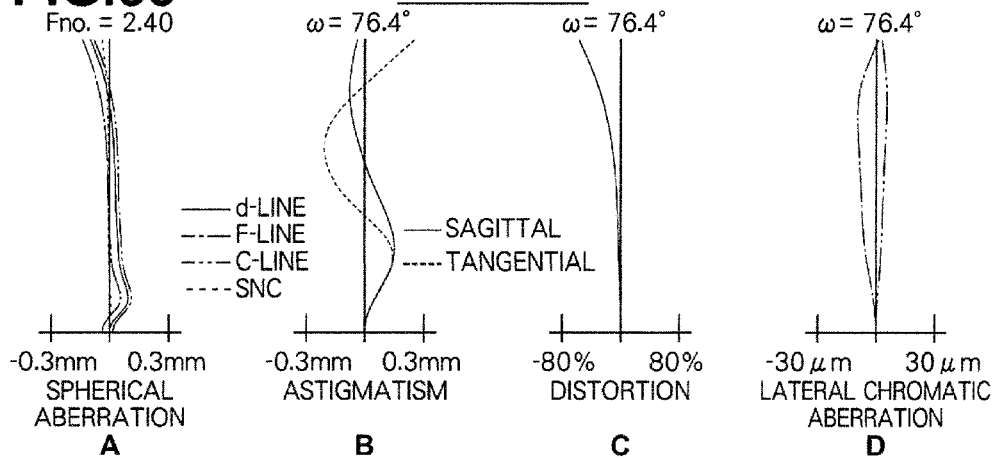

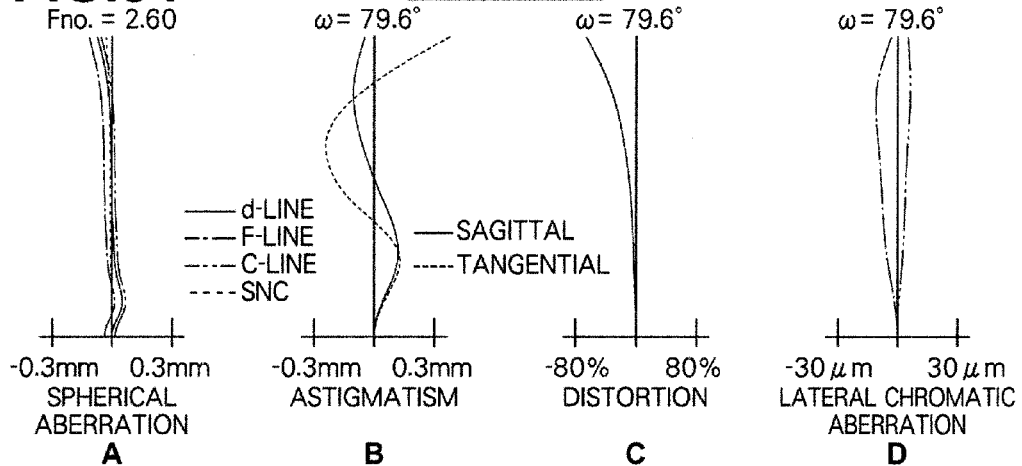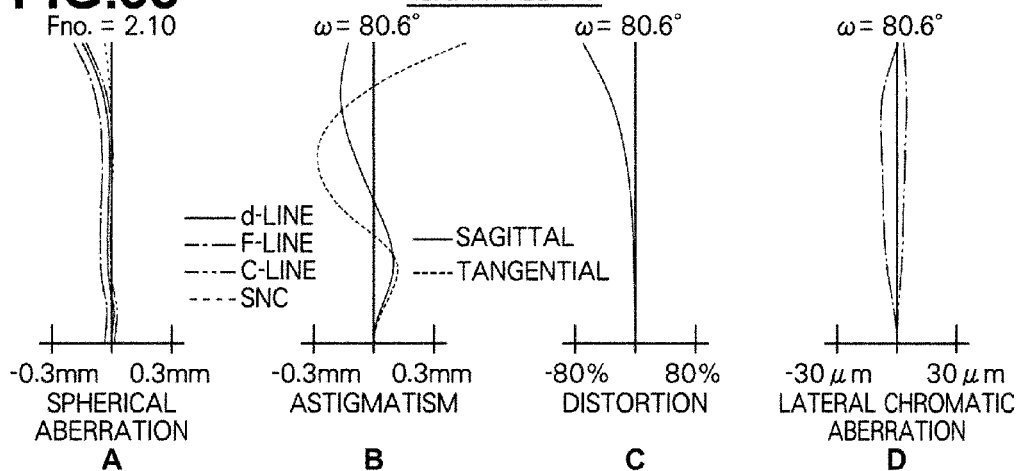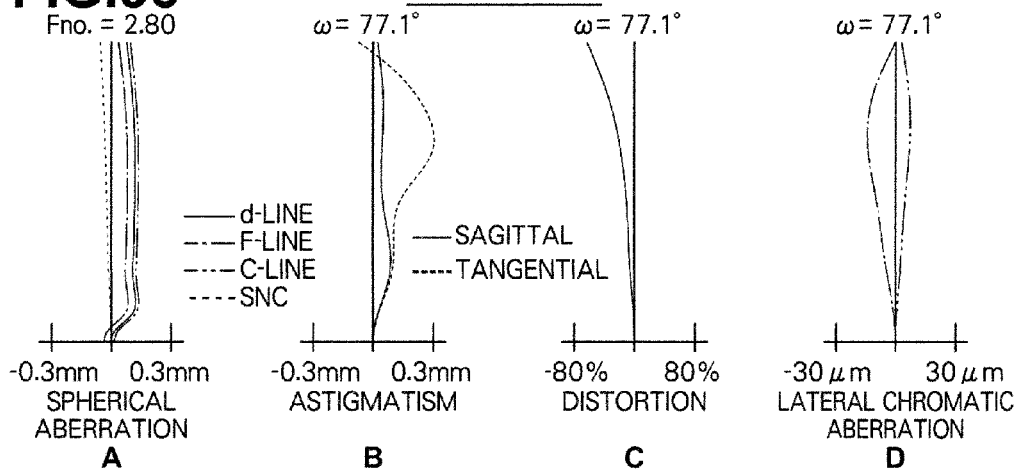

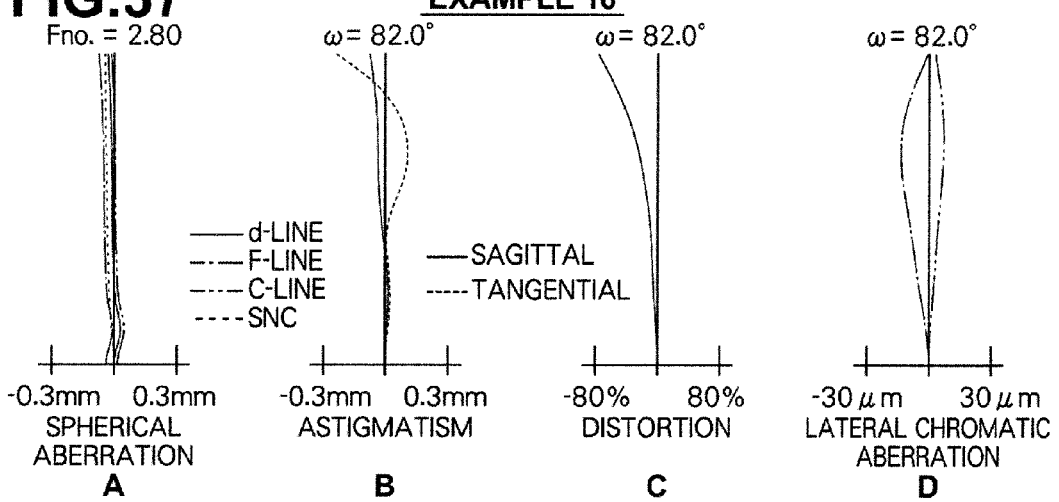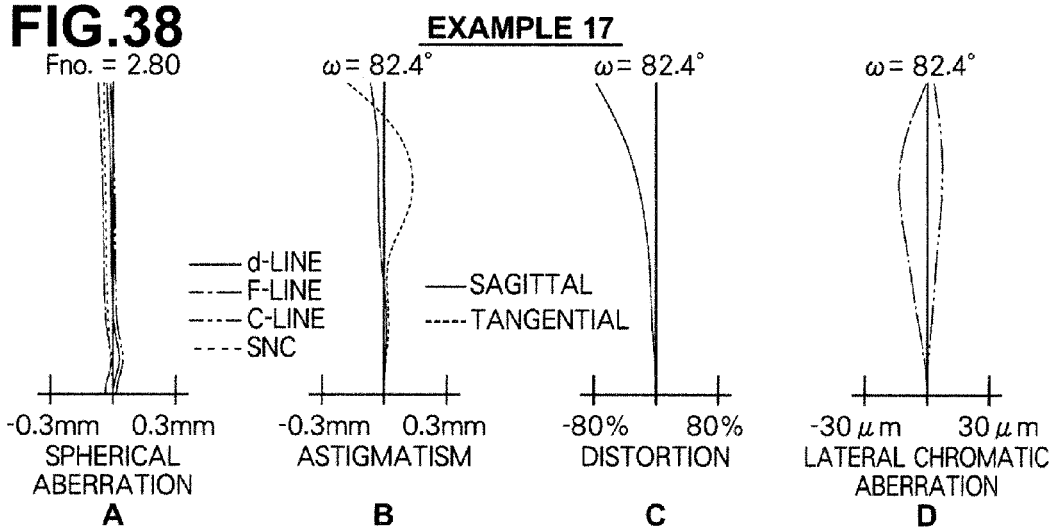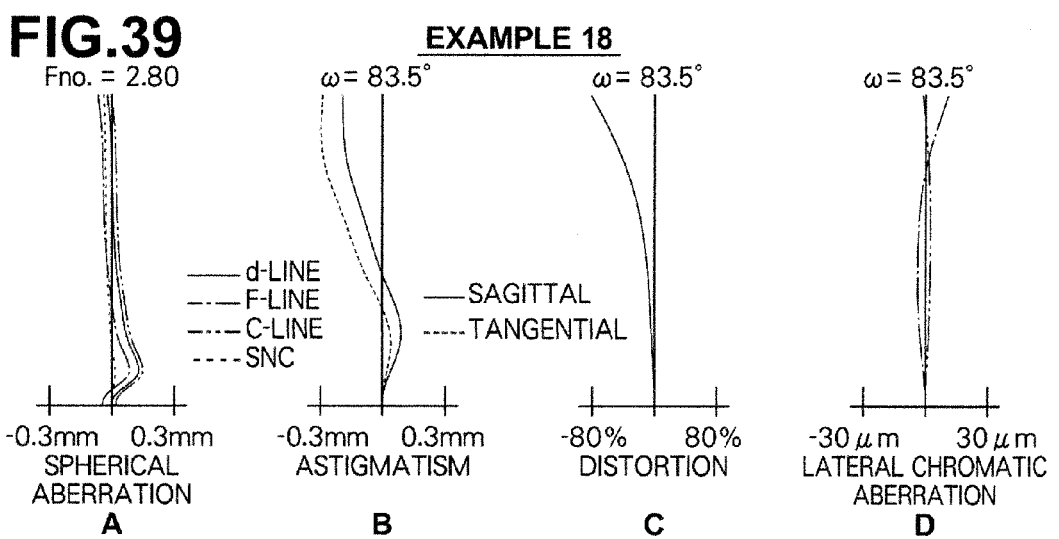

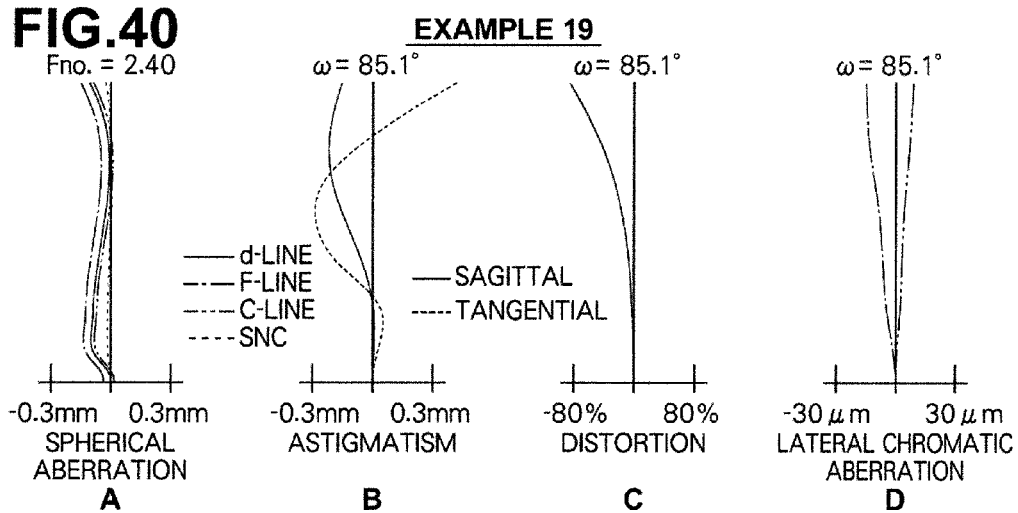
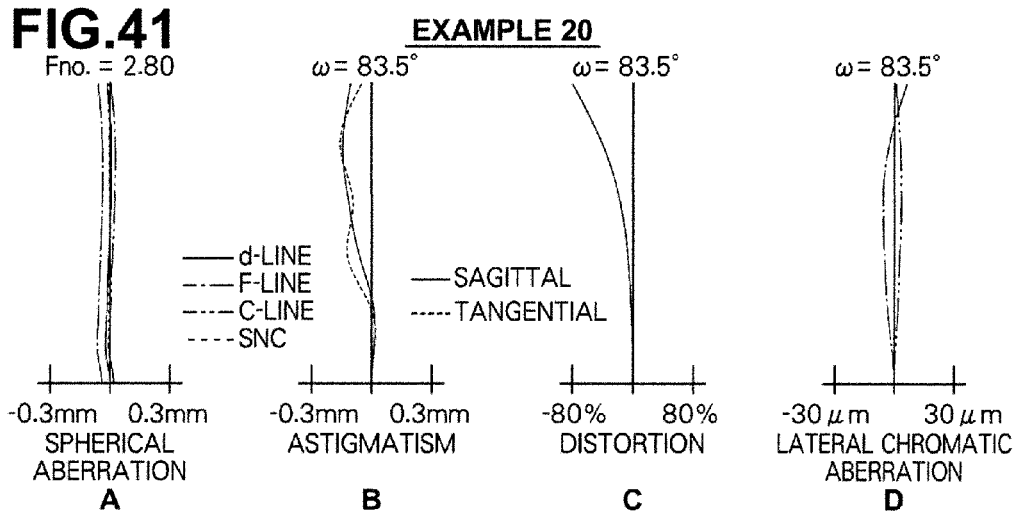

IMAGING LENS AND IMAGING APPARATUS

CROSS REFERENCE TO RELATED APPLICATIONS

This application is a continuation of International Application No. PCT/JP2011/006270 filed on Nov. 9, 2011, which claims priority to Japanese Application No. 2010-254694 filed on Nov. 15, 2010. The entire contents of each of the above identified applications are hereby incorporated by reference.

BACKGROUND OF THE INVENTION

1. Field of the Invention

The present invention relates to an imaging lens and an imaging apparatus. In particular, the present invention relates to an imaging lens appropriate for use in an in-vehicle camera, a camera for a mobile terminal, a surveillance camera, or the like using an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device, such as a CCD and a CMOS, became very small, and the resolution of the imaging device became very high. Consequently, the size of the body of imaging equipment including such an imaging device was reduced. Therefore, reduction in the size and the weight of an imaging lens mounted on the imaging equipment is also needed in addition to excellent optical performance. Meanwhile, lenses mounted on the in-vehicle camera, the surveillance camera and the like need to have excellent weather-resistance characteristics. Further, the lenses need to have wide angles of view, and to be structurable in a small size and at a low cost, and to have excellent performance.

As conventional imaging lenses having relatively small numbers of lenses in the aforementioned fields, imaging lenses disclosed, for example, in Japanese Unexamined Patent Publication No. 6 (1994)-34879 (Patent Document 1), Japanese Unexamined Patent Publication No. 2001-337268 (Patent Document 2), Japanese Unexamined Patent Publication No. 2005-181596 (Patent Document 3), Japanese Unexamined Patent Publication No. 2009-276679 (Patent Document 4), Japanese Unexamined Patent Publication No. 2010-231190 (Patent Document 5), and Japanese Unexamined Patent Publication No. 2008-102500 (Patent Document 6) are known. Patent Documents 1 through 6 disclose three-lens imaging lenses.

SUMMARY OF THE INVENTION

In recent years, requirements for lenses to be mounted on in-vehicle cameras, surveillance cameras, and the like became severer. There is a request for widening an angle of view more, for example, having a full angle of view exceeding 130° while satisfying the aforementioned requirements of small size, low cost, high performance, and the like. Further, in recent years, a lens is generally used in combination with an imaging device. Therefore, there is a demand for a lens system that is appropriate for use in combination with an imaging device. In such circumstances, a need for excellent correction of a lateral chromatic aberration, which tends to be a problem when an angle of view is widened or when a lens is used in combination with an imaging device, is rising.

The full angle of view of a lens system disclosed in Patent Document 1 is about 82° to 83°, which is not sufficiently wide. The size of a lens system disclosed in Patent Document 2 is not sufficiently small. The angle of view of a lens system disclosed in Patent Document 3 is not sufficiently wide. If the angle of view is tried to be widened, the size of the lens system becomes large, because a distance between a first lens and a second lens is too long. Hence, it is difficult to structure the lens system in a small size. In a lens system disclosed in Patent Document 4, the power of a second lens is weak, and a lateral chromatic aberration is insufficiently corrected. In a lens system disclosed in Patent Document 6, the object-side surface of a second lens is concave. However, when a lateral chromatic aberration is important, it is considered that the lens system in which the object-side surface of the second lens is convex is more advantageous.

In view of the foregoing circumstances, it is an object of the present invention to provide an imaging lens that can achieve a sufficiently wide angle of view while structuring the imaging lens in a small size and at a low cost, and which can correct a lateral chromatic aberration in an excellent manner, and which is appropriate for use in combination with an imaging device, and which has excellent optical performance. Further, it is another object of the present invention to provide an imaging apparatus including such an imaging lens.

A first imaging lens of the present invention is an imaging lens comprising:

a negative first lens having a concave image-side surface;

a positive second lens having a convex object-side surface in a paraxial region;

an aperture stop; and a positive third lens having a convex image-side surface in the paraxial region, which are arranged in this order from an object side, wherein the Abbe numbers of materials constituting the first lens and the third lens for d-line are greater than or equal to 40, and the Abbe number of a material constituting the second lens for d-line is less than or equal to 40, and wherein when the focal length of an entire system is f, and the center thickness of the second lens is D3, and the focal length of the first lens is f1, the following formulas (1') and (2) are satisfied:

$$1.7 < D3/f < 2.9 \quad (1'); \text{ and}$$

$$-5.0 < f1/f < -1.8 \quad (2).$$

A second imaging lens of the present invention is an imaging lens comprising:

a negative first lens having a concave image-side surface;

a positive second lens having a convex object-side surface in a paraxial region;

an aperture stop; and a positive third lens having a convex image-side surface in the paraxial region, which are arranged in this order from an object side, wherein the Abbe numbers of materials constituting the first lens and the third lens for d-line are greater than or equal to 40, and the Abbe number of a material constituting the second lens for d-line is less than or equal to 40, and wherein when the focal length of the first lens is f1, and the focal length of the second lens is f2, and the focal length of the third lens is f3, and the combined focal length of the second lens and the third lens is f23, the following formulas (3A) and (4) are satisfied:

$$3.0 < f2/f3 < 50.0 \quad (3A); \text{ and}$$

$$1.3 < |f1/f23| < 4.0 \quad (4).$$

A third imaging lens of the present invention is an imaging lens comprising:

a negative first lens having a concave image-side surface;
a positive second lens having a convex object-side surface in a paraxial region;
an aperture stop; and
a positive third lens having a convex image-side surface in the paraxial region, which are arranged in this order from an object side,
wherein the Abbe numbers of materials constituting the first lens and the third lens for d-line are greater than or equal to 40, and the Abbe number of a material constituting the second lens for d-line is less than or equal to 40, and the refractive index of the material constituting the second lens for d-line is greater than or equal to 1.62 and less than or equal to 1.8, and
wherein when the focal length of the second lens is f2, and the focal length of the third lens is f3, the following formula (3A) is satisfied:

$$3.0 < f2/f3 < 50.0 \qquad (3A).$$

Further, it is desirable that the first, second and third imaging lenses of the present invention satisfy the following formulas (2) and (5) through (12). As a desirable mode, the imaging lens may be structured in such a manner to satisfy one of the formulas (2) and (5) through (12). Alternatively, the imaging lens may be structured in such a manner to satisfy two or more arbitrary formulas in combination:

$$-5.0 < f1/f < -1.8 \qquad (2);$$
$$1.00 < f3/f < 2.50 \qquad (5);$$
$$2.0 < R3/f < 10.0 \qquad (6);$$
$$0.9 < D2/f < 2.5 \qquad (7);$$
$$0.4 < D1/f < 1.5 \qquad (8);$$
$$4.0 < |f12/f| < 50.0 \qquad (9);$$
$$4.0 < f2/f < 20.0 \qquad (10);$$
$$0.1 < |RX3|/R3 < 1.0 \qquad (11); \text{ and}$$
$$1.00 < f23/f < 1.85 \qquad (12), \text{ where}$$

f: the focal length of an entire system,
f1: the focal length of the first lens,
f2: the focal length of the second lens,
f3: the focal length of the third lens,
f12: the combined focal length of the first lens and the second lens,
f23: the combined focal length of the second lens and the third lens,
R3: the curvature radius of the object-side surface of the second lens in a paraxial region,
RX3: the curvature radius of the object-side surface of the second lens at an effective diameter edge,
D1: the center thickness of the first lens, and
D2: a distance in air between the first lens and the second lens on an optical axis.

In the first, second and third imaging lenses of the present invention, it is desirable that the lens system consists of only three lenses of the first lens, the second lens and the third lens.

In the first, second and third imaging lenses of the present invention, when a lens is an aspherical lens, the concave/convex shape of a surface, and the sign of refractive power (power) will be considered in a paraxial region unless otherwise noted. In the imaging lenses of the present invention, the sign of a curvature radius is positive when the shape of a surface is convex toward the object side, and the sign of a curvature radius is negative when the shape of a surface is convex toward the image side.

Here, the phrase "effective diameter of a surface" means the diameter of a circle composed of outermost points (points farthest from the optical axis) in the direction of the diameter when points at which all rays contributing to image formation and a lens surface intersect with each other are considered. Further, the term "effective diameter edge" means the outermost points. When a system is rotationally symmetric with respect to an optical axis, a figure composed of the outermost points is a circle. However, when a system is not rotationally symmetric, a figure composed of the outermost points is not a circle in some cases. In such a case, an equivalent circle may be considered, and the diameter of the circle may be regarded as an effective diameter. For example, the effective diameter may be determined based on the size of an imaging plane of an imaging device when a lens system is used in combination with an imaging device. When the imaging plane is a rectangle, for example, ½ of the diagonal length of the rectangle may be determined as the maximum image height.

An imaging apparatus of the present invention includes the aforementioned imaging lens of the present invention.

According to the first imaging lens of the present invention, the arrangement of power in the entire system, the shape of each lens, the position of an aperture stop, a material constituting each lens, and the like are appropriately set in the lens system of at least three lenses, and formulas (1') and (2) are satisfied. Therefore, it is possible to realize excellent correction of a lateral chromatic aberration, appropriateness for use in combination with an imaging device, and high optical performance while achieving a small size, a low cost, and a sufficiently wide angle of view.

According to the second imaging lens of the present invention, the arrangement of power in the entire system, the shape of each lens, the position of an aperture stop, a material constituting each lens, and the like are appropriately set in the lens system of at least three lenses, and formulas (3A) and (4) are satisfied. Therefore, it is possible to realize excellent correction of a lateral chromatic aberration, appropriateness of use in combination with an imaging device, and high optical performance while achieving a small size, a low cost, and a sufficiently wide angle of view.

According to the third imaging lens of the present invention, the arrangement of power in the entire system, the shape of each lens, the position of an aperture stop, a material constituting each lens, and the like are appropriately set in the lens system of at least three lenses, and formula (3A) is satisfied. Therefore, it is possible to realize excellent correction of a lateral chromatic aberration, appropriateness of use in combination with an imaging device, and high optical performance while achieving a small size, a low cost, and a sufficiently wide angle of view.

The imaging apparatus of the present invention includes the imaging lens of the present invention. Therefore, it is possible to structure the imaging apparatus in a small size and at a low cost. Further, the imaging apparatus has a sufficiently wide angle of view, and it is possible to obtain an excellent high-resolution image using an imaging device.

BRIEF DESCRIPTION OF THE DRAWINGS

FIG. 3 is a cross section illustrating the lens structure of an imaging lens in Example 2 of the present invention;

FIG. 4 is a cross section illustrating the lens structure of an imaging lens in Example 3 of the present invention;

FIG. 5 is a cross section illustrating the lens structure of an imaging lens in Example 4 of the present invention;

FIG. 6 is a cross section illustrating the lens structure of an imaging lens in Example 5 of the present invention;

FIG. 7 is a cross section illustrating the lens structure of an imaging lens in Example 6 of the present invention;

FIG. 8 is a cross section illustrating the lens structure of an imaging lens in Example 7 of the present invention;

FIG. 9 is a cross section illustrating the lens structure of an imaging lens in Example 8 of the present invention;

FIG. 10 is a cross section illustrating the lens structure of an imaging lens in Example 9 of the present invention;

FIG. 11 is a cross section illustrating the lens structure of an imaging lens in Example 10 of the present invention;

FIG. 12 is a cross section illustrating the lens structure of an imaging lens in Example 11 of the present invention;

FIG. 13 is a cross section illustrating the lens structure of an imaging lens in Example 12 of the present invention;

FIG. 14 is a cross section illustrating the lens structure of an imaging lens in Example 13 of the present invention;

FIG. 15 is a cross section illustrating the lens structure of an imaging lens in Example 14 of the present invention;

FIG. 16 is a cross section illustrating the lens structure of an imaging lens in Example 15 of the present invention;

FIG. 17 is a cross section illustrating the lens structure of an imaging lens in Example 16 of the present invention;

FIG. 18 is a cross section illustrating the lens structure of an imaging lens in Example 17 of the present invention;

FIG. 21 is a cross section illustrating the lens structure of an imaging lens in Example 20 of the present invention;

FIG. 22, Sections A through D are diagrams illustrating aberrations of the imaging lens in Example 1 of the present invention;

FIG. 23, Sections A through D are diagrams illustrating aberrations of the imaging lens in Example 2 of the present invention;

FIG. 24, Sections A through D are diagrams illustrating aberrations of the imaging lens in Example 3 of the present invention;

FIG. 25, Sections A through D are diagrams illustrating aberrations of the imaging lens in Example 4 of the present invention;

FIG. 26, Sections A through D are diagrams illustrating aberrations of the imaging lens in Example 5 of the present invention;

FIG. 27, Sections A through D are diagrams illustrating aberrations of the imaging lens in Example 6 of the present invention;

FIG. 28, Sections A through D are diagrams illustrating aberrations of the imaging lens in Example 7 of the present invention;

FIG. 29, Sections A through D are diagrams illustrating aberrations of the imaging lens in Example 8 of the present invention;

FIG. 30, Sections A through D are diagrams illustrating aberrations of the imaging lens in Example 9 of the present invention;

FIG. 31, Sections A through D are diagrams illustrating aberrations of the imaging lens in Example 10 of the present invention;

FIG. 32, Sections A through D are diagrams illustrating aberrations of the imaging lens in Example 11 of the present invention;

FIG. 33, Sections A through D are diagrams illustrating aberrations of the imaging lens in Example 12 of the present invention;

FIG. 34, Sections A through D are diagrams illustrating aberrations of the imaging lens in Example 13 of the present invention;

FIG. 35, Sections A through D are diagrams illustrating aberrations of the imaging lens in Example 14 of the present invention;

FIG. 36, Sections A through D are diagrams illustrating aberrations of the imaging lens in Example 15 of the present invention;

FIG. 37, Sections A through D are diagrams illustrating aberrations of the imaging lens in Example 16 of the present invention;

FIG. 38, Sections A through D are diagrams illustrating aberrations of the imaging lens in Example 17 of the present invention;

FIG. 39, Sections A through D are diagrams illustrating aberrations of the imaging lens in Example 18 of the present invention;

FIG. 40, Sections A through D are diagrams illustrating aberrations of the imaging lens in Example 19 of the present invention;

FIG. 41, Sections A through D are diagrams illustrating aberrations of the imaging lens in Example 20 of the present invention.

DESCRIPTION OF THE PREFERRED EMBODIMENTS

Figure 1:
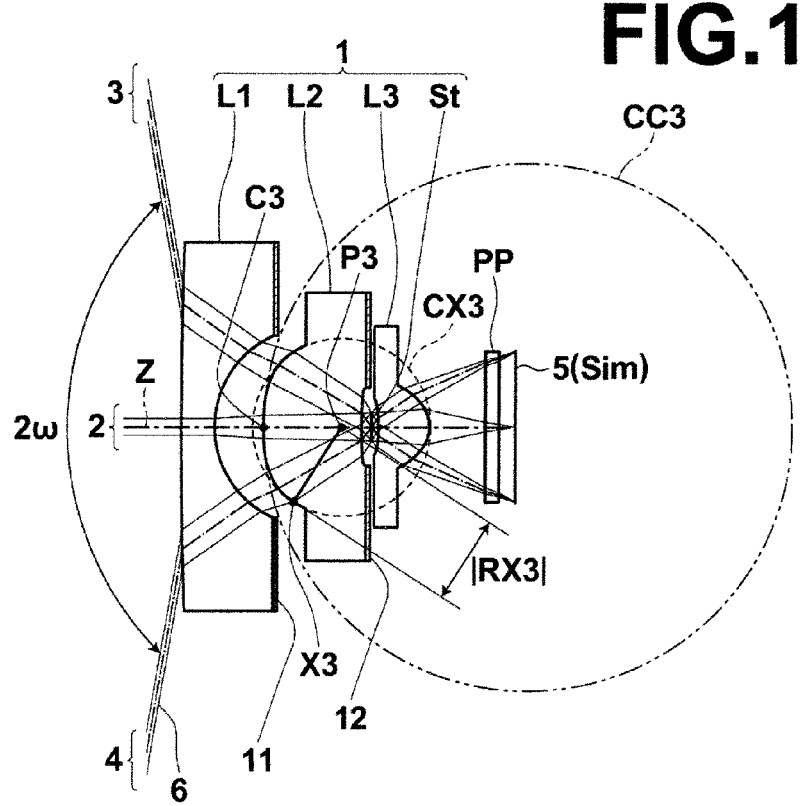
FIG. 1 is a diagram illustrating the structure of an imaging lens according to an embodiment of the present invention, and optical paths.
Figure 2:
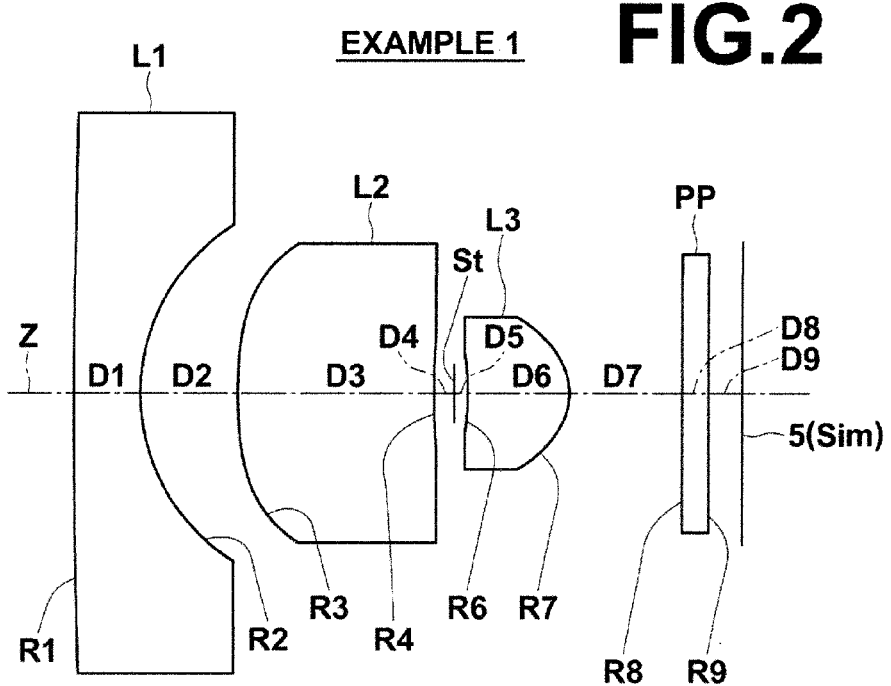
FIG. 2 is a cross section illustrating the lens structure of an imaging lens in Example 1 of the present invention.
Figure 19:
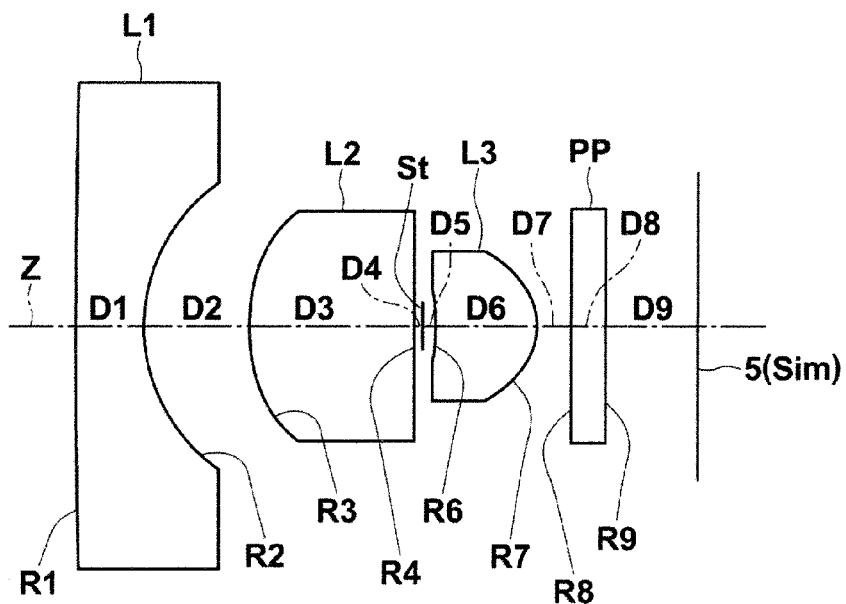
FIG. 19 is a cross section illustrating the lens structure of an imaging lens in Example 18 of the present invention.
Figure 20:
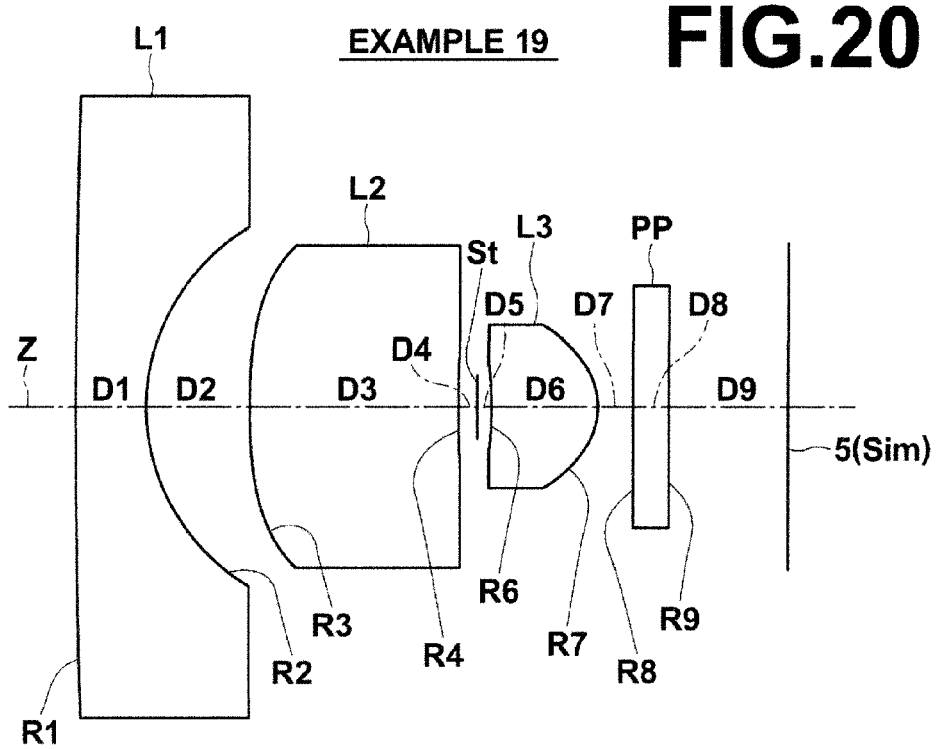
FIG. 20 is a cross section illustrating the lens structure of an imaging lens in Example 19 of the present invention.

Hereinafter, embodiments of the present invention will be described with reference to drawings. First, an imaging lens according to an embodiment of the present invention will be described with reference to FIG. 1. FIG. 1 is a lens cross section of an imaging lens 1 according to an embodiment of the present invention. Further, FIG. 1 illustrates axial rays 2 from an object point at infinity, and off-axial rays 3, 4 at full angle of view 2ω. In FIG. 1, the left side is the object side and the right side is the image side.

In FIG. 1, a case of applying the imaging lens 1 to an imaging apparatus is considered, and an imaging device 5 arranged at image plane Sim of the imaging lens 1 is also illustrated. In FIG. 1, the imaging device is illustrated in a simplified manner. However, in actual cases, the imaging device 5 is arranged in such a manner that the imaging plane of the imaging device 5 is located at the position of the image plane Sim. The imaging device 5 images an optical image formed by the imaging lens 1, and converts the optical image into electrical signals. For example, a CCD image sensor, a CMOS image sensor, or the like may be used as the imaging device 5.

When the imaging lens 1 is applied to an imaging apparatus, it is desirable to set a cover glass or various filters, such as a low-pass filter and an infrared ray cut filter, depending on the structure of a camera on which the lens is mounted. FIG. 1 illustrates a case of arranging a parallel-flat-plate-shaped optical member PP, which is assumed to be such elements, between the most-image-side lens and the imaging device 5 (image plane Sim). Especially when the imaging lens 1 is used together with the imaging device 5, the cover glass and various filters are arranged between the lens system and the image plane Sim in many cases. Therefore, the lens system needs to have a sufficient back focus for arranging these elements.

The imaging lens 1 includes, as basic structure, a negative first lens L1 having a concave image-side surface, a positive second lens L2 having a convex object-side surface in a paraxial region, an aperture stop St, and a positive third lens L3 having a convex image-side surface in the paraxial region, which are arranged in this order from an object side along optical axis Z. The imaging lens 1 is structured in such a manner that the Abbe numbers of materials constituting the first lens L1 and the third lens L3 for d-line are greater than or equal to 40, and that the Abbe number of a material constituting the second lens L2 for d-line is less than or equal to 40.

In FIG. 1, the aperture stop St does not represent the shape nor the size of the aperture stop St but the position of the aperture stop St on the optical axis Z.

The number of lenses constituting the imaging lens 1 is at least three, which is a small number. Therefore, it is possible to produce a lens system in a small size and at a low cost. When the first lens L1 located on the most object side is a negative lens having a concave image-side surface, it is possible to advantageously widen the angle of view of the lens system. It is desirable that the first lens L1 has a negative meniscus shape having a concave image-side surface. When the first lens L1 is structured in such a manner, it is possible to receive rays in a wide angle of view. That is more advantageous to widen the angle of view, and it is possible to correct distortion in an excellent manner.

When the Abbe number of the material constituting the first lens L1 for d-line is greater than or equal to 40, it is possible to suppress generation of a chromatic aberration of the lens system, especially a lateral chromatic aberration, to a usable level, and to obtain excellent resolution performance. It is more desirable that the Abbe number of the material constituting the first lens L1 for d-line is greater than or equal to 45. It is even more desirable that the Abbe number is greater than or equal to 48.

When the power of the second lens L2 arranged on the object side of the aperture stop St is positive, and the Abbe number of the material of the second lens L2 for d-line is less than or equal to 40, it is possible to correct a lateral chromatic aberration in an excellent manner. It is desirable that the second lens L2 has a double convex shape in a paraxial region. In such a case, it is possible to correct a lateral chromatic aberration, and curvature of field in a more excellent manner. The second lens L2 may be a positive meniscus lens having a convex object-side surface in the paraxial region.

It is more desirable that the Abbe number of the material constituting the second lens L2 for d-line is less than or equal to 30. It is even more desirable that the Abbe number is less than or equal to 26, and it is still even more desirable that the Abbe number is less than or equal to 24.

When the third lens L3 is a positive lens having a convex image-side surface in the paraxial region, it is possible to correct curvature of field and a spherical aberration in an excellent manner. It is desirable that the third lens L3 has a positive meniscus shape having a convex image-side surface in the paraxial region. In such a case, it is possible correct curvature of field and a spherical aberration in a more excellent manner.

When the Abbe number of the material constituting the third lens L3 for d-line is greater than or equal to 40, it is possible to suppress generation of a chromatic aberration of the lens system, especially a lateral, chromatic aberration, to a usable level, and to obtain excellent resolution performance. It is more desirable that the Abbe number of the material constituting the third lens L3 for d-line is greater than or equal to 45. It is even more desirable that the Abbe number is greater than or equal to 50. It is still even more desirable that the Abbe number is greater than or equal to 55.

When the lenses on both sides of the aperture stop St are positive lenses, and the object-side surface of the second lens L2 on the object side of the aperture stop St is convex in the paraxial region, and the image-side surface of the third lens L3 on the image side of the aperture stop St is convex in the paraxial region, the symmetric characteristics are improved, and correction of a coma aberration and a lateral chromatic aberration becomes easy.

The imaging lens 1 of the present embodiment illustrated in FIG. 1 includes first, second and third modes, which will be described next, in addition to the aforementioned basic structure. The first mode satisfies the following formulas (1) and (2) when the focal length of an entire system is f, and the center thickness of the second lens L2 is D3, and the focal length of the first lens L1 is f1:

$$1.4 < D3/f < 2.9 \qquad (1); \text{ and}$$

$$-5.0 < f1/f < -1.8 \qquad (2).$$

When the value exceeds the upper limit of the formula (1), the center thickness of the second lens L2 becomes too thick, and it becomes difficult to reduce the size. When the value is lower than the lower limit of the formula (1), the center thickness of the second lens L2 becomes too thin, and it becomes difficult to separate axial rays and peripheral rays from each other on the object-side surface of the second lens L2. Therefore, it becomes difficult to correct a lateral chromatic aberration, and curvature of field. Further, if the power of the second lens L2 is increased to correct a lateral chromatic aberration, it becomes difficult to widen an angle of view.

When the value exceeds the upper limit of the formula (2), the power of the first lens L1 becomes too strong. Although it is easy to widen the angle of view, distortion becomes large because peripheral rays are sharply bent. A peripheral image is reduced to a small size on an imaging device, and even if the image is enlarged by image processing, the image deteriorates. When the value is lower than the lower limit of the formula (2), the power of the first lens L1 becomes too weak, and it becomes difficult to widen an angle of view, or it becomes necessary to weaken the power of the second lens L2 to widen the angle of view. Therefore, it is difficult to correct a lateral chromatic aberration.

The second mode satisfies the following formulas (3A) and (4) when the focal length of the first lens L1 is f1, and the focal length of the second lens L2 is f2, and the focal, length of the third lens L3 is f3, and the combined focal length of the second lens L2 and the third lens L3 is f23:

$$3.0 < f2/f3 < 50.0 \qquad (3A); \text{ and}$$

$$1.3 < |f1/f23| < 4.0 \qquad (4).$$

The formula (3A) is related to a ratio of the powers of two positive lenses included in the imaging lens 1. When the value exceeds the upper limit of the formula (3A), the power of the second lens L2 becomes too weak, and it becomes difficult to correct a lateral chromatic aberration, or the power of the third lens L3 becomes too strong, and the back focus becomes too short. Consequently, it becomes difficult to arrange a cover glass and various filters between the lens system and the imaging device 5. When the value is lower than the lower limit of the formula (3A), the power of the second lens L2 becomes too strong. It is possible to correct a lateral chromatic aberration in an excellent manner, but it becomes difficult to widen the angle of view of the lens system.

The formula (4) is related to a ratio of the powers of a negative lens and a positive lens included in the imaging lens 1. When the value exceeds the upper limit of the formula (4), the negative power of the first lens L1 becomes weak, and it becomes difficult to widen an angle of view, or the combined power of the second lens L2 and the third lens L3 becomes too strong, and a back focus becomes too short. When the value is lower than the lower limit of the formula (4), it is easy to widen an angle of view. However, the combined power of the second lens L2 and the third lens L3 becomes too weak, and it becomes difficult to correct a spherical aberration, and a lateral chromatic aberration.

In the third mode, the refractive index of the material constituting the second lens L2 for d-line is greater than or equal to 1.6 and less than or equal to 1.8, and the third mode satisfies the following formula (3B) when the focal length of the second lens L2 is f2, and the focal length of the third lens L3 is f3:

$$2.0 < f2/f3 < 50.0 \quad (3B).$$

When the refractive index of the material constituting the second lens L2 for d-line is greater than or equal to 1.6, it is possible to increase the power of the second lens L2, and it becomes easy to widen an angle of view and to correct a lateral chromatic aberration. When the refractive index of the material constituting the second lens L2 for d-line is less than or equal to 1.8, it is possible to suppress the cost of the material.

If the value exceeds the upper limit of the formula (3B), the power of the second lens L2 becomes too weak, and it becomes difficult to correct a lateral chromatic aberration, or the power of the third lens L3 becomes too strong, and a back focus becomes too short. Consequently, it becomes difficult to arrange a cover glass and various filters between the lens system and the imaging device 5. Under the condition that the refractive index of the material constituting the second lens L2 for d-line is greater than or equal to 1.6 and less than or equal to 1.8, if the value is lower than the lower limit of the formula (3B), the power of the second lens L2 becomes too strong. Although it is possible to correct a lateral chromatic aberration in an excellent manner, it becomes difficult to widen the angle of view of the lens system.

Here, an imaging lens having one of the first, second and third modes may also have the structure of another one of the modes. Further, it is desirable that the imaging lenses having the first, second and third modes have the following structures. As a desirable mode, one of the following structures may be included, or two or more arbitrary structures in combination may be included.

When the focal length of an entire system is f, and the focal length of the third lens L3 is f3, it is desirable that the following formula (5) is satisfied:

$$1.00 < f3/f < 2.50 \quad (5).$$

When the value exceeds the upper limit of the formula (5), the power of the third lens L3 becomes too weak, and it becomes difficult to correct a spherical aberration and curvature of field, or it becomes impossible to suppress an incident angle at which peripheral rays enter the imaging device 5. Therefore, it becomes difficult to produce a lens having excellent telecentric characteristics. If the value is lower than the lower limit of the formula (5), the power of the third lens L3 becomes too strong, and it becomes difficult to provide a long back focus. Therefore, an adoptable imaging device 5 is limited, or it becomes difficult to insert various filters or the like between the lens system and the imaging device 5.

When the focal length of an entire system is f, and the focal length of the first lens L1 is f1, it is desirable that the following formula (2) is satisfied:

$$-5.0 < f1/f < -1.8 \quad (2).$$

When the value exceeds the upper limit of the formula (2), the power of the first lens L1 becomes too strong. Although it is easy to widen the angle of view, distortion becomes large because peripheral rays are sharply bent. Further, a peripheral image is reduced to a small size on an imaging device, and even if the image is enlarged by image processing, the image deteriorates. When the value is lower than the lower limit of the formula (2), the power of the first lens L1 becomes too weak, and it becomes difficult to widen an angle of view, or it is necessary to weaken the power of the second lens L2 to widen the angle of view. Therefore, it becomes difficult to correct a lateral chromatic aberration.

When the focal length of an entire system is f, and the curvature radius of the object-side surface of the second lens L2 in a paraxial region is R3, it is desirable that the following formula (6) is satisfied:

$$2.0 < R3/f < 10.0 \quad (6).$$

When the value exceeds the upper limit of the formula (6), the curvature radius of the object-side surface of the second lens L2 in a paraxial region becomes too large, and it becomes difficult to correct a lateral chromatic aberration. When the value is lower than the lower limit of the formula (6), the curvature radius of the object-side surface of the second lens L2 in a paraxial region becomes too small. Although it is possible to correct a lateral chromatic aberration in an excellent manner, it becomes difficult to sharply bend peripheral rays on the object-side surface of the second lens L2. Therefore, it becomes difficult to widen an angle of view.

When the focal length of an entire system is f, and a distance in air between the first lens L1 and the second lens L2 on an optical axis is D2, it is desirable that the following formula (7) is satisfied:

$$0.9 < D2/f < 2.5 \quad (7).$$

When the value exceeds the upper limit of the formula (7), a distance between the first lens L1 and the second lens L2 becomes too long. Although it is easy to widen an angle of view, the diameter of the first lens L1 becomes large, and it becomes difficult to reduce the size of the lens system. When the value is lower than the lower limit of the formula (7), the distance between the first lens L1 and the second lens L2 becomes too short. Therefore, it becomes difficult to widen an angle of view, and separation of peripheral rays and axial rays from each other at the first lens L1 becomes insufficient. Hence, it becomes difficult to correct curvature of field and distortion.

Here, it is desirable that the distance D2 in air between the first lens L1 and the second lens L2 on the optical axis is less than or equal to 2.0 mm. When D2 is less than or equal to 2.0 mm, it is possible to reduce the size of the lens system.

When the focal length of an entire system is f, and the center thickness of the first lens L1 is D1, it is desirable that the following formula (8) is satisfied:

$$0.4 < D1/f < 1.5 \quad (8).$$

When the value exceeds the upper limit of the formula (8), the first lens L1 becomes too thick, and the size of the lens system in the diameter direction becomes large as well as the size of the lens system in the optical axis direction. Therefore, it becomes difficult to reduce the size of the lens system. When the value is lower than the lower limit of the formula (8), the first lens L1 becomes thin, and easily breakable. For example, when the lens is used as an in-vehicle lens or a lens for a surveillance camera, resistance to various kinds of shock is required. Therefore, it is desirable that the first lens L1 is strong against shock.

It is desirable that D1 is greater than or equal to 0.7 mm to increase the resistance of the first lens L1 to various kinds of shock. It is more desirable that D1 is greater than or equal to 0.8 mm, and it is even more desirable that D1 is greater than or equal to 1.0 mm.

When the focal length of an entire system is f, and the combined focal length of the first lens L1 and the second lens L2 is f12, it is desirable that the following formula (9) is satisfied:

$$4.0 < |f12/f| < 50.0 \qquad (9).$$

When the value exceeds the upper limit of the formula (9), the combined power of the first lens L1 and the second lens L2 becomes weak, and it becomes difficult to widen an angle of view. When the value is lower than the lower limit of the formula (9), the combined power of the first lens L1 and the second lens L2 becomes strong. Although it is easy to widen the angle of view, the negative power of the first lens L1 becomes strong, and it becomes difficult to correct a lateral chromatic aberration. Further, it becomes difficult to correct curvature of field.

It is desirable that the combined focal length f12 of the first lens L1 and the second lens L2 is a negative value. When f12 is a positive value, the positive power of the second lens L2 becomes too strong, and it becomes difficult to widen an angle of view.

When the focal length of an entire system is f, and the focal length of the second lens L2 is f2, it is desirable that the following formula (10) is satisfied:

$$4.0 < f2/f < 20.0 \qquad (10).$$

When the value exceeds the upper limit of the formula (10), the power of the second lens L2 becomes weak, and it becomes difficult to correct a lateral chromatic aberration. When the value is lower than the lower limit of the formula (10), the power of the second lens L2 becomes strong. Although it is easy to correct a lateral chromatic aberration, it becomes difficult to widen an angle of view.

When the curvature radius of the object-side surface of the second lens L2 in the paraxial region is R3, and the absolute value of the curvature radius of the object-side surface of the second lens L2 at an effective diameter edge is |RX3|, it is desirable that the following formula (11) is satisfied:

$$0.1 < |RX3|/R3 < 1.0 \qquad (11).$$

RX3 will be described later in detail.

When the value exceeds the upper limit of the formula (11), the absolute value of the curvature radius of the object-side surface of the second lens L2 at an effective diameter edge becomes large, and it becomes difficult to correct curvature of field. When the value is lower than the lower limit of the formula (11), the absolute value of the curvature radius of the object-side surface of the second lens L2 at an effective diameter edge becomes too small. Since an angle formed by a ray and a normal to a surface at the effective diameter edge becomes small, it becomes difficult to sharply bend the ray. Therefore, it becomes difficult to widen an angle of view.

When the focal length of an entire system is f, and the combined focal length of the second lens L2 and the third lens L3 is f23, it is desirable that the following formula (12) is satisfied:

$$1.00 < f23/f < 1.85 \qquad (12).$$

When the value exceeds the upper limit of the formula (12), the combined power of the second lens L2 and the third lens L3 becomes weak, and it becomes difficult to correct a lateral chromatic aberration and curvature of field. When the value is lower than the lower limit of the formula (12), the power of the second lens L2 becomes too strong, and it becomes difficult to widen the angle of view of the lens system, or the power of the third lens L3 becomes too strong, and a back focus becomes too short. Therefore, it becomes difficult to arrange various filters between the lens system and the imaging device 5.

When the curvature radius of the object-side surface of the second lens L2 in the paraxial region is R3, and the curvature radius of the image-side surface of the second lens L2 in the paraxial region is R4, it is desirable that the following formula (13) is satisfied. When the value is lower than the lower limit of the formula (13), the image-side surface of the second lens L2 in the paraxial region becomes concave, and it becomes difficult to correct a lateral chromatic aberration.

$$-1.00 < (R3+R4)/(R3-R4) \qquad (13).$$

When the focal length of an entire system is f, and a length from the object-side surface of the first lens L1 to image plane Sim is L, it is desirable that the following formula (14) is satisfied:

$$5.0 < L/f < 10.0 \qquad (14).$$

Here, when L is calculated, a back focus portion is a length in air. Specifically, when a cover glass, filters or the like are present between the most-image-side lens and the image plane Sim, the thickness of the cover glass or filter is a length in air.

When the value exceeds the upper limit of the formula (14), it is easy to widen an angle of view. However, the size of the lens system becomes large. When the value is lower than the lower limit of the formula (14), it is possible to reduce the size of the lens system, but it is difficult to widen an angle of view.

Further, with respect to each of the aforementioned formulas, it is more desirable to satisfy the following ranges, in which the lower limits and the upper limits are modified. As a desirable mode, a formula composed of a combination of a modified lower limit value and a modified upper limit value, which will be described below, may be satisfied.

As a modified value of the lower limit of the formula (1), 1.6 is desirable, and 1.7 is more desirable, and 1.8 is even more desirable. As a modified value of the upper limit of the formula (1), 2.7 is desirable, and 2.6 is more desirable, and 2.5 is even more desirable.

As a modified value of the lower limit of the formula (2), −4.5 is desirable, and −3.8 is more desirable, and −3.5 is even more desirable. As a modified value of the upper limit of the formula (2), −2.5 is desirable, and −2.8 is more desirable.

As a modified value of the lower limit of the formula (3A), 3.5 is desirable, and 3.8 is more desirable. As a modified value of the upper limit of the formula (3A), 10.0 is desirable, and 9.0 is more desirable, and 6.0 is even more desirable.

As a modified value of the lower limit of the formula (3B), 3.0 is desirable, and 3.5 is more desirable, and 3.8 is even more desirable. As a modified value of the upper limit of the formula (3B), 10.0 is desirable, and 9.0 is more desirable, and 6.0 is even more desirable.

As a modified value of the lower limit of the formula (4), 1.5 is desirable, and 1.6 is more desirable. As a modified value of the upper limit of the formula (4), 3.0 is desirable, and 2.2 is more desirable.

As a modified value of the lower limit of the formula (5), 1.3 is desirable, and 1.45 is more desirable, and 1.51 is even more desirable. As a modified value of the upper limit of the formula (5), 1.8 is desirable, and 1.7 is more desirable.

As a modified value of the lower limit of the formula (6), 2.5 is desirable, and 3.5 is more desirable, and 4.5 is even more desirable. As a modified value of the upper limit of the formula (6), 9.5 is desirable, and 9.2 is more desirable.

As a modified value of the lower limit of the formula (7), 1.0 is desirable, and 1.1 is more desirable. As a modified value of the upper limit of the formula (7), 2.0 is desirable, and 1.6 is more desirable.

As a modified value of the lower limit of the formula (8), 0.6 is desirable. As a modified value of the upper limit of the formula (8), 1.0 is desirable.

As a modified value of the lower limit of the formula (9), 6.5 is desirable, and 7.5 is more desirable. As a modified value of the upper limit of the formula (9), 20.0 is desirable, and 10.0 is more desirable.

As a modified value of the lower limit of the formula (10), 5.0 is desirable, and 5.5 is more desirable. As a modified value of the upper limit of the formula (10), 10.0 is desirable, and 9.6 is more desirable.

As a modified value of the lower limit of the formula (11), 0.2 is desirable, and 0.24 is more desirable. As a modified value of the upper limit of the formula (11), 0.8 is desirable, and 0.50 is more desirable.

As a modified value of the lower limit of the formula (12), 1.60 is desirable. As a modified value of the upper limit of the formula (12), 1.83 is desirable, and 1.80 is more desirable.

It is desirable that the lower limit of (R3+R4)/(R3−R4) in the formula (13) is −0.85, and −0.80 is more desirable, and −0.77 is even more desirable. Further, it is desirable that the upper limit of (R3+R4)/(R3−R4) in the formula (13) is −0.05. If the value exceeds −0.05, the curvature radius of the object-side surface of the second lens L2 in a paraxial region becomes large, and it becomes difficult to correct a lateral chromatic aberration, or the curvature radius of the image-side surface of the second lens L2 in the paraxial region becomes small, in other words, the curvature radius of the image-side surface of the second lens L2 in the paraxial region becomes a negative value the absolute value of which is large. Therefore, it becomes difficult to widen an angle of view and to correct curvature of field. It is more desirable that the upper limit of (R3+R4)/(R3−R4) in the formula (13) is −0.10, and −0.15 is even more desirable.

As a modified value of the lower limit of the formula (14), 6.0 is desirable, and 7.0 is more desirable, and 7.2 is even more desirable. As a modified value of the upper limit of the formula (14), 9.0 is desirable, and 8.5 is more desirable, and 8.2 is even more desirable.

It is desirable that length L from the object-side surface of the first lens L1 to image plane Sim (a back focus portion is a length in air) is less than or equal to 11.0 mm. When L is less than or equal to 11.0 mm, it is possible to reduce the size of the lens system. It is more desirable that L is less than or equal to 10.5 mm. Then, it is possible to further reduce the size of the lens system. Further, it is even more desirable that L is less than or equal to 10.0 mm. Then, it is possible to even further reduce the size of the lens system.

When a length from the image-side surface of the most-image-side lens to the image plane Sim, in other words, back focus is Bf, it is desirable that Bf is greater than or equal to 2.0 mm. Here, Bf is a length in air. In other words, when a cover glass, a filter or the like is present between the most-image-side lens and the image plane Sim, an air-converted value is used for the thickness of the cover glass and the filter.

When Bf is greater than or equal to 2.0 mm, it is possible to keep a long distance between the lens system and the imaging device 5. Therefore, it is possible to select the imaging device from a wider range. Further, it is easy to arrange various filters, a cover glass or the like between the lens system and the imaging device. It is more desirable that Bf is greater than or equal to 2.2 mm, and it is even more desirable that Bf is greater than or equal to 2.3 mm.

When the focal length of an entire system is f, and a length from the image-side surface of the most-image-side lens to the image plane Sim is Bf, it is desirable that Bf is 1.5 times as large as f or greater. When Bf is 1.5 times as large as f or greater, it is possible to keep a long distance between the lens system and the imaging device. Therefore, it is possible to select the imaging device from a wider range. Further, it is easy to arrange various filters, a cover glass or the like between the lens system and the imaging device. It is more desirable that Bf is 1.8 times as large as f or greater.

Here, it is desirable that Bf is 2.5 times as large as f or less to reduce the size of the lens system. It is more desirable that Bf is 2.2 times as large as f or less, and it is even more desirable that Bf is 2.1 times as large as f or less.

It is desirable that the object-side surface of the second lens L2 is aspheric. It is desirable that the object-side surface of the second lens L2 has positive power at the center, and a shape in which the positive power is stronger at an effective diameter edge, compared with the center. When the object-side surface of the second lens L2 has such a shape, it is possible to widen an angle of view, and to correct curvature of field and a lateral chromatic aberration in an excellent manner at the same time.

Here, with reference to FIG. 1, the shape of the object-side surface of the second lens L2 will be described. In FIG. 1, point C3 is a center of the object-side surface of the second lens L2. The point C3 is a point of intersection of the object-side surface of the second lens L2 and optical axis Z. In FIG. 1, point X3 is a point at an effective diameter edge on the object-side surface of the second lens L2. The point X3 is a point of intersection of an outermost ray 6 included in off-axial rays 4 and the object-side surface of the second lens L2.

At this time, a point of intersection of a normal to the lens surface at point X3 and the optical axis Z is point P3, as illustrated in FIG. 1. Further, a segment X3–P3 connecting the point X3 and the point P3 is defined as a curvature radius RX3 at the point X3, and the length |X3–P3| of the segment X3–P3 is defined as the absolute value |RX3| of the curvature radius RX3. In other words, |X3–P3|=|RX3|. Further, the curvature radius at the point C3, in other words, the curvature radius at the center of the object-side surface of the second lens L2 is R3 (a curvature radius in a paraxial region), and the absolute value of the curvature radius is |R3| (not illustrated in FIG. 1).

The expression that the object-side surface of the second lens L2 "has positive power at the center" means that a paraxial region including point C3 has a convex shape. Further, the expression that the object-side surface of the second lens L2 "a shape in which the positive power is stronger at an effective diameter edge, compared with the center" means a shape in which point P3 is located on the image side of the point C3, and the absolute value |RX3| of the curvature radius at point X3 is smaller than the absolute value |R3| of the curvature radius at the point C3.

In FIG. 1, circle CC3 is drawn by a double dot dashed line, and circle CX3 is drawn by a broken line to help understanding of the drawing. The circle CC3 has a radius of |R3|, and passes the point C3, and the center of the circle CC3 is a point on the optical axis. The circle CX3 has a radius of |RX3|, and passes the point X3, and the center of the circle CX3 is a point on the optical axis. The circle CX3 is smaller than the circle CC3, and |R3|>|RX3| is clearly illustrated.

When the focal length of an entire system is f, it is desirable that the absolute value |RX3| of the curvature radius at point X3 is 1.5 times as large as f or greater. In such a case, it is possible to widen an angle of view and to correct curvature of field and a lateral chromatic aberration in an excellent manner at the same time. It is more desirable that |RX3| is 1.8 times as large as f or greater. It is even more desirable that |RX3| is 2.0 times as large as f or greater.

It is desirable that the image-side surface of the second lens L2 is aspheric. It is desirable that the image-side surface of the second lens L2 has a shape in which the center has positive power and an effective diameter edge has negative power. When the image-side surface of the second lens L2 has such a shape, it is possible to correct curvature of field in an excellent manner.

It is possible to consider the aforementioned shape of the image-side surface of the second lens L2 in a similar manner to the shape of the object-side surface of the second lens L2, which was described using FIG. 1, as follows. In a lens cross section, when the effective diameter edge on the image-side surface of the second lens L2 is point X4, and a point of intersection of a normal at the point X4 and the optical axis Z is point P4, a segment X4–P4 connecting the point X4 and the point P4 is a curvature radius at the point X4, and a length |X4–P4| of the segment connecting the point X4 and the point P4 is the absolute value |RX4| of the curvature radius at the point X4. In other words, |X4–P4|=|RX4|. Further, a point of intersection of the image-side surface of the second lens L2 and the optical axis Z, in other words, the center of the image-side surface of the second lens L2 is point C4. The absolute value of the curvature radius at the point C4 (a curvature radius in a paraxial region) is |R4|.

The expression that the image-side surface of the second lens L2 has "a shape in which the center has positive power and an effective diameter edge has negative power" means a shape in which a paraxial region including the point C4 is convex, and the point P4 is located on the image side of the point C4.

It is desirable that the absolute value |RX4| of the curvature radius at point X4 is 0.9 times as large as the absolute value |R4| of the curvature radius at point C4 or less. When the |RX4| is 0.9 times as large as |R4| or less, it is possible to correct a spherical aberration and curvature of field in an excellent manner. It is desirable that the |RX4| is 0.8 times as large as |R4| or less to correct a spherical aberration and curvature of field in a more excellent manner. It is desirable that the |RX4| is 0.5 times as large as |R4| or less to correct a spherical aberration and curvature of field in an even more excellent manner.

The image-side surface of the second lens L2 may have a shape in which the center has negative power and an effective diameter edge also has negative power. When the image-side surface of the second lens L2 has such a shape, it is possible to correct a lateral chromatic aberration in an excellent manner. In that case, the shape may have negative power at the center, and negative power at an effective diameter edge may be stronger, compared with the center. When the image-side surface of the second lens L2 has such a shape, it is possible to correct a lateral chromatic aberration in a more excellent manner. The expression "the center has negative power" of the image-side surface of the second lens L2 means that a paraxial region including the point C4 is concave. Further, the expression that "the shape may have negative power at the center, and negative power at an effective diameter edge may be stronger, compared with the center" of the image-side surface of the second lens L2 means that the point P4 is located on the image side of the point C4, and that the absolute value |RX4| of the curvature radius at the point X4 is smaller than the absolute value |R4| of the curvature radius at the point C4.

It is desirable that the object-side surface of the third lens L3 is aspheric. It is desirable that the object-side surface of the third lens L3 has a shape having negative power at the center, and negative power at an effective diameter edge is stronger, compared with the center. When the object-side surface of the third lens L3 has such a shape, it is possible to correct a spherical aberration and curvature of field in an excellent manner.

It is possible to consider the aforementioned shape of the object-side surface of the third lens L3 in a similar manner to the shape of the object-side surface of the second lens L2, which was described using FIG. 1, as follows. In a lens cross section, when the effective diameter edge on the object-side surface of the third lens L3 is point X6, and a point of intersection of a normal at the point X6 and the optical axis Z is point P6, a segment X6–P6 connecting the point X6 and the point P6 is a curvature radius at the point X6, and a length |X6–P6| of the segment connecting the point X6 and the point P6 is the absolute value |RX6| of the curvature radius at the point X6. Therefore, |X6–P6|=|RX6|. Further, a point of intersection of the object-side surface of the third lens L3 and the optical axis Z, in other words, the center of the object-side surface of the third lens L3 is point C6. The absolute value of the curvature radius at the point C6 (a curvature radius in a paraxial region) is |R6|.

The expression that the object-side surface of the third lens L3 has "a shape having negative power at the center, and negative power at an effective diameter edge is stronger, compared with the center" means a shape in which a paraxial region including the point C6 is concave, and the point P6 is located on the object side of the point C6, and the absolute value |RX6| of the curvature radius at the point X6 is smaller than the absolute value |R6| of the curvature radius at the point C6.

It is desirable that the absolute value |RX6| of the curvature radius at point X6 is 0.7 times as large as the absolute value |R6| of the curvature radius at the point C6 or less. In such a case, it is possible to correct a spherical aberration and curvature of field in an excellent manner. It is more desirable that the |RX6| is 0.5 times as large as |R6| or less. It is even more desirable that the |RX6| is 0.4 times as large as |R6| or less.

It is desirable that the image-side surface of the third lens L3 is aspheric. It is desirable that the image-side surface of the third lens L3 has a shape having positive power at the center, and positive power at an effective diameter edge is weaker, compared with the center. When the image-side surface of the third lens L3 has such a shape, it is possible to correct a spherical aberration and curvature of field in an excellent manner.

It is possible to consider the aforementioned shape of the image-side surface of the third lens L3 in a similar manner to the shape of the object-side surface of the second lens L2, which was described using FIG. 1, as follows. In a lens cross section, when the effective diameter edge on the image-side surface of the third lens L3 is point X7, and a point of intersection of a normal at the point X7 and the optical axis Z is point P7, a segment X7–P7 connecting the point X7 and the point P7 is a curvature radius at the point X7, and a length |X7–P7| of the segment connecting the point X7 and the point P7 is the absolute value |RX7| of the curvature radius at the point X7. Therefore, |X7–P7|=|RX7|. Further, a point of intersection of the image-side surface of the third lens L3 and the optical axis Z, in other words, the center of the image-side surface of the third lens L3 is point C7. The absolute value of the curvature radius at the point C7 (a curvature radius in a paraxial region) is |R7|.

The expression that the image-side surface of the third lens L3 has "a shape having positive power at the center, and positive power at an effective diameter edge is weaker, compared with the center" means a shape in which a paraxial region including the point C7 is convex, and the point P7 is located on the object side of the point C7, and the absolute value |RX7| of the curvature radius at the point X7 is greater than the absolute value |R7| of the curvature radius at the point C7.

It is desirable that the absolute value |RX7| of the curvature radius at point X7 is 1.2 times as large as the absolute value |R7| of the curvature radius at point C7 or greater. In such a case, it is easy to correct a spherical aberration and curvature of field in an excellent manner. It is more desirable that |RX7| is 1.3 times as large as |R7| or greater. It is even more desirable that |RX7| is 1.5 times as large as |R7| or greater. It is still even more desirable that |RX7| is 1.6 times as large as |R7| or greater.

It is desirable that the material of the first lens L1 is glass, and the materials of the second lens L2 and the third lens L3 are plastic. When an imaging lens is used in tough conditions, for example, such as an in-vehicle camera and a surveillance camera, the first lens L1, which is arranged on the most object side, needs to use a material resistant to a deterioration of a surface by wind and rain and a change in temperature by direct sun light, and resistant to chemicals, such as oils and fats and detergents. In other words, the material needs to be highly water-resistant, weather-resistant, acid-resistant, chemical-resistant, and the like. Further, in some cases, the material needs to be hard and not easily breakable. If the material of the first lens L1 is glass, it is possible to satisfy such a need. Alternatively, transparent ceramic may be used as the material of the first lens L1.

When the materials of the second lens L2 and the third lens L3 are plastic, it is possible to structure the lens system at low cost and to reduce the weight of the lens system. Further, since it becomes easy to produce an accurate aspherical shape, an excellent optical performance becomes easily obtainable.

The material of one of the second lens L2 and the third lens L3 or the materials of both of them may be glass depending on required specifications. When the material of one of the second lens L2 and the third lens L3 or the materials of both of them are glass, it is possible to produce an optical system resistant to a change in temperature.

When plastic is used as the material of one of the second lens L2 and the third lens L3, a so-called nanocomposite material, which is obtained by mixing particles smaller than the wavelength of light into plastic, may be used as the material. It is possible to change the refractive index and the Abbe number of the nanocomposite material by changing the kind and the amount of particles to be mixed. When the nanocomposite material is used, it is possible to produce a material, for example, such as a high refractive index material and a low Abbe number material that were not obtainable by using a conventional plastic material. Therefore, it is possible to produce a lens having a more excellent optical performance by using such a material.

It is desirable that the first lens L1 is a spherical lens of glass to lower the cost. However, when a high optical performance is important, one of the surfaces of the first lens L1 or both of the surfaces of the first lens L1 may be aspheric. When the first lens L1 is an aspherical lens of glass, it is possible to correct various aberrations in a more excellent manner.

When the first lens L1 is an aspherical lens, the material of the first lens L1 may be plastic. When the first lens L1 is an aspherical lens of plastic, it is possible to structure the lens at a low cost and to reduce the weight of the lens. Further, it is possible to correct curvature of field and distortion in an excellent manner. When the first lens L1 is an aspherical lens of plastic, it is desirable to arrange a protective member, such as a cover glass, on the object side of the first lens L1. Alternatively, a coating for enhancing the shock resistance characteristics, such as a hard coat, may be applied to the object-side surface of the first lens L1.

When the refractive index of the first lens L1 with respect to d-line is Nd1, it is desirable that Nd1 is greater than or equal to 1.6. If Nd1 is less than 1.6, the absolute value of the curvature radius of the object-side surface needs to be increased to widen the angle of view. Therefore, it becomes difficult to correct distortion in an excellent manner. It is more desirable that Nd1 is greater than or equal to 1.65, and it is even more desirable that Nd1 greater than or equal to 1.7. Further, it is desirable that Nd1 is less than or equal to 1.9. If Nd1 is greater than 1.9, the Abbe number is small within the range of currently available optical materials, and a chromatic aberration becomes large. Further, the cost of the material becomes high, and that causes an increase in cost. It is more desirable that Nd1 is less than or equal to 1.87, and it is even more desirable that Nd1 is less than or equal to 1.85. Further, it is still even more desirable that Nd1 is less than or equal to 1.8.

When the refractive index of the material of the second lens L2 with respect to d-line is Nd2, it is desirable that Nd2 is greater than or equal to 1.55. If Nd2 is greater than or equal to 1.55, it is possible to strengthen the power of the second lens L2, and it becomes easy to widen an angle of view and to correct a lateral chromatic aberration. It is more desirable that Nd2 is greater than or equal to 1.60, and it is even more desirable that Nd2 is greater than or equal to 1.62. Further, it is desirable that Nd2 is less than or equal to 1.95. If Nd2 is greater than 1.95, the cost of material becomes high, and it becomes difficult to lower the cost. It is more desirable that Nd2 is less than or equal to 1.85, and it is even more desirable that Nd2 is less than or equal to 1.8. Further, it is still even more desirable that Nd2 is less than or equal to 1.7.

When the refractive index of the material of the third lens L3 with respect to d-line is Nd3, it is desirable that Nd3 is greater than or equal to 1.50. If Nd3 is greater than or equal to 1.50, it is possible to strengthen the power of the third lens L3, and it becomes easy to correct spherical aberration and curvature of field. It is more desirable that Nd3 is greater than or equal to 1.52. Further, it is desirable that Nd3 is less than or equal to 1.95. If Nd3 is greater than 1.95, the cost of the material becomes high, and it becomes difficult to lower the cost. It is more desirable that Nd3 is less than or equal to 1.85. It is even more desirable that Nd3 is less than or equal to 1.70. Further, it is still even more desirable that Nd3 is less than or equal to 1.60.

It is desirable that the lens system consists of only three lenses of first lens L1, second lens L2 and third lens L3. When the lens system consists of only three lenses, it is possible to structure the lens system at a low cost.

In examples that will be described later, all of the lenses are made of homogeneous materials. Alternatively, a lens having distributed refractive index may be used. Further, the examples, which will be described later, include a case in which an aspherical surface is adopted as each surface of the second lens L2 and the third lens L3. Further, a diffraction grating element may be formed on one of the surfaces or on plural surfaces.

FIG. 1 illustrates an example in which optical member PP, assuming various filters or the like, is arranged between the lens system and the imaging device 5. In this manner, a filter for cutting light of ultraviolet rays to blue light, or an IR (InfraRed) cut filter for cutting infrared rays may be inserted between the lens system and the imaging device 5 based on the purpose of the imaging lens 1. Alternatively, a coating having properties similar to those of the aforementioned filters may be applied to a lens surface of at least one of the lenses. Alternatively, a material that absorbs ultraviolet rays, blue light, infrared rays, or the like may be used as the material of at least one of the lenses.

Here, rays of light passing the outside of the effective diameter between lenses may become stray light, and reach the image plane. Further, the stray light may become ghost. Therefore, it is desirable that a light shield means for blocking the stray light is provided, if necessary. The light shield means may be provided, for example, by applying an opaque paint to a portion of a lens in the outside of the effective diameter, or by providing there an opaque plate member. Alternatively, an opaque place member, as a light shield means, may be provided in the optical path of rays that will become stray light. Alternatively, a hood-like member for blocking stray light may be provided further on the object-side of the most-object-side lens. FIG. 1 illustrates an example in which shield means 11, 12 are provided in the outside of the effective diameter on the image-side surface of each of the first lens L1 and the second lens L2, respectively. The position at which the light shield means is provided is not limited to the example illustrated in FIG. 1, the light shield means may be arranged on other lenses or between lenses.

Further, a member, such as an aperture stop, may be arranged between the lenses to block peripheral rays in such a manner that relative illumination is within a practically acceptable range. The peripheral rays are rays from an object point that is not on the optical axis Z, and pass the peripheral portion of the entrance pupil of the optical system. When a member that blocks the peripheral rays is provided in such a manner, it is possible to improve the image quality in the peripheral portion of the image formation area. Further, the member can reduce ghost by blocking light that generates the ghost.

Next, numerical value examples of imaging lenses of the present invention will be described. Lens cross sections of imaging lenses of Example 1 through Example 20 are illustrated in FIG. 2 through FIG. 21, respectively. In FIG. 2 through FIG. 21, the left side of the diagram is the object side, and the right side of the diagram is the image side. Further, aperture stop St and optical member PP are also illustrated. In each diagram, the aperture stop St does not represent the shape nor the size of the aperture stop St but the position of the aperture stop St on the optical axis Z. In each example, signs Ri, Di (i=1, 2, 3, . . . ) in the lens cross section correspond to Ri, Di in lens data that will be described next.

Table 1 shows lens data about the imaging lens of Example 1, and Table 2 shows data about aspherical coefficients, and Table 3 shows data about curvature radii. Similarly, Table 4 through Table 60 show lens data, data about aspherical coefficients, and data about curvature radii of the imaging lenses of Examples 2 through 20. In the following descriptions, the meanings of signs in the tables will be explained by using Example 1, as an example. The meanings of the signs are basically the same for the other examples.

In Table 1, a left-side table shows basic lens data, and a right-side table shows specifications and data, such as focal lengths. In the table of the basic lens data, column Si shows the surface number of the i-th surface (i=1, 2, 3, . . . ). The most object-side surface of composition elements is the first surface, and surface numbers sequentially increase toward the image side. Column Ri shows the curvature radius of the i-th surface, and column Di shows a distance between the i-th surface and the (i+1)th surface on the optical axis Z. Here, the sign of a curvature radius is positive when the shape of a surface is convex toward the object side, and the sign of a curvature radius is negative when the shape of a surface is convex toward the image side.

In the lens data of Table 1, column Ndj shows the refractive index of the j-th optical member (j=1, 2, 3, . . . ) for d-line (wavelength is 587.6 mm). The most-object side lens is the first optical member, and the number j sequentially increases toward the image side. The column vdj shows the Abbe number of the j-th optical element for d-line. Here, the lens data include aperture stop St and optical member PP. In a column of the surface number of a surface corresponding to aperture stop St, the term (APERTURE STOP) is also written.

In the specifications and the data, such as focal lengths, in Table 1, Fno. is an F-number, and IH is the maximum image height, and Bf (in Air) is a length (corresponding to back focus, length in air) on optical axis Z from the image-side surface of the most-image-side lens to image plane Sim, and L (in Air) is a length (a back focus portion is a length in air) on optical axis Z from the object-side surface of the first lens L1 to image plane Sim, and f is the focal length of the entire system, and f1 is the focal length of the first lens L1, and f2 is the focal length of the second lens L2, and f3 is the focal length of the third lens L3, and f12 is the combined focal length of the first lens L1 and the second lens L2, and f23 is the combined focal length of the second lens L2 and the third lens L3.

In the lens data of Table 1, mark "*" is attached to the surface number of an aspherical surface. Table 1 shows, as the curvature radius of the aspherical surface, the numerical value of a paraxial curvature radius (a curvature radius of the center). Table 2 shows the surface numbers of aspherical surfaces and aspherical coefficients related to the aspherical surfaces. In the numerical values of Table 2, "E−n" (n: integer) means "×10$^{-n}$", and "E+n" means "×10$^{n}$". Further, the aspherical coefficients are coefficients KA, RBm (m=3, 4, 5, . . . 20) in the following aspherical equation:

$$Zd = \frac{C \times Y^2}{1 + \sqrt{1 - KA \times C^2 \times Y^2}} + \sum_m RB_m Y^m, \quad \text{[Equation 1]}$$

where

Zd: depth of aspherical surface (the length of a perpendicular from a point on the aspherical surface at height Y to a flat plane that contacts with the vertex of the aspherical surface and is perpendicular to the optical axis), Y: height (the length from the optical axis to the lens surface), C: paraxial curvature, and KA, RBm: aspherical coefficients (m=3, 4, 5, . . . 20).

In the data about the curvature radii of Table 3, surface numbers, the absolute values of curvature radii at effective diameter edges, and ratios of the absolute values of curvature radii at effective diameter edges and the absolute values of curvature radii at centers are represented by using the signs that have been described already.

In the tables in the specification of the present application, values are rounded to predetermined digits. The unit of each numerical value is "degree" for 2ω and "mm" for lengths in Table 1. However, these units are only examples. Since an optical system can be used by proportionally enlarging or reducing the optical system, other appropriate units may be used.

TABLE 1

EXAMPLE 1

| Si | Ri | Di | Ndj | vdj |
|---|---|---|---|---|
| 1 | 150.0716 | 1.0000 | 1.75500 | 52.3 |
| 2 | 2.9851 | 1.4499 | | |
| *3 | 7.8889 | 2.9370 | 1.63360 | 23.6 |
| *4 | −45.5000 | 0.2958 | | |
| 5(APERTURE STOP) | ∞ | 0.2052 | | |
| *6 | −4.9287 | 1.5200 | 1.53391 | 55.8 |
| *7 | −0.9508 | 1.6617 | | |
| 8 | ∞ | 0.4000 | 1.51680 | 64.2 |
| 9 | ∞ | 0.5000 | | |
| IMAGE PLANE | ∞ | | | |

| | |
|---|---|
| Fno. | 2.40 |
| IH | 2.25 |
| Bf (in Air) | 2.44 |
| L (in Air) | 9.85 |
| f | 1.25 |
| f1 | −4.05 |
| f2 | 10.84 |
| f3 | 1.95 |
| f12 | −8.62 |
| f23 | 2.19 |

TABLE 2

EXAMPLE 1

| | SURFACE NUMBER | | | |
|---|---|---|---|---|
| | 3 | 4 | 6 | 7 |
| KA | −2.5009438E+02 | −8.6892272E+11 | 0.0000000E+00 | 2.7100680E−01 |
| RB3 | −2.4436013E−02 | −6.6682080E−02 | 6.4732617E−02 | 1.4425438E−02 |
| RB4 | 1.3127479E−01 | 3.2810685E−01 | −2.3358361E−01 | 1.2032582E−01 |
| RB5 | −8.4479818E−02 | −3.5662409E−01 | −7.2745922E−02 | −3.1793644E−01 |
| RB6 | 1.8594356E−02 | 1.3523727E−01 | −1.0675011E−01 | 1.2008860E−01 |
| RB7 | 3.5122792E−03 | 8.4268705E−03 | 3.2580948E−01 | 1.6733599E−01 |
| RB8 | −8.2573145E−04 | −2.7019636E−03 | 6.4831242E−01 | −4.4230193E−03 |
| RB9 | −3.8095300E−04 | 8.6781691E−03 | 7.3004610E−01 | −1.6019839E−01 |
| RB10 | −2.9311370E−05 | 8.0473555E−03 | −7.0055938E−02 | 5.4916105E−02 |
| RB11 | 2.1370465E−05 | −3.5718071E−03 | −2.4697552E+00 | 3.8495091E−03 |
| RB12 | 1.0607237E−05 | −2.0610915E−02 | −7.5206227E+00 | 6.3693452E−03 |
| RB13 | 2.4000995E−06 | −4.3929029E−02 | −3.3285403E+00 | 6.7812868E−04 |
| RB14 | 7.2370159E−09 | −4.2308089E−02 | 2.2269786E+01 | −1.2481315E−02 |
| RB15 | −1.9564705E−07 | 7.8154182E−02 | 1.3564534E+01 | −2.5359836E−03 |
| RB16 | −1.3980204E−08 | 1.3772739E−02 | −2.6242682E+01 | 1.1954301E−03 |
| RB17 | 1.1936934E−09 | −1.0349816E−02 | 0.0000000E+00 | 3.7516621E−03 |
| RB18 | −1.4294006E−09 | 0.0000000E+00 | 0.0000000E+00 | 4.3471238E−03 |
| RB19 | −1.7569415E−09 | 0.0000000E+00 | 0.0000000E+00 | −3.9874256E−04 |
| RB20 | −1.4190989E−09 | 0.0000000E+00 | 0.0000000E+00 | −1.8013215E−03 |

TABLE 3

EXAMPLE 1

| SURFACE NUMBER | EFFECTIVE DIAMETER EDGE | | RATIO OF EFFECTIVE DIAMETER EDGE TO ENTER |
|---|---|---|---|
| 3 | |RX3| | 2.66 | |RX3|/R3 | 0.34 |
| 4 | |RX4| | 12.27 | |RX4|/|R4| | 0.27 |
| 6 | |RX6| | 2.90 | |RX6|/|R6| | 0.59 |
| 7 | |RX7| | 1.32 | |RX7|/|R7| | 1.39 |

TABLE 4

EXAMPLE 2

| Si | Ri | Di | Ndj | vdj |
|---|---|---|---|---|
| 1 | 149.1260 | 1.0000 | 1.75500 | 52.3 |
| 2 | 3.0054 | 1.4500 | | |
| *3 | 6.8958 | 2.9494 | 1.63360 | 23.6 |
| *4 | −45.4999 | 0.2864 | | |
| 5(APERTURE STOP) | ∞ | 0.2500 | | |
| *6 | −7.1391 | 1.5298 | 1.53391 | 55.8 |
| *7 | −0.9725 | 1.5653 | | |
| 8 | ∞ | 0.4000 | 1.51680 | 64.2 |
| 9 | ∞ | 0.5000 | | |
| IMAGE PLANE | ∞ | | | |

| | |
|---|---|
| Fno. | 2.40 |
| IH | 2.25 |
| Bf (in Air) | 2.33 |
| L (in Air) | 9.79 |
| f | 1.26 |
| f1 | −4.07 |
| f2 | 9.66 |
| f3 | 1.94 |
| f12 | −10.08 |
| f23 | 2.23 |

TABLE 5

EXAMPLE 2

| | SURFACE NUMBER | | | |
|---|---|---|---|---|
| | 3 | 4 | 6 | 7 |
| KA | −2.2511170E+02 | −8.6895983E+11 | 0.0000000E+00 | 2.7311876E−01 |
| RB3 | −2.6332927E−02 | −6.9883934E−02 | 8.9439352E−02 | 1.7301754E−02 |
| RB4 | 1.3251661E−01 | 3.2868940E−01 | −2.3720738E−01 | 1.2745682E−01 |
| RB5 | −8.4586463E−02 | −3.5640462E−01 | −7.6716852E−02 | −3.1555651E−01 |
| RB6 | 1.8496774E−02 | 1.3561667E−01 | −1.0987313E−01 | 1.2127487E−01 |
| RB7 | 3.4827736E−03 | 9.3364096E−03 | 3.2478387E−01 | 1.6801784E−01 |
| RB8 | −8.3317249E−04 | −1.2310714E−02 | 6.5046649E−01 | −3.9929817E−03 |
| RB9 | −3.8284325E−04 | 1.0540406E−02 | 7.3553424E−01 | −1.5988194E−01 |
| RB10 | −2.9827224E−05 | 1.0080613E−02 | −6.2036106E−02 | 5.5184760E−02 |
| RB11 | 2.1225540E−05 | −1.5537722E−03 | −2.4609138E+00 | 4.0934461E−03 |
| RB12 | 1.0571423E−05 | −1.8735449E−02 | −7.5088798E+00 | 6.5921336E−03 |
| RB13 | 2.3961486E−06 | −4.2207907E−02 | −3.3312247E+00 | 8.7673649E−04 |
| RB14 | 1.0902861E−08 | −4.0873965E−02 | 2.2264512E+01 | −1.2310291E−02 |
| RB15 | −1.9154804E−07 | 7.8700237E−02 | 1.3697379E+01 | −2.3962569E−03 |
| RB16 | −1.1054723E−08 | 1.0119754E−02 | −2.6250463E+01 | 1.3126414E−03 |
| RB17 | 2.9753021E−09 | −1.8381895E−02 | 0.0000000E+00 | 3.8367902E−03 |
| RB18 | −4.3260504E−10 | 0.0000000E+00 | 0.0000000E+00 | 4.3974652E−03 |
| RB19 | −1.2286194E−09 | 0.0000000E+00 | 0.0000000E+00 | −5.6921155E−04 |
| RB20 | −1.1495709E−09 | 0.0000000E+00 | 0.0000000E+00 | −1.9445538E−03 |

TABLE 6

EXAMPLE 2

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.65 | \|RX3\|/R3 | 0.38 |
| 4 | \|RX4\| | 10.41 | \|RX4\|/R4 | 0.23 |
| 6 | \|RX6\| | 3.93 | \|RX6\|/R6 | 0.55 |
| 7 | \|RX7\| | 1.39 | \|RX7\|/R7 | 1.43 |

TABLE 7

EXAMPLE 3

| Si | Ri | Di | Ndj | vdj |
|---|---|---|---|---|
| 1 | 123.0061 | 1.2000 | 1.77250 | 49.6 |
| 2 | 3.4519 | 2.0816 | | |
| *3 | 6.5539 | 2.7889 | 1.63360 | 23.6 |
| *4 | −18.1791 | 0.6851 | | |
| 5(APERTURE STOP) | ∞ | 0.2000 | | |
| *6 | −5.6317 | 1.5000 | 1.53156 | 55.1 |
| *7 | −1.0619 | 1.6525 | | |
| 8 | ∞ | 0.5000 | 1.51680 | 64.2 |
| 9 | ∞ | 0.5000 | | |
| IMAGE PLANE | ∞ | | | |

| | |
|---|---|
| Fno. | 2.80 |
| IH | 2.25 |
| Bf (in Air) | 2.48 |
| L (in Air) | 10.94 |
| f | 1.41 |
| f1 | −4.62 |
| f2 | 7.95 |
| f3 | 2.21 |
| f12 | −46.01 |
| f23 | 2.55 |

TABLE 8

EXAMPLE 3

| | SURFACE NUMBER | | | |
|---|---|---|---|---|
| | 3 | 4 | 6 | 7 |
| KA | −1.1021220E+02 | −8.3118146E+11 | 0.0000000E+00 | 9.0535197E−02 |
| RB3 | −4.7902148E−02 | −1.0364599E−01 | 1.6687937E−01 | −4.7115521E−02 |
| RB4 | 1.3505566E−01 | 3.3334642E−01 | −4.7862765E−01 | 2.0817818E−01 |
| RB5 | −8.4052776E−02 | −3.4708769E−01 | −7.7871665E−02 | −3.7042410E−01 |
| RB6 | 1.8441317E−02 | 1.3908806E−01 | 8.4755006E−01 | 1.0825121E−01 |
| RB7 | 3.4259610E−03 | 3.8756777E−03 | −8.2250661E−01 | 1.7570437E−01 |
| RB8 | −8.5974347E−04 | −1.2024189E−02 | −2.7859913E−02 | 2.8906784E−03 |
| RB9 | −3.9178414E−04 | −2.4969165E−03 | 2.7167660E−01 | −1.7746777E−01 |
| RB10 | −3.3853894E−05 | 2.5517244E−03 | −1.6008711E−01 | 4.8209612E−02 |
| RB11 | 1.9493998E−05 | 5.3874441E−03 | −1.0334312E+00 | 6.1269116E−03 |
| RB12 | 1.0068270E−05 | 5.6040858E−03 | −9.1619786E−01 | 1.0392040E−02 |
| RB13 | 2.1100775E−06 | −9.2556719E−04 | −2.8446714E+00 | 1.3904890E−03 |
| RB14 | −8.3828036E−08 | −3.3711237E−03 | −3.2568918E+01 | −1.1382488E−02 |
| RB15 | −2.3180240E−07 | −1.4860283E−02 | 2.0303652E+02 | −1.7670546E−03 |
| RB16 | −2.7432980E−08 | 1.5816785E−02 | −2.1066464E+02 | 1.5528787E−04 |
| RB17 | 0.0000000E+00 | −3.9662297E−03 | 0.0000000E+00 | 2.7582816E−03 |
| RB18 | 0.0000000E+00 | 0.0000000E+00 | 0.0000000E+00 | 5.3221913E−03 |

TABLE 8-continued

EXAMPLE 3

SURFACE NUMBER

| | 3 | 4 | 6 | 7 |
|---|---|---|---|---|
| RB19 | 0.0000000E+00 | 0.0000000E+00 | 0.0000000E+00 | −1.0761014E−03 |
| RB20 | 0.0000000E+00 | 0.0000000E+00 | 0.0000000E+00 | −1.9579484E−03 |

TABLE 9

EXAMPLE 3

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.90 | \|RX3\|/R3 | 0.44 |
| 4 | \|RX4\| | 8.10 | \|RX4\|/R4 | 0.45 |
| 6 | \|RX6\| | 2.82 | \|RX6\|/R6 | 0.50 |
| 7 | \|RX7\| | 1.31 | \|RX7\|/R7 | 1.24 |

TABLE 10

EXAMPLE 4

| Si | Ri | Di | Ndj | vdj |
|---|---|---|---|---|
| 1 | 125.1215 | 1.1074 | 1.75500 | 52.3 |
| 2 | 3.1752 | 1.4960 | | |
| *3 | 7.9516 | 2.9500 | 1.63360 | 23.6 |

TABLE 10-continued

EXAMPLE 4

| *4 | −12.0948 | 0.4792 | | |
|---|---|---|---|---|
| 5(APERTURE STOP) | ∞ | 0.2000 | | |
| *6 | −6.6786 | 1.5000 | 1.53156 | 55.1 |
| *7 | −1.0117 | 1.4989 | | |
| 8 | ∞ | 0.5000 | 1.51680 | 64.2 |
| 9 | ∞ | 0.5000 | | |
| IMAGE PLANE | ∞ | | | |

| | |
|---|---|
| Fno. | 2.80 |
| IH | 2.25 |
| Bf (in Air) | 2.33 |
| L (in Air) | 10.06 |
| f | 1.32 |
| f1 | −4.33 |
| f2 | 8.03 |
| f3 | 2.05 |
| f12 | −23.84 |
| f23 | 2.29 |

TABLE 11

EXAMPLE 4

SURFACE NUMBER

| | 3 | 4 | 6 | 7 |
|---|---|---|---|---|
| KA | −8.5604099E+02 | −8.2029477E+11 | 0.0000000E+00 | 1.7276579E−02 |
| RB3 | −3.1291151E−02 | −1.3244032E−01 | 6.5368970E−02 | −6.5020533E−02 |
| RB4 | 1.3170973E−01 | 3.4202583E−01 | −1.4492632E−01 | 2.2055874E−01 |
| RB5 | −8.6285663E−02 | −3.3981562E−01 | −3.1126829E−01 | −3.5899417E−01 |
| RB6 | 1.8604898E−02 | 1.4261680E−01 | 6.1966888E−01 | 1.1463976E−01 |
| RB7 | 3.5782795E−03 | −1.0319377E−03 | −3.7418460E−01 | 1.6378256E−01 |
| RB8 | −8.3120795E−04 | −1.5432264E−02 | 2.3024266E−01 | −7.5234369E−03 |
| RB9 | −3.9192056E−04 | −4.0446534E−03 | −1.4888439E−01 | −1.5977389E−01 |
| RB10 | −3.3644938E−05 | 2.0686200E−03 | −4.1557215E−01 | 4.5982738E−02 |
| RB11 | 1.9356972E−05 | 5.4495687E−03 | −8.6510218E−01 | 8.1410877E−03 |
| RB12 | 9.9513696E−06 | 6.1502548E−03 | −1.2609237E+00 | 7.5903955E−03 |
| RB13 | 2.0194112E−06 | −9.9670766E−04 | −1.1718645E+01 | 1.3827924E−03 |
| RB14 | −1.5171793E−07 | −3.2472659E−03 | −4.3927513E+01 | −1.1766931E−02 |
| RB15 | −2.3718307E−07 | −1.4771258E−02 | 2.4181342E+02 | −1.7907909E−03 |
| RB16 | −3.4943976E−08 | 1.5768085E−02 | −2.1066464E+02 | 1.4013422E−04 |
| RB17 | 0.0000000E+00 | −3.9410469E−03 | 0.0000000E+00 | 2.7582136E−03 |
| RB18 | 0.0000000E+00 | 0.0000000E+00 | 0.0000000E+00 | 5.3227139E−03 |
| RB19 | 0.0000000E+00 | 0.0000000E+00 | 0.0000000E+00 | −1.0786820E−03 |
| RB20 | 0.0000000E+00 | 0.0000000E+00 | 0.0000000E+00 | −1.7405091E−03 |

TABLE 12

EXAMPLE 4

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 3.09 | \|RX3\|/R3 | 0.39 |
| 4 | \|RX4\| | 54.02 | \|RX4\|/\|R4\| | 4.47 |
| 6 | \|RX6\| | 3.40 | \|RX6\|/\|R6\| | 0.51 |
| 7 | \|RX7\| | 1.33 | \|RX7\|/\|R7\| | 1.31 |

TABLE 13

EXAMPLE 5

| Si | Ri | Di | Ndj | vdj |
|---|---|---|---|---|
| 1 | 156.0626 | 1.0000 | 1.75500 | 52.3 |
| 2 | 3.1621 | 1.5000 | | |
| *3 | 11.5118 | 2.8944 | 1.63360 | 23.6 |
| *4 | −16.1985 | 0.5558 | | |
| 5(APERTURE STOP) | ∞ | 0.2000 | | |
| *6 | −6.6309 | 1.5547 | 1.53156 | 55.1 |
| *7 | −1.0193 | 1.6593 | | |
| 8 | ∞ | 0.5000 | 1.51680 | 64.2 |
| 9 | ∞ | 0.5000 | | |
| IMAGE PLANE | ∞ | | | |

| | |
|---|---|
| Fno. | 2.80 |
| IH | 2.25 |
| Bf (in Air) | 2.49 |
| L (in Air) | 10.19 |
| f | 1.29 |
| f1 | −4.29 |
| f2 | 11.07 |
| f3 | 2.07 |
| f12 | −10.48 |
| f23 | 2.24 |

TABLE 15

EXAMPLE 5

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 3.04 | \|RX3\|/R3 | 0.26 |
| 4 | \|RX4\| | 52.39 | \|RX4\|/\|R4\| | 3.23 |
| 6 | \|RX6\| | 3.13 | \|RX6\|/\|R6\| | 0.47 |
| 7 | \|RX7\| | 1.34 | \|RX7\|/\|R7\| | 1.31 |

TABLE 16

EXAMPLE 6

| Si | Ri | Di | Ndj | vdj |
|---|---|---|---|---|
| 1 | 48.1033 | 0.7783 | 1.77250 | 49.6 |
| 2 | 3.3374 | 2.0000 | | |
| *3 | 9.3051 | 2.6983 | 1.63360 | 23.6 |
| *4 | −45.5000 | 0.6501 | | |
| 5(APERTURE STOP) | ∞ | 0.2337 | | |
| *6 | −5.7328 | 1.3966 | 1.53156 | 55.1 |
| *7 | −1.0540 | 1.8472 | | |
| 8 | ∞ | 0.5000 | 1.51680 | 64.2 |
| 9 | ∞ | 0.5000 | | |
| IMAGE PLANE | ∞ | | | |

| | |
|---|---|
| Fno. | 2.80 |
| IH | 2.25 |
| Bf (in Air) | 2.68 |
| L (in Air) | 10.43 |
| f | 1.39 |
| f1 | −4.68 |
| f2 | 12.43 |
| f3 | 2.20 |
| f12 | −10.57 |
| f23 | 2.41 |

TABLE 14

EXAMPLE 5

SURFACE NUMBER

| | 3 | 4 | 6 | 7 |
|---|---|---|---|---|
| KA | −1.2106307E+03 | −8.2029477E+11 | 0.0000000E+00 | 2.6448212E−02 |
| RB3 | −2.8686828E−02 | −1.3047137E−01 | −7.3205433E−04 | −5.7880438E−02 |
| RB4 | 1.3122684E−01 | 3.4243967E−01 | −1.6495808E−01 | 2.1571288E−01 |
| RB5 | −8.6316775E−02 | −3.3899428E−01 | −8.8849381E−02 | −3.6611693E−01 |
| RB6 | 1.8623721E−02 | 1.4251679E−01 | 4.8189946E−01 | 1.1132694E−01 |
| RB7 | 3.5917681E−03 | 4.2986849E−04 | −4.2226102E−01 | 1.6177185E−01 |
| RB8 | −8.2535124E−04 | −1.8125828E−02 | 2.5031530E−01 | −2.8345285E−03 |
| RB9 | −3.8952823E−04 | −3.3994411E−03 | −1.5459221E−01 | −1.5951298E−01 |
| RB10 | −3.2626175E−05 | 2.7985443E−03 | −4.1424970E−01 | 4.7097565E−02 |
| RB11 | 1.9628855E−05 | 5.2087277E−03 | −8.5745748E−01 | 8.1073873E−03 |
| RB12 | 9.9802468E−06 | 6.1547557E−03 | −1.4015147E+00 | 7.6117072E−03 |
| RB13 | 2.0433963E−06 | −1.0404090E−03 | −1.1173168E+01 | 1.4162979E−03 |
| RB14 | −1.5810464E−07 | −3.2496345E−03 | −4.0060575E+01 | −1.1772630E−02 |
| RB15 | −2.3767836E−07 | −1.4756223E−02 | 2.3561370E+02 | −1.7921288E−03 |
| RB16 | −4.4021612E−08 | 1.5767153E−02 | −2.1066464E+02 | 1.4000473E−04 |
| RB17 | 0.0000000E+00 | −3.9409240E−03 | 0.0000000E+00 | 2.7583092E−03 |
| RB18 | 0.0000000E+00 | 0.0000000E+00 | 0.0000000E+00 | 5.3226714E−03 |
| RB19 | 0.0000000E+00 | 0.0000000E+00 | 0.0000000E+00 | −1.0597798E−03 |
| RB20 | 0.0000000E+00 | 0.0000000E+00 | 0.0000000E+00 | −1.7427685E−03 |

TABLE 17

EXAMPLE 6

| | SURFACE NUMBER | | | |
|---|---|---|---|---|
| | 3 | 4 | 6 | 7 |
| KA | −2.0423601E+02 | −8.3177437E+11 | 0.0000000E+00 | −1.5736615E−02 |
| RB3 | −4.9198759E−02 | −1.0811738E−01 | −3.7333014E−02 | −8.7164921E−02 |
| RB4 | 1.3187623E−01 | 3.4295573E−01 | −8.8623045E−02 | 2.1508867E−01 |
| RB5 | −8.3238031E−02 | −3.4599744E−01 | 7.5035736E−02 | −3.5555863E−01 |
| RB6 | 1.8678615E−02 | 1.3789519E−01 | −1.6959344E−01 | 9.3536154E−02 |
| RB7 | 3.4460417E−03 | 2.6176121E−02 | −8.9118366E−02 | 1.5478587E−01 |
| RB8 | −8.6695203E−04 | −1.3977308E−02 | −7.7404456E−02 | −9.3385510E−03 |
| RB9 | −3.9674783E−04 | −2.3573700E−03 | 1.9868487E−02 | −1.6164150E−01 |
| RB10 | −3.5058915E−05 | 3.9543261E−03 | 6.9324286E−02 | 5.5327994E−02 |
| RB11 | 1.9206745E−05 | 5.5159230E−03 | 1.0744127E−02 | 5.5653415E−03 |
| RB12 | 9.8096551E−06 | 5.2416863E−03 | −2.3210811E−01 | 9.0773150E−03 |
| RB13 | 2.1023526E−06 | −7.8669039E−04 | 4.9588623E−01 | 3.8243878E−03 |
| RB14 | −8.9318965E−08 | −3.3177011E−03 | 2.1193960E+00 | −9.6872807E−03 |
| RB15 | −2.2526671E−07 | −1.4820868E−02 | 3.5310432E+00 | −1.5226144E−03 |
| RB16 | −1.7759558E−08 | 1.5790129E−02 | −8.6478056E+00 | −1.4457612E−03 |
| RB17 | 0.0000000E+00 | −4.0163089E−03 | 0.0000000E+00 | 1.1140763E−03 |
| RB18 | 0.0000000E+00 | 0.0000000E+00 | 0.0000000E+00 | 9.1576233E−04 |
| RB19 | 0.0000000E+00 | 0.0000000E+00 | 0.0000000E+00 | −2.3948503E−04 |
| RB20 | 0.0000000E+00 | 0.0000000E+00 | 0.0000000E+00 | 7.9176226E−07 |

TABLE 18

EXAMPLE 6

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.92 | \|RX3\|/R3 | 0.31 |
| 4 | \|RX4\| | 7.02 | \|RX4\|/\|R4\| | 0.15 |
| 6 | \|RX6\| | 2.33 | \|RX6\|/\|R6\| | 0.41 |
| 7 | \|RX7\| | 1.26 | \|RX7\|/\|R7\| | 1.19 |

TABLE 19

EXAMPLE 7

| Si | Ri | Di | Ndj | νdj |
|---|---|---|---|---|
| 1 | 150.0846 | 1.0000 | 1.75500 | 52.3 |
| 2 | 2.8834 | 1.5500 | | |
| *3 | 6.5949 | 2.9492 | 1.63360 | 23.6 |
| *4 | −45.4999 | 0.3007 | | |
| 5(APERTURE STOP) | ∞ | 0.2000 | | |
| *6 | −4.7550 | 1.5000 | 1.53390 | 55.9 |
| *7 | −1.0129 | 1.8036 | | |
| 8 | ∞ | 0.5000 | 1.51680 | 64.2 |
| 9 | ∞ | 0.5000 | | |
| IMAGE PLANE | ∞ | | | |

| | |
|---|---|
| Fno. | 2.80 |
| IH | 2.25 |
| Bf (in Air) | 2.63 |
| L (in Air) | 10.13 |
| f | 1.35 |
| f1 | −3.91 |
| f2 | 9.30 |
| f3 | 2.12 |
| f12 | −10.03 |
| f23 | 2.40 |

TABLE 20

EXAMPLE 7

| | SURFACE NUMBER | | | |
|---|---|---|---|---|
| | 3 | 4 | 6 | 7 |
| KA | −1.4649736E+02 | −8.4906855E+11 | 0.0000000E+00 | 2.8535694E−01 |
| RB3 | −3.0118671E−02 | −7.7133020E−02 | 7.8452934E−02 | 9.7917159E−03 |
| RB4 | 1.3213315E−01 | 3.2726038E−01 | −2.2268180E−01 | 1.2394216E−01 |
| RB5 | −8.4193044E−02 | −3.5229237E−01 | −7.3011445E−02 | −3.1462114E−01 |
| RB6 | 1.8629481E−02 | 1.4099824E−01 | −1.2098104E−01 | 1.1968832E−01 |
| RB7 | 3.5035141E−03 | 1.3045263E−02 | 3.0754683E−01 | 1.6527624E−01 |
| RB8 | −8.3223312E−04 | −4.4491601E−04 | 6.5045875E−01 | −6.6313344E−03 |
| RB9 | −3.8358812E−04 | 8.5501028E−03 | 7.8283858E−01 | −1.6190114E−01 |
| RB10 | −3.0125468E−05 | 6.1569600E−03 | 5.4355567E−02 | 5.3949360E−02 |
| RB11 | 2.1220142E−05 | −6.3927325E−03 | −2.2711261E+00 | 3.6394269E−03 |
| RB12 | 1.0644037E−05 | −2.3807114E−02 | −7.3408430E+00 | 6.8095482E−03 |
| RB13 | 2.4602726E−06 | −4.6486016E−02 | −2.9784509E+00 | 1.5800845E−03 |
| RB14 | 5.0042984E−08 | −4.5589269E−02 | 2.2008681E+01 | −1.1350822E−02 |
| RB15 | −1.7646064E−07 | 7.3615326E−02 | 1.3024881E+01 | −1.4078912E−03 |
| RB16 | −4.7761257E−09 | 2.0960757E−02 | −2.7831193E+01 | 2.1278412E−03 |
| RB17 | 4.6945213E−09 | −6.6989803E−03 | 0.0000000E+00 | 4.1141685E−03 |
| RB18 | −5.9935636E−10 | 0.0000000E+00 | 0.0000000E+00 | 5.4700604E−03 |

TABLE 20-continued

EXAMPLE 7

SURFACE NUMBER

| | 3 | 4 | 6 | 7 |
|---|---|---|---|---|
| RB19 | −1.9517991E−09 | 0.0000000E+00 | 0.0000000E+00 | −6.1745491E−04 |
| RB20 | −1.8834344E−09 | 0.0000000E+00 | 0.0000000E+00 | −3.2846515E−03 |

TABLE 21

EXAMPLE 7

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.66 | \|RX3\|/R3 | 0.40 |
| 4 | \|RX4\| | 11.33 | \|RX4\|/\|R4\| | 0.25 |
| 6 | \|RX6\| | 3.47 | \|RX6\|/\|R6\| | 0.73 |
| 7 | \|RX7\| | 1.35 | \|RX7\|/\|R7\| | 1.34 |

TABLE 22

EXAMPLE 8

| Si | Ri | Di | Ndj | νdj |
|---|---|---|---|---|
| 1 | 105.1309 | 1.0000 | 1.75490 | 52.3 |
| 2 | 3.0350 | 1.5500 | | |
| *3 | 6.3942 | 2.9263 | 1.63360 | 23.6 |

TABLE 22-continued

EXAMPLE 8

| | | | | |
|---|---|---|---|---|
| *4 | −45.5000 | 0.2554 | | |
| 5(APERTURE STOP) | ∞ | 0.2000 | | |
| *6 | −4.9063 | 1.5000 | 1.53391 | 55.9 |
| *7 | −0.9392 | 0.5000 | | |
| 8 | ∞ | 0.5000 | 1.51680 | 64.2 |
| 9 | ∞ | 1.4993 | | |
| IMAGE PLANE | ∞ | | | |

| | |
|---|---|
| Fno. | 2.20 |
| IH | 2.25 |
| Bf (in Air) | 2.33 |
| L (in Air) | 9.76 |
| f | 1.26 |
| f1 | −4.16 |
| f2 | 9.05 |
| f3 | 1.92 |
| f12 | −12.01 |
| f23 | 2.22 |

TABLE 23

EXAMPLE 8

SURFACE NUMBER

| | 3 | 4 | 6 | 7 |
|---|---|---|---|---|
| KA | −1.7279031E+02 | −8.4805633E+11 | 0.0000000E+00 | 2.9470568E−01 |
| RB3 | −2.2465347E−02 | −8.3457124E−02 | 5.6178568E−02 | 2.2086005E−02 |
| RB4 | 1.3099281E−01 | 3.2785395E−01 | −2.3277739E−01 | 1.2135472E−01 |
| RB5 | −8.4483975E−02 | −3.5481485E−01 | −7.2702345E−02 | −3.1724339E−01 |
| RB6 | 1.8568181E−02 | 1.3810832E−01 | −1.1773174E−01 | 1.2028399E−01 |
| RB7 | 3.4875075E−03 | 1.1296582E−02 | 2.9947329E−01 | 1.6712415E−01 |
| RB8 | −8.3727764E−04 | −5.5794543E−04 | 6.1454051E−01 | −4.8761700E−03 |
| RB9 | −3.8517020E−04 | 9.8975930E−03 | 7.1171879E−01 | −1.6074778E−01 |
| RB10 | −3.0590428E−05 | 8.5770079E−03 | −3.9060902E−02 | 5.4384133E−02 |
| RB11 | 2.1083578E−05 | −3.2375888E−03 | −2.3525976E+00 | 3.4195189E−03 |
| RB12 | 1.0598331E−05 | −1.9856301E−02 | −7.2920350E+00 | 6.0983290E−03 |
| RB13 | 2.4417496E−06 | −4.2226563E−02 | −2.7699220E+00 | 5.9336294E−04 |
| RB14 | 4.1870123E−08 | −3.9487678E−02 | 2.2676214E+01 | −1.2386538E−02 |
| RB15 | −1.7983686E−07 | 7.9512263E−02 | 1.3627833E+01 | −2.3068386E−03 |
| RB16 | −5.8842343E−09 | 1.2066111E−02 | −2.8579862E+01 | 1.5025327E−03 |
| RB17 | 4.5503200E−09 | −2.1896126E−02 | 0.0000000E+00 | 4.0621596E−03 |
| RB18 | −4.1754330E−10 | 0.0000000E+00 | 0.0000000E+00 | 4.4807564E−03 |
| RB19 | −1.7157723E−09 | 0.0000000E+00 | 0.0000000E+00 | 1.2364953E−04 |
| RB20 | −1.6860055E−09 | 0.0000000E+00 | 0.0000000E+00 | −2.5868676E−03 |

TABLE 24

EXAMPLE 8

| SURFACE NUMBER | EFFECTIVE DIAMETER EDGE | | RATIO OF EFFECTIVE DIAMETER EDGE TO CENTER | |
|---|---|---|---|---|
| 3 | |RX3| | 2.65 | |RX3|/R3 | 0.41 |
| 4 | |RX4| | 15.86 | |RX4|/|R4| | 0.35 |
| 6 | |RX6| | 2.80 | |RX6|/|R6| | 0.57 |
| 7 | |RX7| | 1.31 | |RX7|/|R7| | 1.39 |

TABLE 25

EXAMPLE 9

| Si | Ri | Di | Ndj | vdj |
|---|---|---|---|---|
| 1 | 144.4297 | 1.0497 | 1.75500 | 52.3 |
| 2 | 3.1041 | 1.4123 | | |
| *3 | 7.4679 | 3.0792 | 1.63360 | 23.6 |
| *4 | −24.5619 | 0.2987 | | |
| 5(APERTURE STOP) | ∞ | 0.2088 | | |
| *6 | −4.6140 | 1.6089 | 1.53391 | 55.9 |
| *7 | −0.9618 | 1.3974 | | |
| 8 | ∞ | 0.8000 | 1.51680 | 64.2 |
| 9 | ∞ | 0.5000 | | |
| IMAGE PLANE | ∞ | | | |

| | |
|---|---|
| Fno. | 2.40 |
| IH | 2.25 |
| Bf (in Air) | 2.42 |
| L (in Air) | 10.08 |
| f | 1.28 |
| f1 | −4.22 |
| f2 | 9.39 |
| f3 | 1.97 |
| f12 | −11.93 |
| f23 | 2.26 |

TABLE 26

EXAMPLE 9

| | SURFACE NUMBER | | | |
|---|---|---|---|---|
| | 3 | 4 | 6 | 7 |
| KA | −1.5789517E+02 | −5.3056485E+11 | 0.0000000E+00 | 3.9041875E−01 |
| RB3 | −2.7927452E−02 | −6.8639932E−02 | 1.2046482E−01 | 6.9676101E−03 |
| RB4 | 1.1781864E−01 | 2.8153216E−01 | −2.9479872E−01 | 1.3513791E−01 |
| RB5 | −7.0222883E−02 | −3.0470508E−01 | −9.4170578E−02 | −2.6116447E−01 |
| RB6 | 1.4933039E−02 | 1.0901624E−01 | −6.1341453E−02 | 9.7321961E−02 |
| RB7 | 2.6307149E−03 | 9.9092251E−03 | 3.5033522E−01 | 1.2888171E−01 |
| RB8 | −6.3962976E−04 | 3.6302007E−03 | 6.3515240E−01 | −3.3742436E−03 |
| RB9 | −2.7687626E−04 | 1.2456653E−02 | 6.6679712E−01 | −1.1325533E−01 |
| RB10 | −2.1035973E−05 | 1.0928274E−02 | −1.2801530E−02 | 3.8079617E−02 |
| RB11 | 1.3910419E−05 | 1.0409013E−03 | −1.8265107E+00 | 3.2881180E−03 |
| RB12 | 6.7351130E−06 | −1.2479499E−02 | −5.3606780E+00 | 4.6165107E−03 |
| RB13 | 1.5199660E−06 | −2.9185519E−02 | −3.3364677E+00 | 8.3348059E−04 |
| RB14 | 5.1507812E−08 | −3.0095707E−02 | 1.1961652E+01 | −6.9030340E−03 |
| RB15 | −8.6603996E−08 | 3.6518746E−02 | 1.0642112E+01 | −1.2832409E−01 |
| RB16 | 1.8662270E−09 | 1.0523491E−02 | −1.3415266E+01 | 8.0362634E−04 |
| RB17 | 4.0592928E−09 | −5.9086454E−03 | 0.0000000E+00 | 1.2976451E−03 |
| RB18 | 2.2499389E−10 | 0.0000000E+00 | 0.0000000E+00 | 2.5047297E−03 |
| RB19 | −8.5868702E−10 | 0.0000000E+00 | 0.0000000E+00 | −3.7926926E−04 |
| RB20 | −9.4029155E−10 | 0.0000000E+00 | 0.0000000E+00 | −8.2711597E−04 |

TABLE 27

EXAMPLE 9

| SURFACE NUMBER | EFFECTIVE DIAMETER EDGE | | RATIO OF EFFECTIVE DIAMETER EDGE TO CENTER | |
|---|---|---|---|---|
| 3 | |RX3| | 2.74 | |RX3|/R3 | 0.37 |
| 4 | |RX4| | 13.20 | |RX4|/|R4| | 0.54 |
| 6 | |RX6| | 3.15 | |RX6|/|R6| | 0.68 |
| 7 | |RX7| | 1.36 | |RX7|/|R7| | 1.42 |

TABLE 28

EXAMPLE 10

| Si | Ri | Di | Ndj | vdj |
|---|---|---|---|---|
| 1 | 124.8342 | 1.0938 | 1.75490 | 52.3 |
| 2 | 3.2735 | 1.6625 | | |
| *3 | 7.6024 | 3.2268 | 1.63360 | 23.6 |
| *4 | −49.5038 | 0.3308 | | |
| 5(APERTURE STOP) | ∞ | 0.2242 | | |
| *6 | −5.8305 | 1.6928 | 1.53391 | 55.9 |
| *7 | −1.0440 | 0.5469 | | |
| 8 | ∞ | 0.8000 | 1.51680 | 64.2 |
| 9 | ∞ | 1.5067 | | |
| IMAGE PLANE | ∞ | * | | |

| | |
|---|---|
| Fno. | 2.40 |
| IH | 2.40 |
| Bf (in Air) | 2.59 |
| L (in Air) | 10.83 |
| f | 1.37 |
| f1 | −4.47 |
| f2 | 10.63 |
| f3 | 2.12 |
| f12 | −11.18 |
| f23 | 2.44 |

TABLE 29

EXAMPLE 10

| | SURFACE NUMBER | | | |
|---|---|---|---|---|
| | 3 | 4 | 6 | 7 |
| KA | −2.3050861E+02 | −8.5264661E+11 | 0.0000000E+00 | 3.6103374E−01 |
| RB3 | −1.7398140E−02 | −5.5482248E−02 | 5.8033167E−02 | 4.1719876E−03 |
| RB4 | 9.9493826E−02 | 2.3852274E−01 | −1.7677013E−01 | 1.1297537E−01 |
| RB5 | −5.9104096E−02 | −2.5349257E−01 | −3.4022412E−02 | −2.1806271E−01 |
| RB6 | 1.1898785E−02 | 8.7290418E−02 | −4.8390016E−02 | 7.7109520E−02 |
| RB7 | 2.0558955E−03 | 8.5363729E−03 | 2.0312917E−01 | 9.7677344E−02 |
| RB8 | −4.4209879E−04 | 2.9281125E−03 | 3.4363639E−01 | −2.3150743E−03 |
| RB9 | −1.8723780E−04 | 8.1034243E−03 | 3.3454653E−01 | −7.8018930E−02 |
| RB10 | −1.3700896E−05 | 6.3177720E−03 | −6.9462375E−02 | 2.4728618E−02 |
| RB11 | 8.4875101E−06 | −5.9611439E−05 | −1.0508032E+00 | 1.8045820E−03 |
| RB12 | 3.8768602E−06 | −7.4993334E−03 | −2.8195463E+00 | 2.5719786E−03 |
| RB13 | 7.9550466E−07 | −1.5710003E−02 | −1.1085897E+00 | 3.6834384E−04 |
| RB14 | −1.9216280E−09 | −1.4132823E−02 | 6.7262951E+00 | −3.8153623E−03 |
| RB15 | −5.6237806E−08 | 2.1716381E−02 | 4.4630395E+00 | −6.8341010E−04 |
| RB16 | −2.7400285E−09 | 3.7925448E−04 | −7.1592383E+00 | 3.6603803E−04 |
| RB17 | 1.0379757E−09 | −1.6783506E+03 | 0.0000000E+00 | 1.0700116E−03 |
| RB18 | 9.3614735E−11 | 0.0000000E+00 | 0.0000000E+00 | 1.1283329E−03 |
| RB19 | −1.8503544E−10 | 0.0000000E+00 | 0.0000000E+00 | −2.6783068E−04 |
| RB20 | −2.1462609E−10 | 0.0000000E+00 | 0.0000000E+00 | −3.8933481E−04 |

TABLE 30

EXAMPLE 10

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.89 | \|RX3\|/R3 | 0.38 |
| 4 | \|RX4\| | 12.66 | \|RX4\|/R4 | 0.26 |
| 6 | \|RX6\| | 3.75 | \|RX6\|/R6 | 0.64 |
| 7 | \|RX7\| | 1.47 | \|RX7\|/R7 | 1.41 |

TABLE 31

EXAMPLE 11

| Si | Ri | Di | Ndj | vdj |
|---|---|---|---|---|
| 1 | 151.3512 | 1.1000 | 1.75500 | 52.3 |
| 2 | 3.2528 | 1.4800 | | |
| *3 | 7.8258 | 3.2268 | 1.63360 | 23.6 |
| *4 | −25.7390 | 0.3130 | | |
| 5(APERTURE STOP) | ∞ | 0.2188 | | |
| *6 | −4.8351 | 1.6860 | 1.53391 | 55.9 |
| *7 | −1.0079 | 0.1500 | | |
| 8 | ∞ | 0.7450 | 1.51680 | 64.2 |
| 9 | ∞ | 1.8999 | | |
| IMAGE PLANE | ∞ | | | |

| | |
|---|---|
| Fno. | 2.40 |
| IH | 2.40 |
| Bf (in Air) | 2.54 |
| L (in Air) | 10.57 |
| f | 1.34 |
| f1 | −4.42 |
| f2 | 9.84 |
| f3 | 2.07 |
| f12 | −12.50 |
| f23 | 2.37 |

TABLE 32

EXAMPLE 11

| | SURFACE NUMBER | | | |
|---|---|---|---|---|
| | 3 | 4 | 6 | 7 |
| KA | −1.5789517E+02 | −5.3056485E+11 | 0.0000000E+00 | 3.9041875E−01 |
| RB3 | −2.5431523E−02 | −6.2505452E−02 | 1.0969865E−01 | 6.3449016E−03 |
| RB4 | 1.0238247E−01 | 2.4464683E−01 | −2.5617526E−01 | 1.1743263E−01 |
| RB5 | −5.8231874E−02 | −2.5267473E−01 | −7.8090346E−02 | −2.1656896E−01 |
| RB6 | 1.1816826E−02 | 8.6266830E−02 | −4.8540774E−02 | 7.7012902E−02 |
| RB7 | 1.9865383E−03 | 7.4827780E−03 | 2.6454951E−01 | 9.7322765E−02 |
| RB8 | −4.6091661E−04 | 2.6159192E−03 | 4.5769022E−01 | −2.4314768E−03 |
| RB9 | −1.9039255E−04 | 8.5657535E−03 | 4.5851963E−01 | −7.7879449E−02 |
| RB10 | −1.3803758E−05 | 7.1711093E−03 | −8.4003353E−03 | 2.4987759E−02 |
| RB11 | 8.7105479E−06 | 6.5180073E−04 | −1.1437405E+00 | 2.0589826E−03 |
| RB12 | 4.0245812E−06 | −7.4571511E−03 | −3.2032846E+00 | 2.7586058E−03 |
| RB13 | 8.6672279E−07 | −1.6642316E−02 | −1.9025376E+00 | 4.7527156E−04 |
| RB14 | 2.8027861E−08 | −1.6376512E−02 | 6.5089064E+00 | −3.7562706E−03 |
| RB15 | −4.4970252E−08 | 1.8962834E−02 | 5.5260551E+00 | −6.6633953E−04 |
| RB16 | 9.2474583E−10 | 5.2145608E−03 | −6.6474826E+00 | 3.9820992E−04 |
| RB17 | 1.9194589E−09 | −2.7939354E−03 | 0.0000000E+00 | 6.1359863E−04 |
| RB18 | 1.0152423E−10 | 0.0000000E+00 | 0.0000000E+00 | 1.1302118E−03 |

TABLE 32-continued

EXAMPLE 11

| | SURFACE NUMBER | | | |
|---|---|---|---|---|
| | 3 | 4 | 6 | 7 |
| RB19 | −3.6974678E−10 | 0.0000000E+00 | 0.0000000E+00 | −1.6331164E−04 |
| RB20 | −3.8636925E−10 | 0.0000000E+00 | 0.0000000E+00 | −3.3986499E−04 |

TABLE 33

EXAMPLE 11

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.86 | \|RX3\|/R3 | 0.37 |
| 4 | \|RX4\| | 13.97 | \|RX4\|/\|R4\| | 0.54 |
| 6 | \|RX6\| | 3.28 | \|RX6\|/\|R6\| | 0.68 |
| 7 | \|RX7\| | 1.43 | \|RX7\|/\|R7\| | 1.42 |

TABLE 34

EXAMPLE 12

| Si | Ri | Di | Ndj | vdj |
|---|---|---|---|---|
| 1 | 150.0432 | 1.1000 | 1.75490 | 52.3 |
| 2 | 3.2346 | 1.4800 | | |
| *3 | 7.6389 | 3.2268 | 1.63360 | 23.6 |
| *4 | −21.9016 | 0.3120 | | |
| 5(APERTURE STOP) | ∞ | 0.2188 | | |
| *6 | −4.8288 | 1.6833 | 1.53391 | 55.9 |
| *7 | −1.0126 | 0.5000 | | |
| 8 | ∞ | 0.7000 | 1.51680 | 64.2 |
| 9 | ∞ | 1.5596 | | |
| IMAGE PLANE | ∞ | | | |

| | |
|---|---|
| Fno. | 2.40 |
| IH | 2.40 |
| Bf (in Air) | 2.53 |
| L (in Air) | 10.56 |
| f | 1.35 |
| f1 | −4.39 |
| f2 | 9.33 |
| f3 | 2.08 |
| f12 | −13.94 |
| f23 | 2.38 |

TABLE 35

EXAMPLE 12

| | SURFACE NUMBER | | | |
|---|---|---|---|---|
| | 3 | 4 | 6 | 7 |
| KA | −1.5814948E+02 | −5.3056485E+11 | 0.0000000E+00 | 3.8851222E−01 |
| RB3 | −2.4442393E−02 | −6.3072566E−02 | 1.1129460E−01 | 7.0369525E−03 |
| RB4 | 1.0208794E−01 | 2.4483524E−01 | −2.5697792E−01 | 1.1668034E−01 |
| RB5 | −5.8260878E−02 | −2.5262652E−01 | −7.8923446E−02 | −2.1707861E−01 |
| RB6 | 1.1820244E−02 | 8.6289197E−02 | −4.9097438E−02 | 7.6765774E−02 |
| RB7 | 1.9893085E−03 | 7.5225523E−03 | 2.6471334E−01 | 9.7200880E−02 |
| RB8 | −4.5990607E−04 | 2.6540514E−03 | 4.5881331E−01 | −2.4913180E−03 |
| RB9 | −1.9005289E−04 | 8.6010251E−03 | 4.6044352E−01 | −7.7907681E−02 |
| RB10 | −1.3707713E−05 | 7.2017497E−03 | −6.2434761E−03 | 2.4975062E−02 |
| RB11 | 8.7366726E−06 | 6.7588697E−04 | −1.1419319E+00 | 2.0532838E−03 |
| RB12 | 4.0315778E−06 | −7.4117983E−03 | −3.2036628E+00 | 2.7555803E−03 |
| RB13 | 8.6857915E−07 | −1.6637947E−02 | −1.9109211E+00 | 4.7290918E−04 |
| RB14 | 2.8501745E−08 | −1.6385541E−02 | 6.4551701E+00 | −3.7587437E−03 |
| RB15 | −4.4865716E−08 | 1.8940679E−02 | 5.5649392E+00 | −6.6851939E−04 |
| RB16 | 9.3614774E−10 | 5.1699154E−03 | −6.6304753E+00 | 3.9632634E−04 |
| RB17 | 1.9120102E−09 | −2.8408166E−03 | 0.0000000E+00 | 6.0912498E−04 |
| RB18 | 9.3500673E−11 | 0.0000000E+00 | 0.0000000E+00 | 1.1273911E−03 |
| RB19 | −3.7514545E−10 | 0.0000000E+00 | 0.0000000E+00 | −1.6037805E−04 |
| RB20 | −3.8949417E−10 | 0.0000000E+00 | 0.0000000E+00 | −3.4034821E−04 |

TABLE 36

EXAMPLE 12

| SURFACE NUMBER | EFFECTIVE DIAMETER EDGE | | RATIO OF EFFECTIVE DIAMETER EDGE TO CENTER | |
|---|---|---|---|---|
| 3 | |RX3| | 2.86 | |RX3|/R3 | 0.37 |
| 4 | |RX4| | 14.05 | |RX4|/|R4| | 0.64 |
| 6 | |RX6| | 3.27 | |RX6|/|R6| | 0.68 |
| 7 | |RX7| | 1.43 | |RX7|/|R7| | 1.42 |

TABLE 37

EXAMPLE 13

| Si | Ri | Di | Ndj | vdj |
|---|---|---|---|---|
| 1 | 118.2750 | 1.1000 | 1.75490 | 52.3 |
| 2 | 3.1955 | 1.4787 | | |
| *3 | 8.0635 | 3.2267 | 1.63360 | 23.6 |
| *4 | −32.5273 | 0.2977 | | |
| 5(APERTURE STOP) | ∞ | 0.2188 | | |
| *6 | −5.1196 | 1.6425 | 1.53391 | 55.9 |
| *7 | −0.9996 | 0.5000 | | |
| 8 | ∞ | 0.4500 | 1.51680 | 64.2 |
| 9 | ∞ | 1.7021 | | |
| IMAGE PLANE | ∞ | | | |

| | |
|---|---|
| Fno. | 2.60 |
| IH | 2.40 |
| Bf (in Air) | 2.52 |
| L (in Air) | 10.49 |
| f | 1.32 |
| f1 | −4.37 |
| f2 | 10.52 |
| f3 | 2.04 |
| f12 | −10.72 |
| f23 | 2.32 |

TABLE 38

EXAMPLE 13

| | SURFACE NUMBER | | | |
|---|---|---|---|---|
| | 3 | 4 | 6 | 7 |
| KA | −2.1218269E+02 | −5.2977031E+11 | 0.0000000E+00 | 3.8918292E−01 |
| RB3 | −2.7215168E−02 | −6.0400191E−02 | 1.1092800E−01 | 9.0990030E−03 |
| RB4 | 1.0249043E−01 | 2.4663695E−01 | −2.5988664E−01 | 1.1489352E−01 |
| RB5 | −5.8208837E−02 | −2.5142909E−01 | −8.4968589E−02 | −2.1781977E−01 |
| RB6 | 1.1820773E−02 | 8.6631261E−02 | −5.6051462E−02 | 7.6605254E−02 |
| RB7 | 1.9868598E−03 | 6.9106407E−03 | 2.6035146E−01 | 9.7294843E−02 |
| RB8 | −4.6123006E−04 | 1.1855828E−03 | 4.6141552E−01 | −2.3063139E−03 |
| RB9 | −1.9065304E−04 | 6.4705943E−03 | 4.7524896E−01 | 7.7716671E−02 |
| RB10 | −1.3941737E−05 | 4.6820393E−03 | 2.7543084E−02 | 2.5131185E−02 |
| RB11 | 8.6492600E−06 | −1.9024702E−03 | −1.0794910E+00 | 2.1596478E−03 |
| RB12 | 4.0002361E−06 | −9.7391064E−03 | −3.0715735E+00 | 2.8115125E−03 |
| RB13 | 8.5804471E−07 | −1.8472073E−02 | −1.7331849E+00 | 4.8462570E−04 |
| RB14 | 2.5389989E−08 | −1.7368729E−02 | 6.6553726E+00 | −3.7801081E−03 |
| RB15 | −4.5517135E−08 | 1.8742366E−02 | 5.4400885E+00 | −7.1563715E−04 |
| RB16 | 9.8366381E−10 | 1.7385823E−02 | −7.5993829E+00 | 3.2858205E−04 |
| RB17 | 2.0849661E−09 | 1.5996420E−02 | 0.0000000E+00 | 5.5151987E−04 |
| RB18 | 2.3688603E−10 | 0.0000000E+00 | 0.0000000E+00 | 1.0715032E−03 |
| RB19 | −2.8315561E−10 | 0.0000000E+00 | 0.0000000E+00 | −1.2542765E−04 |
| RB20 | −3.3699027E−10 | 0.0000000E+00 | 0.0000000E+00 | −2.4379661E−04 |

TABLE 39

EXAMPLE 13

| SURFACE NUMBER | EFFECTIVE DIAMETER EDGE | | RATIO OF EFFECTIVE DIAMETER EDGE TO CENTER | |
|---|---|---|---|---|
| 3 | |RX3| | 2.87 | |RX3|/R3 | 0.36 |
| 4 | |RX4| | 12.95 | |RX4|/|R4| | 0.40 |
| 6 | |RX6| | 3.63 | |RX6|/|R6| | 0.71 |
| 7 | |RX7| | 1.41 | |RX7|/|R7| | 1.41 |

TABLE 40

EXAMPLE 14

| Si | Ri | Di | Ndj | vdj |
|---|---|---|---|---|
| 1 | 121.2724 | 1.0450 | 1.75490 | 52.3 |
| 2 | 3.1795 | 1.5200 | | |
| *3 | 6.4420 | 3.0824 | 1.63360 | 23.6 |
| *4 | −47.5369 | 0.2533 | | |
| 5(APERTURE STOP) | ∞ | 0.2093 | | |
| *6 | −5.5385 | 1.6733 | 1.53391 | 55.9 |
| *7 | −0.9761 | 1.8000 | | |
| 8 | ∞ | 0.6000 | 1.51680 | 64.2 |
| 9 | ∞ | 0.1667 | | |
| IMAGE PLANE | ∞ | | | |

| | |
|---|---|
| Fno. | 2.10 |
| IH | 2.40 |
| Bf (in Air) | 2.37 |
| L (in Air) | 10.16 |
| f | 1.31 |
| f1 | −4.34 |
| f2 | 9.16 |
| f3 | 1.97 |
| f12 | −12.90 |
| f23 | 2.31 |

TABLE 41

EXAMPLE 14

| | SURFACE NUMBER | | | |
|---|---|---|---|---|
| | 3 | 4 | 6 | 7 |
| KA | −1.6915958E+02 | −6.8736437E+11 | 0.0000000E+00 | 2.5715711E−01 |
| RB3 | −1.9771372E−02 | −7.7042574E−02 | 1.1257448E−01 | 1.0460021E−02 |
| RB4 | 1.1439960E−01 | 2.9151242E−01 | −2.7438583E−01 | 1.4063587E−01 |
| RB5 | −7.0488089E−02 | −3.0166032E−01 | −1.0977206E−01 | −2.7988121E−01 |
| RB6 | 1.4823417E−02 | 1.0653943E−01 | −8.9370841E−02 | 8.8041194E−02 |
| RB7 | 2.6753576E−03 | 5.4055314E−03 | 3.2513478E−01 | 1.2513214E−01 |
| RB8 | −6.1727898E−04 | −1.0103539E−01 | 6.2227853E−01 | −3.5234691E−03 |
| RB9 | −2.7188716E−04 | 9.8526402E−03 | 6.7091377E−01 | −1.1125547E−01 |
| RB10 | −2.1236470E−05 | 1.1671224E−02 | 3.0184557E−02 | 3.9067473E−02 |
| RB11 | 1.3323784E−05 | 5.1886536E−03 | −1.6736708E+00 | 4.4018357E−03 |
| RB12 | 6.4387634E−06 | −5.7399120E−03 | −4.9795681E+00 | 5.3136732E−03 |
| RB13 | 1.4104969E−06 | −2.3800725E−02 | −2.7521127E+00 | 1.1572148E−03 |
| RB14 | 1.7023281E−08 | −2.5586128E−02 | 1.1682316E+01 | −6.8437837E−03 |
| RB15 | −9.6767035E−08 | 3.3839828E−02 | 8.3438832E+00 | −1.5029234E−03 |
| RB16 | −1.4183906E−09 | −5.1675583E−03 | −1.2402628E+01 | 1.6900287E−04 |
| RB17 | 3.4554925E−09 | −2.1481075E−02 | −1.8873591E−02 | 1.0506777E−03 |
| RB18 | 4.3581304E−10 | −2.5372237E−03 | −2.6503792E−02 | 1.3396547E−03 |
| RB19 | −5.2199634E−10 | 5.4299307E−05 | 1.4362902E−03 | −3.6176951E−05 |
| RB20 | −6.6774060E−10 | 4.6410983E−03 | 6.2147427E−04 | −4.9094003E−04 |

TABLE 42

EXAMPLE 14

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.75 | \|RX3\|/R3 | 0.43 |
| 4 | \|RX4\| | 14.77 | \|RX4\|/R4 | 0.31 |
| 6 | \|RX6\| | 3.24 | \|RX6\|/R6 | 0.59 |
| 7 | \|RX7\| | 1.42 | \|RX7\|/R7 | 1.46 |

TABLE 43

EXAMPLE 15

| Si | Ri | Di | Ndj | vdj |
|---|---|---|---|---|
| 1 | 267.5241 | 1.8172 | 1.77250 | 49.6 |
| 2 | 3.8495 | 1.8000 | | |
| *3 | 7.5979 | 2.6694 | 1.63360 | 23.6 |
| *4 | −24.4880 | 0.6133 | | |
| 5(APERTURE STOP) | ∞ | 0.2067 | | |
| *6 | −8.6748 | 1.6284 | 1.53156 | 55.1 |
| *7 | −1.0510 | 0.5000 | | |
| 8 | ∞ | 0.5000 | 1.51680 | 64.2 |
| 9 | ∞ | 1.5244 | | |
| IMAGE PLANE | ∞ | | | |

| | |
|---|---|
| Fno. | 2.80 |
| IH | 2.25 |
| Bf (in Air) | 2.37 |
| L (in Air) | 11.10 |
| f | 1.41 |
| f1 | −5.07 |
| f2 | 9.46 |
| f3 | 2.09 |
| f12 | −21.79 |
| f23 | 2.38 |

TABLE 44

EXAMPLE 15

| | SURFACE NUMBER | | | |
|---|---|---|---|---|
| | 3 | 4 | 6 | 7 |
| KA | −9.3592277E+01 | −8.2873769E+11 | 0.0000000E+00 | 1.0346751E−01 |
| RB3 | −5.2096067E−02 | −8.7612344E−02 | −1.1107703E−01 | −6.1999184E−02 |
| RB4 | 1.3607368E−01 | 3.3211089E−01 | 1.7601993E−01 | 1.9672091E−01 |
| RB5 | −8.4149084E−02 | −3.4991230E−01 | −3.6353173E−01 | −3.4384873E−01 |
| RB6 | 1.8388105E−02 | 1.3726498E−01 | 7.3797254E−02 | 1.1041334E−01 |
| RB7 | 3.6410402E−03 | 2.7922436E−03 | −2.3657869E−01 | 1.5897780E−01 |
| RB8 | −9.1087135E−04 | −1.4276136E−02 | 9.9553295E−01 | −3.8947398E−03 |
| RB9 | −3.9676355E−04 | −1.7440030E−03 | 9.1334258E−01 | −1.6083015E−01 |
| RB10 | −3.4547765E−05 | 4.6861004E−03 | −6.4824736E−01 | 5.7747951E−02 |
| RB11 | 1.9416295E−05 | 5.2873362E−03 | −6.8782507E−01 | −3.2090480E−03 |
| RB12 | 9.8217999E−06 | 5.0690903E−03 | −2.5604142E+01 | 1.2035429E−02 |
| RB13 | 2.0876027E−06 | −1.2206322E−03 | −2.6010522E+00 | 6.5317670E−04 |
| RB14 | −1.0446391E−07 | −3.4716431E−03 | 2.3863546E+01 | −1.1490650E−02 |
| RB15 | −2.3336737E−07 | −1.4856766E−02 | 1.8940341E+02 | −1.2681101E−03 |
| RB16 | −2.3023400E−08 | 1.5790889E−02 | −2.1488757E+02 | 1.6805260E−04 |
| RB17 | 0.0000000E+00 | −3.8368450E−03 | 0.0000000E+00 | 2.7431010E−03 |
| RB18 | 0.0000000E+00 | 0.0000000E+00 | 0.0000000E+00 | 5.3210322E−03 |

TABLE 44-continued

EXAMPLE 15

SURFACE NUMBER

| | 3 | 4 | 6 | 7 |
|---|---|---|---|---|
| RB19 | 0.0000000E+00 | 0.0000000E+00 | 0.0000000E+00 | −1.0828800E−03 |
| RB20 | 0.0000000E+00 | 0.0000000E+00 | 0.0000000E+00 | −2.2461936E−03 |

TABLE 45

EXAMPLE 15

| SURFACE NUMBER | EFFECTIVE DIAMETER EDGE | | RATIO OF EFFECTIVE DIAMETER EDGE TO CENTER | |
|---|---|---|---|---|
| 3 | $|RX3|$ | 2.97 | $|RX3|/|R3|$ | 0.39 |
| 4 | $|RX4|$ | 8.83 | $|RX4|/|R4|$ | 0.36 |
| 6 | $|RX6|$ | 2.91 | $|RX6|/|R6|$ | 0.34 |
| 7 | $|RX7|$ | 1.31 | $|RX7|/|R7|$ | 1.27 |

TABLE 46

EXAMPLE 16

| Si | Ri | Di | Ndj | νdj |
|---|---|---|---|---|
| 1 | 235.2059 | 1.0219 | 1.77250 | 49.6 |
| 2 | 3.4869 | 1.8391 | | |
| *3 | 9.4915 | 2.8584 | 1.63360 | 23.6 |
| *4 | −46.4998 | 0.6728 | | |
| 5(APERTURE STOP) | ∞ | 0.2044 | | |
| *6 | −8.7764 | 1.5648 | 1.53156 | 55.1 |
| *7 | −1.0740 | 0.5110 | | |
| 8 | ∞ | 0.5110 | 1.51680 | 64.2 |
| 9 | ∞ | 1.7324 | | |
| IMAGE PLANE | ∞ | | | |

| | |
|---|---|
| Fno. | 2.80 |
| IH | 2.25 |
| Bf (in Air) | 2.58 |
| L (in Air) | 10.74 |
| f | 1.35 |
| f1 | −4.59 |
| f2 | 12.69 |
| f3 | 2.15 |
| f12 | −9.76 |
| f23 | 2.40 |

TABLE 47

EXAMPLE 16

SURFACE NUMBER

| | 3 | 4 | 6 | 7 |
|---|---|---|---|---|
| KA | −2.4364499E+02 | −8.3118146E+11 | 0.0000000E+00 | 5.7152620E−02 |
| RB3 | −4.4852926E−02 | −8.9116065E−02 | −8.0805574E−03 | −5.3272580E−02 |
| RB4 | 1.2709665E−01 | 3.1360158E−01 | −9.1256025E−02 | 1.9139057E−01 |
| RB5 | −7.7006987E−02 | −3.1925343E−01 | 6.9820069E−02 | −3.1742627E−01 |
| RB6 | 1.6533383E−02 | 1.2378997E−01 | −1.4082232E−01 | 9.4180918E−02 |
| RB7 | 2.9949649E−03 | 2.7796900E−03 | −1.7147181E−02 | 1.4275509E−01 |
| RB8 | −7.3841661E−04 | −1.1650966E−02 | 2.4001722E−02 | −4.6674490E−03 |
| RB9 | −3.2896535E−04 | −1.8762318E−03 | 5.7346521E−02 | −1.3498620E−01 |
| RB10 | −2.7125288E−05 | 3.2204060E−03 | −1.6335064E−01 | 4.4569573E−02 |
| RB11 | 1.6113105E−05 | 4.3418213E−03 | −8.4161356E−01 | 2.7962942E−03 |
| RB12 | 8.0005221E−06 | 4.0112889E−03 | −7.8229992E−01 | 5.1889357E−03 |
| RB13 | 1.6958516E−06 | −7.0995285E−04 | −2.1769067E+00 | 1.1626352E−03 |
| RB14 | −4.9101742E−08 | −2.5666475E−03 | 8.9282601E+00 | −8.6053198E−03 |
| RB15 | −1.7150365E−07 | −1.0954811E−02 | 1.7046684E+01 | −1.3041849E−03 |
| RB16 | −3.2741752E−08 | 1.1411507E−02 | −1.2924065E+01 | 1.1089573E−04 |
| RB17 | 0.0000000E+00 | −2.8026779E−03 | 0.0000000E+00 | 1.9479430E−03 |
| RB18 | 0.0000000E+00 | 0.0000000E+00 | 0.0000000E+00 | 3.6779915E−03 |
| RB19 | 0.0000000E+00 | 0.0000000E+00 | 0.0000000E+00 | −7.2894341E−04 |
| RB20 | 0.0000000E+00 | 0.0000000E+00 | 0.0000000E+00 | −8.9988157E−04 |

TABLE 48

EXAMPLE 16

| SURFACE NUMBER | EFFECTIVE DIAMETER EDGE | | RATIO OF EFFECTIVE DIAMETER EDGE TO CENTER | |
|---|---|---|---|---|
| 3 | |RX3| | 2.99 | |RX3|/R3 | 0.32 |
| 4 | |RX4| | 8.24 | |RX4|/|R4| | 0.18 |
| 6 | |RX6| | 4.12 | |RX6|/|R6| | 0.47 |
| 7 | |RX7| | 1.39 | |RX7|/|R7| | 1.29 |

TABLE 49

EXAMPLE 17

| Si | Ri | Di | Ndj | vdj |
|---|---|---|---|---|
| 1 | 244.1069 | 1.0219 | 1.77250 | 49.6 |
| 2 | 3.4859 | 1.8393 | | |
| *3 | 9.6252 | 2.8577 | 1.63360 | 23.6 |
| *4 | −46.4982 | 0.6974 | | |
| 5(APERTURE STOP) | ∞ | 0.2044 | | |
| *6 | −8.7450 | 1.5843 | 1.53156 | 55.1 |
| *7 | −1.0747 | 0.5110 | | |
| 8 | ∞ | 0.5000 | 1.51680 | 64.2 |
| 9 | ∞ | 1.7449 | | |
| IMAGE PLANE | ∞ | | | |

| | |
|---|---|
| Fno. | 2.80 |
| IH | 2.25 |
| Bf (in Air) | 2.59 |
| L (in Air) | 10.79 |
| f | 1.34 |
| f1 | −4.59 |
| f2 | 12.84 |
| f3 | 2.15 |
| f12 | −9.63 |
| f23 | 2.40 |

TABLE 50

EXAMPLE 17

| | SURFACE NUMBER | | | |
|---|---|---|---|---|
| | 3 | 4 | 6 | 7 |
| KA | −2.4266020E+02 | −8.3118146E+11 | 0.0000000E+00 | 5.4910874E−02 |
| RB3 | −4.4839915E−02 | −8.9080713E−02 | −8.6744406E−03 | −5.2966367E−02 |
| RB4 | 1.2709046E−01 | 3.1361513E−01 | −9.1323743E−02 | 1.9163456E−01 |
| RB5 | −7.7025126E−02 | −3.1924846E−01 | 7.1379247E−02 | −3.1734832E−01 |
| RB6 | 1.6526258E−02 | 1.2379164E−01 | −1.4085870E−01 | 9.4076146E−02 |
| RB7 | 2.9932136E−03 | 2.7806015E−02 | −1.7157788E−02 | 1.4284879E−01 |
| RB8 | −7.3879155E−04 | −1.1646531E−02 | 2.5979237E−02 | −4.6038508E−03 |
| RB9 | −3.2905146E−04 | −1.8764997E−03 | 5.6970507E−02 | −1.3496561E−01 |
| RB10 | −2.7145805E−05 | 3.2188264E−03 | −1.6319615E−01 | 4.4563705E−02 |
| RB11 | 1.6108112E−05 | 4.3417098E−03 | −8.4156141E−01 | 2.7124762E−01 |
| RB12 | 7.9994404E−06 | 4.0093690E−03 | −7.8229986E−01 | 5.1887423E−03 |
| RB13 | 1.6957599E−06 | −7.1034268E−04 | −2.1769073E+00 | 1.1634674E−03 |
| RB14 | −4.9005969E−08 | −2.5666462E−03 | 8.9282604E+00 | −8.6053147E−03 |
| RB15 | −1.7134408E−07 | −1.0954848E−02 | 1.0746684E+01 | −1.3041419E−03 |
| RB16 | −3.2558310E−08 | 1.1411507E−02 | −1.2924065E+01 | 1.1089661E−04 |
| RB17 | 0.0000000E+00 | −2.8026840E−03 | 0.0000000E+00 | 1.9479666E−03 |
| RB18 | 0.0000000E+00 | 0.0000000E+00 | 0.0000000E+00 | 3.6779915E−03 |
| RB19 | 0.0000000E+00 | 0.0000000E+00 | 0.0000000E+00 | −7.2894258E−04 |
| RB20 | 0.0000000E+00 | 0.0000000E+00 | 0.0000000E+00 | −8.9988155E−04 |

TABLE 51

EXAMPLE 17

| SURFACE NUMBER | EFFECTIVE DIAMETER EDGE | | RATIO OF EFFECTIVE DIAMETER EDGE TO CENTER | |
|---|---|---|---|---|
| 3 | |RX3| | 2.99 | |RX3|/R3 | 0.31 |
| 4 | |RX4| | 8.44 | |RX4|/|R4| | 0.18 |
| 6 | |RX6| | 4.14 | |RX6|/|R6| | 0.47 |
| 7 | |RX7| | 1.39 | |RX7|/|R7| | 1.30 |

TABLE 52

EXAMPLE 18

| Si | Ri | Di | Ndj | vdj |
|---|---|---|---|---|
| 1 | 162.8196 | 1.0006 | 1.75500 | 52.3 |
| 2 | 2.5841 | 1.5500 | | |
| *3 | 3.1996 | 2.4323 | 1.63360 | 23.6 |
| *4 | −14.3814 | 0.1200 | | |
| 5(APERTURE STOP) | ∞ | 0.2001 | | |
| *6 | −3.2635 | 1.5000 | 1.53391 | 55.9 |
| *7 | −0.9474 | 0.5000 | | |
| 8 | ∞ | 0.5000 | 1.51680 | 64.2 |
| 9 | ∞ | 1.3617 | | |
| IMAGE PLANE | ∞ | | | |

| | |
|---|---|
| Fno. | 2.80 |
| IH | 2.25 |
| Bf (in Air) | 2.19 |
| L (in Air) | 8.99 |
| f | 1.38 |
| f1 | −3.49 |
| f2 | 4.37 |
| f3 | 2.04 |
| f12 | 16.03 |
| f23 | 2.42 |

TABLE 53

EXAMPLE 18

| | SURFACE NUMBER | | | |
|---|---|---|---|---|
| | 3 | 4 | 6 | 7 |
| KA | −1.1021220E+02 | −8.3118146E+11 | 0.0000000E+00 | 9.0535197E−02 |
| RB3 | −4.7902148E−02 | −1.0364599E−01 | 1.6687937E−01 | −4.7115521E−02 |
| RB4 | 1.3505566E−01 | 3.3334642E−01 | −4.7862765E−01 | 2.0817818E−01 |
| RB5 | −8.4052776E−02 | −3.4708769E−01 | −7.7871665E−02 | −3.7042410E−01 |
| RB6 | 1.8441317E−02 | 1.3908806E−01 | 8.4755006E−01 | 1.0825121E−01 |
| RB7 | 3.4259610E−03 | 3.8756777E−03 | −8.2250661E−02 | 1.7570437E−01 |
| RB8 | −8.5974347E−04 | −1.2024189E−02 | −2.7859913E−02 | 2.8906784E−03 |
| RB9 | −3.9178414E−04 | −2.4969165E−03 | 2.7167660E−01 | −1.7746777E−01 |
| RB10 | −3.3853894E−05 | 2.5517244E−03 | −1.6008711E−01 | 4.8209612E−02 |
| RB11 | 1.9493998E−05 | 5.3874441E−03 | −1.0334312E+00 | 6.1269116E−03 |
| RB12 | 1.0068270E−05 | 5.6040858E−03 | −9.1619786E−01 | 1.0392040E−02 |
| RB13 | 2.1100775E−06 | −9.2556719E−04 | −2.8446714E+00 | 1.3904890E−03 |
| RB14 | −8.3828036E−08 | −3.3711237E−03 | −3.2568918E+01 | −1.1382488E−02 |
| RB15 | −2.3180240E−07 | −1.4860283E−02 | 2.0303652E+02 | −1.7670546E−03 |
| RB16 | −2.7432980E−08 | 1.5816785E−02 | −2.1066464E+02 | 1.5528787E−04 |
| RB17 | 0.0000000E+00 | −3.9662297E−03 | 0.0000000E+00 | 2.7582816E−03 |
| RB18 | 0.0000000E+00 | 0.0000000E+00 | 0.0000000E+00 | 5.3221913E−03 |
| RB19 | 0.0000000E+00 | 0.0000000E+00 | 0.0000000E+00 | −1.0761014E−03 |
| RB20 | 0.0000000E+00 | 0.0000000E+00 | 0.0000000E+00 | −1.9579484E−03 |

TABLE 54

EXAMPLE 18

| SURFACE NUMBER | EFFECTIVE DIAMETER EDGE | | RATIO OF EFFECTIVE DIAMETER EDGE TO CENTER | |
|---|---|---|---|---|
| 3 | |RX3| | 3.84 | |RX3|/R3 | 1.20 |
| 4 | |RX4| | 51.02 | |RX4|/|R4| | 3.55 |
| 6 | |RX6| | 2.30 | |RX6|/|R6| | 0.71 |
| 7 | |RX7| | 1.27 | |RX7|/|R7| | 1.34 |

TABLE 55

EXAMPLE 19

| Si | Ri | Di | Ndj | vdj |
|---|---|---|---|---|
| 1 | 150.5336 | 1.0449 | 1.67790 | 55.3 |
| 2 | 3.0924 | 1.5200 | | |
| *3 | 9.9348 | 3.0824 | 1.69542 | 21.9 |

TABLE 55-continued

EXAMPLE 19

| | | | | |
|---|---|---|---|---|
| *4 | 50.0000 | 0.2757 | | |
| 5(APERTURE STOP) | ∞ | 0.2116 | | |
| *6 | −7.6926 | 1.5673 | 1.53391 | 55.9 |
| *7 | −1.0327 | 0.5224 | | |
| 8 | ∞ | 0.5224 | 1.51680 | 64.2 |
| 9 | ∞ | 1.7582 | | |
| IMAGE PLANE | ∞ | | | |

| | |
|---|---|
| Fno. | 2.40 |
| IH | 2.40 |
| Bf (in Air) | 2.63 |
| L (in Air) | 10.33 |
| f | 1.40 |
| f1 | −4.67 |
| f2 | 17.28 |
| f3 | 2.06 |
| f12 | −6.99 |
| f23 | 2.29 |

TABLE 56

EXAMPLE 19

| | SURFACE NUMBER | | | |
|---|---|---|---|---|
| | 3 | 4 | 6 | 7 |
| KA | −4.1274680E+02 | −7.3162568E+11 | 0.0000000E+00 | 3.0563392E−01 |
| RB3 | −3.5750645E−02 | −7.3937359E−02 | 5.4894469E−02 | 1.4859325E−02 |
| RB4 | 1.1423090E−01 | 2.9155237E−01 | −2.2330185E−01 | 1.1594221E−01 |
| RB5 | −7.0835525E−02 | −2.9974356E−01 | −8.3790178E−02 | −2.6797508E−01 |
| RB6 | 1.4836617E−02 | 1.0793369E−01 | −8.1707512E−02 | 9.1879602E−02 |
| RB7 | 2.6536816E−03 | 6.5129146E−03 | 3.0923759E−01 | 1.2432369E−01 |
| RB8 | −6.2328078E−04 | −4.0953577E−04 | 5.9048437E−01 | −5.6269869E−03 |
| RB9 | −2.7391353E−04 | 9.6706298E−03 | 6.4244367E−01 | −1.1318742E−01 |
| RB10 | −2.2149188E−05 | 1.0447808E−02 | 2.6087348E−02 | 3.7803695E−02 |
| RB11 | 1.2872702E−05 | 2.7096782E−03 | −1.6434370E+00 | 3.8424684E−03 |
| RB12 | 6.2260049E−06 | −9.8758019E−03 | −4.9076276E+00 | 5.2989625E−03 |
| RB13 | 1.3175666E−06 | −3.0386620E−02 | −2.7125697E+00 | 1.4760152E−03 |
| RB14 | −2.0697099E−08 | −3.2371076E−02 | 1.2024307E+01 | −6.4090909E−03 |
| RB15 | −1.1103928E−07 | 3.8760469E−02 | 6.7986606E+00 | −1.0915322E−03 |
| RB16 | −6.4027932E−09 | 1.5414816E−04 | −1.1248741E+01 | 7.8777111E−04 |
| RB17 | 1.9098273E−09 | 2.1055085E−03 | 0.0000000E+00 | 1.4575106E−03 |
| RB18 | 6.2704265E−11 | 0.0000000E+00 | 0.0000000E+00 | 1.3835533E−03 |

TABLE 56-continued

EXAMPLE 19

| | SURFACE NUMBER | | | |
|---|---|---|---|---|
| | 3 | 4 | 6 | 7 |
| RB19 | −5.4502305E−10 | 0.0000000E+00 | 0.0000000E+00 | −2.6542115E−04 |
| RB20 | −6.1436483E−10 | 0.0000000E+00 | 0.0000000E+00 | −6.3086296E−04 |

TABLE 57

EXAMPLE 19

| SURFACE NUMBER | EFFECTIVE DIAMETER EDGE | | RATIO OF EFFECTIVE DIAMETER EDGE TO CENTER | |
|---|---|---|---|---|
| 3 | $|RX3|$ | 3.34 | $|RX3|/R3$ | 0.34 |
| 4 | $|RX4|$ | 13.90 | $|RX4|/R4$ | 0.28 |
| 6 | $|RX6|$ | 3.65 | $|RX6|/R6$ | 0.47 |
| 7 | $|RX7|$ | 1.41 | $|RX7|/R7$ | 1.36 |

TABLE 58

EXAMPLE 20

| Si | Ri | Di | Ndj | vdj |
|---|---|---|---|---|
| 1 | 169.0929 | 1.0004 | 1.80400 | 46.6 |
| 2 | 2.7735 | 1.5500 | | |
| *3 | 2.9104 | 2.0000 | 1.67746 | 22.4 |
| *4 | 100.0000 | 0.1200 | | |
| 5(APERTURE STOP) | ∞ | 0.2068 | | |
| *6 | −2.7210 | 0.5000 | 1.53391 | 55.9 |
| *7 | −0.8632 | 0.5000 | | |
| 8 | ∞ | 0.5000 | 1.51680 | 64.2 |
| 9 | ∞ | 1.2729 | | |
| IMAGE PLANE | ∞ | | | |

| | |
|---|---|
| Fno. | 2.80 |
| IH | 2.25 |
| Bf (in Air) | 2.10 |
| L (in Air) | 8.48 |
| f | 1.33 |
| f1 | −3.52 |
| f2 | 4.39 |
| f3 | 1.85 |
| f12 | 24.36 |
| f23 | 2.27 |

TABLE 59

EXAMPLE 20

| | SURFACE NUMBER | | | |
|---|---|---|---|---|
| | 3 | 4 | 6 | 7 |
| KA | −3.9763058E+00 | −2.8741953E+11 | 0.0000000E+00 | 3.1033165E−01 |
| RB3 | −4.2367973E−02 | −5.8316926E−02 | 1.5133819E−02 | 1.3006540E−02 |
| RB4 | 1.4497694E−01 | 2.7084366E−01 | −3.3460549E−01 | 8.5479187E−02 |
| RB5 | −7.7653570E−02 | −3.7728729E−01 | −1.1774542E−01 | −2.7829078E−01 |
| RB6 | 1.8068285E−02 | 2.5045865E−01 | −2.9815848E−01 | 1.3500143E−01 |
| RB7 | 3.3270912E−03 | 3.2336793E−01 | 1.8447018E−01 | 1.6613321E−01 |
| RB8 | −8.1434479E−04 | 3.3790629E−01 | 9.8178451E−01 | −1.4116291E−02 |
| RB9 | −3.7024281E−04 | −8.8222175E−01 | 2.0553115E+00 | −1.7090453E−01 |
| RB10 | 1.3074683E−06 | −6.3274101E+00 | 2.8039557E+00 | 4.5165148E−02 |
| RB11 | 4.9775587E−05 | −3.9491495E+00 | −7.5442924E+00 | −4.1540494E−03 |
| RB12 | 3.1008003E−05 | 3.2893820E+01 | −2.6839214E+00 | 7.4283699E−04 |
| RB13 | 1.5108521E−05 | −3.4452442E+00 | −1.7734557E+01 | −2.3770629E−03 |
| RB14 | 7.0632621E−06 | −5.4844271E+01 | 3.8903926E+01 | −1.2236581E−02 |
| RB15 | 3.1966590E−06 | 6.3386739E+01 | −5.2373295E+01 | −1.3826911E−03 |
| RB16 | 1.2137519E−06 | −2.2718490E+01 | 5.7798592E+01 | 8.6486051E−03 |
| RB17 | 4.3341260E−08 | −1.4022310E+01 | 0.0000000E+00 | 5.4458071E−03 |
| RB18 | −5.1727597E−07 | 0.0000000E+00 | 0.0000000E+00 | 5.9562774E−03 |
| RB19 | −7.2178181E−07 | 0.0000000E+00 | 0.0000000E+00 | −1.0645548E−03 |
| RB20 | −8.0319765E−07 | 0.0000000E+00 | 0.0000000E+00 | −3.7513514E−03 |

TABLE 60

EXAMPLE 20

| SURFACE NUMBER | EFFECTIVE DIAMETER EDGE | | RATIO OF EFFECTIVE DIAMETER EDGE TO CENTER | |
|---|---|---|---|---|
| 3 | \|RX3\| | 2.10 | \|RX3\|/R3 | 0.72 |
| 4 | \|RX4\| | 34.02 | \|RX4\|/\|R4\| | 0.34 |
| 6 | \|RX6\| | 1.60 | \|RX6\|/\|R6\| | 0.59 |
| 7 | \|RX7\| | 1.19 | \|RX7\|/\|R7\| | 1.38 |

In all of the imaging lenses of Examples 1 through 20, the first lens L1 is a spherical lens of glass, and the second lens L2 and the third lens L3 are aspherical lenses of plastic.

Table 61 shows values in the imaging lenses of Examples 1 through 20 corresponding to formulas (1) through (14). In Examples 1 through 20, d-line is a reference wavelength, and Table 61 shows each value at the reference wavelength.

TABLE 61

| | FORMULA | | | | | | | | | | | | |
|---|---|---|---|---|---|---|---|---|---|---|---|---|---|
| EXAMPLE | (1) D3/f | (2) f1/f | (3A), (3B) f2/f3 | (4) \|f1/f23\| | (5) f3/f | (6) R3/f | (7) D2/f | (8) D1/f | (9) \|f12/f\| | (10) f2/f | (11) \|RX3\|/R3 | (12) f23/f | (13) (R3 + R4)/ (R3 − R4) | (14) L/f |
| 1 | 2.36 | −3.25 | 5.57 | 1.85 | 1.56 | 6.33 | 1.16 | 0.80 | 6.92 | 8.70 | 0.34 | 1.76 | −0.70 | 7.90 |
| 2 | 2.34 | −3.23 | 4.98 | 1.83 | 1.54 | 5.46 | 1.15 | 0.79 | 7.98 | 7.65 | 0.38 | 1.77 | −0.74 | 7.76 |
| 3 | 1.98 | −3.28 | 3.60 | 1.81 | 1.57 | 4.66 | 1.48 | 0.85 | 32.73 | 5.66 | 0.44 | 1.82 | −0.47 | 7.78 |
| 4 | 2.23 | −3.27 | 3.91 | 1.89 | 1.55 | 6.01 | 1.13 | 0.84 | 18.01 | 6.07 | 0.39 | 1.73 | −0.21 | 7.60 |
| 5 | 2.25 | −3.34 | 5.35 | 1.91 | 1.61 | 8.96 | 1.17 | 0.78 | 8.16 | 8.61 | 0.26 | 1.74 | −0.17 | 7.93 |
| 6 | 1.94 | −3.37 | 5.65 | 1.94 | 1.58 | 6.70 | 1.44 | 0.56 | 7.61 | 8.95 | 0.31 | 1.74 | −0.66 | 7.51 |
| 7 | 2.18 | −2.88 | 4.39 | 1.63 | 1.56 | 4.87 | 1.14 | 0.74 | 7.41 | 6.86 | 0.40 | 1.77 | −0.75 | 7.48 |
| 8 | 2.32 | −3.29 | 4.71 | 1.87 | 1.52 | 5.07 | 1.23 | 0.79 | 9.52 | 7.17 | 0.41 | 1.76 | −0.75 | 7.74 |
| 9 | 2.40 | −3.29 | 4.76 | 1.87 | 1.54 | 5.83 | 1.10 | 0.82 | 9.31 | 7.32 | 0.37 | 1.76 | −0.53 | 7.87 |
| 10 | 2.36 | −3.27 | 5.01 | 1.83 | 1.55 | 5.56 | 1.22 | 0.80 | 8.18 | 7.78 | 0.38 | 1.78 | −0.73 | 7.92 |
| 11 | 2.40 | −3.29 | 4.76 | 1.87 | 1.54 | 5.83 | 1.10 | 0.82 | 9.31 | 7.32 | 0.37 | 1.76 | −0.53 | 7.87 |
| 12 | 2.39 | −3.25 | 4.49 | 1.84 | 1.54 | 5.66 | 1.10 | 0.81 | 10.32 | 6.91 | 0.37 | 1.76 | −0.48 | 7.81 |
| 13 | 2.44 | −3.31 | 5.15 | 1.88 | 1.55 | 6.10 | 1.12 | 0.83 | 8.11 | 7.96 | 0.36 | 1.76 | −0.60 | 7.94 |
| 14 | 2.36 | −3.32 | 4.65 | 1.88 | 1.51 | 4.93 | 1.16 | 0.80 | 9.87 | 7.00 | 0.43 | 1.77 | −0.76 | 7.77 |
| 15 | 1.89 | −3.59 | 4.52 | 2.13 | 1.48 | 5.38 | 1.27 | 1.29 | 15.43 | 6.70 | 0.39 | 1.69 | −0.53 | 7.86 |
| 16 | 2.12 | −3.41 | 5.90 | 1.92 | 1.60 | 7.05 | 1.37 | 0.76 | 7.25 | 9.43 | 0.32 | 1.78 | −0.66 | 7.98 |
| 17 | 2.13 | −3.42 | 5.97 | 1.91 | 1.60 | 7.18 | 1.37 | 0.76 | 7.18 | 9.58 | 0.31 | 1.79 | −0.66 | 8.05 |
| 18 | 1.77 | −2.53 | 2.14 | 1.44 | 1.48 | 2.32 | 1.12 | 0.73 | 11.64 | 3.17 | 1.20 | 1.76 | −0.64 | 6.53 |
| 19 | 2.20 | −3.33 | 8.37 | 2.04 | 1.47 | 7.09 | 1.08 | 0.75 | 4.99 | 12.34 | 0.34 | 1.64 | −1.50 | 7.37 |
| 20 | 1.51 | −2.65 | 2.37 | 1.55 | 1.39 | 2.20 | 1.17 | 0.75 | 18.38 | 3.31 | 0.72 | 1.71 | −1.06 | 6.40 |

FIG. 22, Sections A through D, FIG. 23, Sections A through D, FIG. 24, Sections A through D, FIG. 25, Sections A through D, FIG. 26, Sections A through D, FIG. 27, Sections A through D, FIG. 28, Sections A through D, FIG. 29, Sections A through D, FIG. 30, Sections A through D, FIG. 31, Sections A through D, FIG. 32, Sections A through D, FIG. 33, Sections A through D, FIG. 34, Sections A through D, FIG. 35, Sections A through D, FIG. 36, Sections A through D, FIG. 37, Sections A through D, FIG. 38, Sections A through D, FIG. 39, Sections A through D, FIG. 40, Sections A through D, and FIG. 41, Sections A through D show aberration diagrams of the imaging lenses of Examples 1 through 20, respectively.

Here, the aberration diagrams of Example 1 will be described as an example, but the aberration diagrams of the other examples are similar to those of Example 1. FIG. 22, Sections A, B, C and D illustrate a spherical aberration, astigmatism, distortion (distortion aberration), and a lateral chromatic aberrations (chromatic aberrations of magnification), respectively. In the diagram of the spherical aberration, Fno, represents F-number, and in the other diagrams, ω represents a half angle of view. In the diagram of the distortion, a shift amount from an ideal image height f×tan(φ) is illustrated by using focal length f of the entire system and angle φ of view (variable, 0≤φ≤ω). Each aberration diagram illustrates an aberration when d-line (587.56 nm) is a reference wavelength. The aberration diagram of the spherical aberration illustrates aberrations also with respect to F-line (wavelength 486.13 nm), C-line (wavelength 656.27 nm), and an offense against the sine condition (indicated as SNC). Further, the diagram of lateral chromatic aberration illustrates aberrations also with respect to F-line and C-line.

As these data show, the imaging lens of Examples 1 through 20 consists of 3 lenses, which is a small number of lenses, is producible in a small size and at a low cost. Further, F-number is 2.1 through 2.8, which is small. The imaging lens has a high optical performance in which various aberrations including a lateral chromatic aberration are corrected in an excellent manner while a wide angle of view, which is a full angle of view of about 150° through 170°, is achieved. These imaging lenses are appropriate for use in a surveillance camera, an in-vehicle camera for imaging an image on the front side, the lateral sides, the rear side or the like of a car, or the like.

Figure 42:
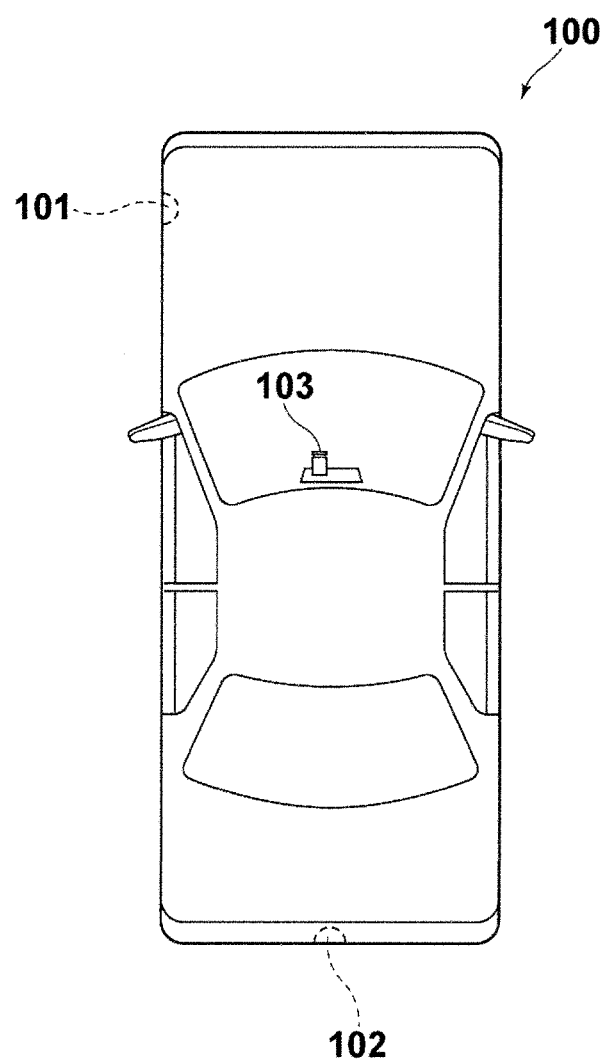
FIG. 42 is a diagram for explaining the arrangement of an imaging apparatus for in-vehicle use according to an embodiment of the present invention.

FIG. 42 illustrates, as an example, a manner of mounting an imaging apparatus including the imaging lens of the present embodiment in a car 100. In FIG. 42, the car 100 includes an exterior camera 101 for imaging a driver's blind spot on a side of a seat next to the driver, an exterior camera 102 for imaging a driver's blind spot on a rear side of the car 100, and an interior camera 103 for imaging the same range as the driver's visual field. The interior camera 103 is attached to the back side of a rearview mirror. The exterior camera 101, the exterior camera 102, and the interior camera 103 are imaging apparatuses according to the embodiment of the present invention, and they include an imaging lens according to an embodiment of the present invention and an imaging device for converting an optical image formed by the imaging lens into electrical signals.

The imaging lenses according to the embodiments of the present invention have the aforementioned advantages. Therefore, the exterior cameras 101 and 102, and the interior camera 103 can be structured in a small size and at a low cost without damaging the appearance of the car. Further, they have wide angles of view, and they can obtain excellent images.

So far, the present invention has been described by using embodiments and examples. However, the present invention is not limited to the aforementioned embodiments nor examples, and various modifications are possible. For example, the values of the curvature radius, a distance between surfaces, refractive index, Abbe number, and aspheric coefficients of each lens element are not limited to the values in the aforementioned examples of numerical values, but may be other values.

In the embodiment of the imaging apparatus, a case in which the present invention is applied to an in-vehicle camera was described. However, the use of the present invention is not limited to this purpose. For example, the present invention may be applied to a camera for a mobile terminal, a surveillance camera, and the like.

What is claimed is:

1. An imaging lens consisting of:
   a negative first lens having a concave image-side surface;
   a positive second lens having a convex object-side surface in a paraxial region;
   an aperture stop; and
   a positive third lens having a convex image-side surface in the paraxial region, which are arranged in this order from an object side,
   wherein the Abbe numbers of materials constituting the first lens and the third lens for d-line are greater than or equal to 40, and the Abbe number of a material constituting the second lens for d-line is less than or equal to 26, and
   wherein when the focal length of an entire system is f, and the center thickness of the second lens is D3, and the focal length of the first lens is f1, the following formulas (1') and (2) are satisfied:

$$1.7 < D3/f < 2.9 \quad (1'); \text{ and}$$

$$-5.0 < f1/f < -1.8 \quad (2).$$

2. The imaging lens according to claim 1, wherein when the focal length of an entire system is f, and the focal length of the third lens is f3, the following formula (5) is satisfied:

$$1.00 < f3/f < 2.50 \quad (5).$$

3. The imaging lens according to claim 1, wherein when the focal length of an entire system is f, and the curvature radius of the object-side surface of the second lens in a paraxial region is R3, the following formula (6) is satisfied:

$$2.0 < R3/f < 10.0 \quad (6).$$

4. The imaging lens according to claim 1, wherein when the focal length of an entire system is f, and a distance in air between the first lens and the second lens on an optical axis is D2, the following formula (7) is satisfied:

$$0.9 < D2/f < 2.5 \quad (7).$$

5. The imaging lens according to claim 1, wherein when the focal length of an entire system is f, and the center thickness of the first lens is D1, the following formula (8) is satisfied:

$$0.4 < D1/f < 1.5 \quad (8).$$

6. The imaging lens according to claim 1, wherein when the focal length of an entire system is f, and the combined focal length of the first lens and the second lens is f12, the following formula (9) is satisfied:

$$4.0 < |f12/f| < 50.0 \quad (9).$$

7. The imaging lens according to claim 1, wherein when the focal length of an entire system is f, and the focal length of the second lens is f2, the following formula (10) is satisfied:

$$4.0 < f2/f < 20.0 \quad (10).$$

8. The imaging lens according to claim 1, wherein when the curvature radius of the object-side surface of the second lens in the paraxial region is R3, and the curvature radius of the object-side surface of the second lens at an effective diameter edge is RX3, the following formula (11) is satisfied:

$$0.1 < |RX3|/R3 < 1.0 \quad (11).$$

9. The imaging lens according to claim 1, wherein when the focal length of an entire system is f, and the combined focal length of the second lens and the third lens is f23, the following formula (12) is satisfied:

$$1.00 < f23/f < 1.85 \quad (12).$$

10. The imaging lens according to claim 1, wherein the lens system consists of only three lenses of the first lens, the second lens and the third lens.

11. The imaging lens according to claim 1, wherein when the focal length of an entire system is f, and the center thickness of the second lens is D3, the following formula (1-1) is satisfied:

$$1.7 < D3/f < 2.5 \quad (1\text{-}1).$$

12. The imaging lens according to claim 1, wherein when the focal length of an entire system is f, and the focal length of the first lens is f1, the following formula (2-1) is satisfied:

$$-3.8 < f1/f < -2.5 \quad (2\text{-}1).$$

13. An imaging apparatus comprising:
    the imaging lens according to claim 1.

14. An imaging lens consisting of:
    a negative first lens having a concave image-side surface;
    a positive second lens having a convex object-side surface in a paraxial region;
    an aperture stop; and
    a positive third lens having a convex image-side surface in the paraxial region, which are arranged in this order from an object side,
    wherein the Abbe numbers of materials constituting the first lens and the third lens for d-line are greater than or equal to 40, and the Abbe number of a material constituting the second lens for d-line is less than or equal to 26, and
    wherein when the focal length of the first lens is f1, and the focal length of the second lens is f2, and the focal length of the third lens is f3, and the combined focal length of the second lens and the third lens is f23, the following formulas (3A) and (4) are satisfied:

$$3.0 < f2/f3 < 50.0 \quad (3A); \text{ and}$$

$$1.3 < |f1/f23| < 4.0 \quad (4).$$

15. The imaging lens according to claim 14, wherein when the focal length of an entire system is f, and the focal length of the first lens is f1, the following formula (2) is satisfied:

$$-5.0 < f1/f < -1.8 \quad (2).$$

16. The imaging lens according to claim 14, wherein when the focal length of the second lens is f2, and the focal length of the third lens is f3, the following formula (3A-1) is satisfied:

$$3.5 < f2/f3 < 6.0 \quad (3A\text{-}1).$$

17. The imaging lens according to claim 14, wherein when the focal length of the first lens is f1, and the combined focal length of the second lens and the third lens is f23, the following formula (4-1) is satisfied:

$$1.6 < |f1/f23| < 2.2 \qquad (4\text{-}1).$$

18. An imaging apparatus comprising:
the imaging lens according to claim 14.

19. An imaging lens consisting of:
a negative first lens having a concave image-side surface;
a positive second lens having a convex object-side surface in a paraxial region;
an aperture stop; and
a positive third lens having a convex image-side surface in the paraxial region, which are arranged in this order from an object side,
wherein the Abbe numbers of materials constituting the first lens and the third lens for d-line are greater than or equal to 40, and the Abbe number of a material constituting the second lens for d-line is less than or equal to 26, and the refractive index of the material constituting the second lens for d-line is greater than or equal to 1.62 and less than or equal to 1.8, and
wherein when the focal length of the second lens is f2, and the focal length of the third lens is f3, the following formula (3A) is satisfied:

$$3.0 < f2/f3 < 50.0 \qquad (3\text{A}).$$

20. An imaging apparatus comprising:
the imaging lens according to claim 19.

* * * * *